US008944257B2

(12) United States Patent
Eisen et al.

(10) Patent No.: US 8,944,257 B2
(45) Date of Patent: Feb. 3, 2015

(54) POLYSULFONE POLYMERS AND MEMBRANES FOR REVERSE OSMOSIS, NANOFILTRATION AND ULTRAFILTRATION

(75) Inventors: Moris S. Eisen, Tivon (IL); Raphael Semiat, Haifa (IL); Natalia Vainrot, Haifa (IL)

(73) Assignee: Technion Research and Development Foundation Ltd., Haifa (IL)

( * ) Notice: Subject to any disclaimer, the term of this patent is extended or adjusted under 35 U.S.C. 154(b) by 1384 days.

(21) Appl. No.: 12/674,628

(22) PCT Filed: Aug. 20, 2008

(86) PCT No.: PCT/IL2008/001139
§ 371 (c)(1),
(2), (4) Date: Apr. 4, 2011

(87) PCT Pub. No.: WO2009/024973
PCT Pub. Date: Feb. 26, 2009

(65) Prior Publication Data
US 2011/0174728 A1    Jul. 21, 2011

Related U.S. Application Data

(60) Provisional application No. 60/956,843, filed on Aug. 20, 2007.

(51) Int. Cl.
*B01D 71/68* (2006.01)
*C08G 75/20* (2006.01)
(Continued)

(52) U.S. Cl.
CPC ............ *C08G 75/23* (2013.01); *B01D 67/0011* (2013.01); *B01D 67/003* (2013.01);
(Continued)

(58) Field of Classification Search
CPC .... C08G 75/20; C08G 75/23; C08G 2650/20; B01D 71/68; B01D 67/0011; B01D 67/003; B01D 67/0093; B01D 71/28; B01D 71/82; B01D 2323/30; B01D 2325/48; C02F 1/44; C02F 1/441; C02F 1/442; C02F 1/444
USPC ................ 210/500.41, 500.21; 525/906, 534, 525/54.2; 521/61, 180, 88; 216/56; 977/781
See application file for complete search history.

(56) References Cited

U.S. PATENT DOCUMENTS 3,709,841 A      1/1973   Quentin
3,792,114 A *    2/1974   Lauchlan et al. ........ 525/440.11
(Continued)

FOREIGN PATENT DOCUMENTS

DE       19954158 A1    5/2001
EP        1238998 A1    9/2002

OTHER PUBLICATIONS

Aerts et al., "The role of the nature of the casting substrate on the properties of membranes prepared via immersion precipitation" Journal of Membrane Science, 2006, vol. 283, Issues 1-2, pp. 320-327.
(Continued)

*Primary Examiner* — Fred Prince
(74) *Attorney, Agent, or Firm* — Browdy and Neimark, PLLC

(57) ABSTRACT

The invention provides modified polysulfones substituted in one or more of the phenyl rings by functional groups and membranes composed of the modified polysulfones. Also provided are methods for the preparation of monodispersed nanoporous polymeric membranes. The membranes are useful for reverse osmosis, nanofiltration, and ultrafiltration, particularly for purification of water.

48 Claims, 20 Drawing Sheets

(51) Int. Cl.
    C08G 65/48      (2006.01)
    C08J 9/26       (2006.01)
    C08G 75/23      (2006.01)
    B01D 67/00      (2006.01)
    B01D 71/28      (2006.01)
    B01D 71/82      (2006.01)
    C02F 1/44       (2006.01)

(52) U.S. Cl.
    CPC ............ *B01D67/0093* (2013.01); *B01D 71/28* (2013.01); *B01D 71/68* (2013.01); *B01D 71/82* (2013.01); *C02F 1/44* (2013.01); *B01D 2323/30* (2013.01); *C02F 1/441* (2013.01); *C02F 1/442* (2013.01); *C02F 1/444* (2013.01); *C08G 2650/20* (2013.01); *C08L 2312/00* (2013.01); *B01D 2325/48* (2013.01); *Y10S 525/906* (2013.01); *Y10S 977/781* (2013.01)
    USPC ..... 210/500.41; 525/906; 525/534; 525/54.2; 521/61; 521/180; 521/88; 216/56; 977/781

(56) References Cited

U.S. PATENT DOCUMENTS

| | | | |
|---|---|---|---|
| 4,894,159 | A | 1/1990 | Guiver et al. |
| 5,708,040 | A | 1/1998 | Hong et al. |
| 5,932,104 | A | 8/1999 | Kawamura |
| 6,083,393 | A | 7/2000 | Wu et al. |
| 6,248,469 | B1 | 6/2001 | Formato et al. |
| 7,563,850 | B2 * | 7/2009 | Kinouchi et al. ............ 525/534 |
| 2005/0199544 | A1 * | 9/2005 | Kumar et al. ............ 210/500.27 |
| 2008/0312349 | A1 * | 12/2008 | Yeager et al. ................... 521/27 |

OTHER PUBLICATIONS

Guiver et al, "Synthesis and Charactgerization of Carboxylated Polysulfones", British Polymer Journal 23:29-39 (1990).

Guiver et al, "Functionalized Polysulfone Membranes by Heterogeneous Lithiation", Journal of Applied Polymer Science, 48:1597-1606 (1993).

Huang et al, "Crosslinked Chitosan Composite Membrane for the Pervaporation Dehydration of Alcohol Mixtures and Enhancement of Structural Stability of Chitosan/Polysulfone Composite Membranes", Journal of Membrane Science 160:17-30 (1999).

Kerres, "Development of Ionomer Membranes for Fuel Cells", Journal of Membrane Science 185:3-27 (2001).

Latha et al, "Polyurethane and Carboxylated Polysulfone Blend Ultrafiltration Membranes. I. Preparation and Characterization", Journal of Applied Polymer Science, 97:1307—1315 (2005).

Li et al, "Preparation of the Crosslinked Polyethersulfone Films by High-Temperature Electron-Beam Irradiation" Polymer Degradation and Stability 91:2867-2873 (2006).

Nguyen et al, "Clustering in Carboxylated Polysulfone Ionomers: A Characterization by Dynamic Mechanical and Small-Angle X-ray Scattering Methods", Journal of Polymer Science: Part B: Polymer Physics, 37:3226-3232 (1999).

Walker et al, "Proton-Conducting Polymers with Reduced Methanol Permeation", Journal of Applied Polymer Science, 74:67-73 (1999).

Yoshikawa et al, "Modified Polysulfone Membranes. III. Pervaporation Separation of Benzene—Cyclohexane Mixtures through Carboxylated Polysulfone Membranes", Journal of Applied Polymer Science, 74:407-412 (1999).

Johnson, B.C., I. Yilgor, C. Tran, M. Iqbal, J.P. Wightman, D.R. Lloyd, J.E. McGrath, Synthesis and characterization of sulfonated poly (arylene ether sulfones), J. Polym. Sci. 22, 721-737 (1984).

Noshay, A., L. M. Robeson, Sulfonated polysulfone, J. Appl. Polym. Sci. 20, 1885-1903 (1976).

Guiver, M.D., J.W. ApSIMON, O. Kutowy, The modification of polysulfone by metalation, J. Polym. Sci. Polym. Lett. Ed. 26, 123-127 (1988).

Smolders, C.A., A.J. Reuvers, R.M. Boom, I.M. Wienk, Microstructures in phase-inversion membranes. 1. formation of macrovoids, J. of Mem. Sci. 73, 259-275 (1992).

Trembley, A.Y., C.M. Tam, M.D. Guiver, M.M. Dal-Cin, Studies on hydrophilic polysulfone ultrafiltration membranes, Can. J. Chem. Eng. 69, 1348-1351 (1991).

* cited by examiner

POLYSULFONE POLYMERS AND MEMBRANES FOR REVERSE OSMOSIS, NANOFILTRATION AND ULTRAFILTRATION

FIELD OF THE INVENTION

The present invention relates to modified polysulfone polymers, to membranes composed of said polysulfone polymers, and to novel methods for preparing membranes suitable for reverse osmosis, nanofiltration and ultrafiltration.

BACKGROUND OF THE INVENTION

Membranes act as selective barriers allowing preferred passage of certain components and hindering passage of other components through various mechanisms: differences in solubility, diffusion, differences in electric charge, polarity, size and shape. The usefulness of a membrane can be characterized by the following main properties: degree of selectivity provided for a desired separation, permeability considerations, mechanical stability (creep and compaction considerations), chemical stability (hydrolytic stability, allowable pH range, microbial resistance, oxidative resistance, etc.), fouling resistance and temperature stability.

Membranes have proven to be reliable and affordable devices for decontaminating water. The cost of these membranes, however, is still higher than most societies that suffer from inadequate water sources can afford. Advances in materials may help to reduce membrane costs.

There are currently four commonly accepted classes of membrane based on the size of the material they will remove. Moving from the smallest to largest pore size, these are Reverse Osmosis (RO), Nanofiltration (NF), Ultrafiltration (UF), and Microfiltration (MF) membranes.

The reverse-osmosis (RO) membrane technique is considered the most promising for brackish water and seawater desalination. It is also used for treatment of slightly polluted water. It uses dynamic pressure to overcome the osmotic pressure of the salt solution, hence causing water-selective permeation from the saline side of a membrane to the freshwater side. Salts are rejected by the membrane, and separation is accomplished. The RO membrane is nonporous. Water dissolves in the membrane's skin, the active layer that determines the membrane's properties, and then permeates the membrane by diffusion. The skin is of the order of 30-200 nm thick and is designed to reduce the hydraulic resistance to water passage.

The membrane main properties, like flux and rejection, are controlled by the skin thickness and integrity. Current RO membranes are sensitive to high and low pH, solvents, oxidizing materials, etc. Better membranes are needed to increase the flux, with high chemical and mechanical stability that may prevent fouling with longer work life. Improved RO membranes are the main key for cost reduction in desalination processes. High flux membranes may reduce the energy needs and the main investments per unit product of fresh water produced.

Nanofiltration (NF) is a membrane liquid separation technology that is situated between reverse osmosis (RO) and ultrafiltration (UF). The process of reverse osmosis normally removes solute molecules dissolved in the solution, in the range of 0.0001 micron in diameter and smaller, whereas the process of nanofiltration removes larger in size molecules in the 0.001 micron range. The nanofiltration technology started three decades ago in order to perform the membranal RO process at a low pressure with a practical flux of water, due to the high pressures that usually are used in the RO process ensuing in a considerable energy cost. Those "low-pressure high flux reverse osmosis membranes" became to be known as nanofiltration (NF) membranes. The first applications of the NF process were reported in 1987-1989. From the beginning, the water industry (especially for drinking) has been the major application area for nanofiltration. The chronological reason for this is that NF membranes were basically developed for reducing the concentration of the inorganic salts of low solubility (softening), and the NF membranes are still sometimes denoted as "softening" membranes.

Nanofiltration membranes are used to partially remove heavy salts and large organic molecules from water for treating slightly polluted surface water and as a pretreatment for desalination processes. Nanofiltration membranes contain pores with diameters in the range of 3 nm. An electrical charge applied to the nanofilter influences salt rejection. Water passage through the membrane is aided by capillary motion through the pores.

Ultrafiltration (UF) membranes have pore diameters in the range of 10-100 nm. Microfiltration (MF) membranes have larger pore diameters, up to 1 μm. Separation of contaminants from water using these membranes is based on simple filtration, which depends upon the size of the contaminant particles in solution and the size of the pores. The membranes retain large molecules, mainly organic molecules and suspended matter. The UF membrane is the modern solution for removing bacteria and viruses from water. MF membranes are used for the removal of suspended particles, and in some cases may also provide protection against bacteria and most viruses. UF and MF are used in combination extensively in wastewater treatment equipment, such as membrane bioreactors, or to clean treated water and surface water.

Water is considered to be a limited resource in several countries, including the Mediterranean and Middle East countries. Renewable water resources have seen a reduction of up to about 60% in the last 10 years. Under this state of affairs, the already scarce sources for untreated water sources of appropriate quality for RO or NF treatment are becoming almost unattainable, and raw waters of lower quality have to be considered as entrant for treatment, including membrane softening and desalination.

A number of governments have issued large-scale programs to recover and reuse treated municipal wastewaters, restore saline and contaminated wells and other sources, and desalinate brackish and marginal water sources. Some activity has been undertaken regarding agricultural industries by private companies to desalinate sea and other high-salinity raw waters for multiple applications.

In the field of membrane filtration a differentiation is operative among diverse varieties of membrane processes on the basis of the size and geometry of the particles to be retained. RO is capable of producing very clean water and high concentrate/retentate; however, the process can be very expensive, due to the relatively sophisticated technology it utilizes. UF, on the other hand, is relatively inexpensive but is sometimes not effective enough to meet rigorous recycling standards. Hence, a search for good UF membranes is at the front of the technology nowadays. Moreover, the process of NF can be also an effective compromise between RO and UF for some water sources. NF is easier to implement and less expensive than reverse osmosis. Because NF uses less fine membranes, the feed pressure of the NF system utilizes a working RO of seawater.

Polymeric membranes may be isotropic or asymmetric (anisotropic) in their pore structure. Isotropic membranes have a uniform pore structure throughout the membrane in contrast to the asymmetric membranes. Membranes may also be non-porous as in RO membranes.

RO membranes are obtained from casting either a polymer melt or a solution whereas asymmetric polymeric membranes are usually produced by phase inversion method. In these techniques, homogeneous polymer solution consisting of polymer and solvent becomes thermodynamically unstable due to different external effects and phase separation occurs. The formation of asymmetric membrane structure is controlled by both the thermodynamics of casting solution and the kinetics of transport process.

Membrane formation occurs by egress of solvent and ingress of non-solvent into the cast solution, leaving a two-phase system. The polymer-rich phase forms the matrix of the membrane, while the polymer-lean phase, rich in solvent and nonsolvents, fills the pores. Depending on the evaporation/ quenching conditions, initial thickness and composition of the polymer solution, different membrane structures can be obtained.

Asymmetric membranes are characterized by a very thin and dense skin layer supported by a more open porous sublayer. The dense skin layer determines the separation performance while the porous sublayer provides mechanical support and influences the overall flow resistance.

Membrane structure, especially pore size and its distribution, can be controlled for each specific application depending on the choice of the polymer, solvent, nonsolvent and preparation conditions.

RO membranes can be symmetric or asymmetric depending how they are casted, however most of the NF or UF membranes are asymmetric, with different pore sizes among the membrane. The pore-size of the membrane on the side of the solute are smaller than those on the permeate side, thus avoiding the blockage of the membranes. The stability of the membranes and the pore size under various conditions is extremely important, because it determines the lifetime of the membrane and the number of potential applications using this technology. A quantitative criterion for the retention characteristics of a membrane is the molecular weight cut off, which is defined as the molecular weight at which 90% of the solutes are retained by the membrane. Additionally, pore-size distribution (for NF and UF), charge effects, hydro- and/or lipophilicity, and polarity of the medium will influence the truly permeability of the membrane. Furthermore, for solute macromolecules, the molecular shape in solution of the molecules plays an important role. For example, folding molecules are more efficiently retained by membranes, as compared to linear elongated molecules, of similar molecular weight. To describe the physical processes that take place in membrane filtration processes, other parameters like pressure, dielectric parameters, permeability of the membrane, have to be taken into account.

Therefore, NF and UF are essentially a lower-pressure version of RO where the purity of product water is not as critical as high grade water, or the level of dissolved solids to be removed is less than what is typically encountered in brackish water or seawater or to an application where the high salt rejection of RO is not necessary. NF is capable of removing hardness elements such as calcium or magnesium salts and also capable of removing bacteria and viruses as well as organic-related colour without generating undesirable chlorinated hydrocarbons and trihalomethanes (ozone risk compounds—only if they are volatile—they are more dangerous as carcinogenic). Nanofiltration is also used to remove pesticides and other organic contaminants from surface and ground waters to help ensure the safety of public drinking water supplies.

The processes of RO and NF are affected by the charge of the particles being rejected. Thus, particles with larger charges are more likely to be rejected than others non-charged particles; therefore, the dielectric properties of the membrane are an important subject to increase rejection.

The dielectric exclusion, which is caused by the interactions of ions with the bound electric charges induced by ions at interfaces between media of different dielectric constants, is considered as one of mechanisms of filtration. In addition, the dielectric exclusion from pores with closed geometry like circular cylinders is essentially stronger than that from pores with relatively open geometry like slits.

Besides the casting from melts or from solutions to obtain RO membranes, asymmetric membranes for nanofiltration are mostly fabricated by a process called phase inversion, which can be achieved through three principal methods: immersion precipitation (wet-casting), dry-casting and thermally-induced phase separation.

The methods known in the art do not permit to control membrane pore size and the pore size distribution. Therefore, several efforts have been applied to develop new methods for homogeneous nanopore creation.

Aromatic polysulfones (PSU) of the structure 1 below are a family of high-performance engineering thermoplastics that contain sulfone groups attaching phenoxide rings in the backbone skeleton. They are obtained by reaction between bisphenol A and di-p-dichlorodiphenylsulfone:

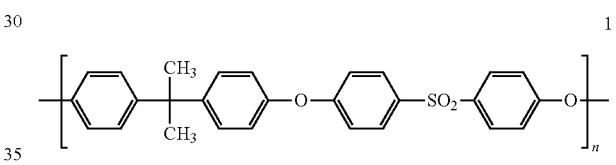

1

Since their development in the 1960's, polysulfones have been used extensively as membrane materials, mainly in the field of UF and RO, but other industrial and medical applications are also well known. These polymers display excellent oxidative, thermal, and hydrolytic stability with excellent strength and flexibility, good mechanical and film-forming properties, and resistance to extremes of pH, oxidation and acid catalyzed hydrolysis. Despite these benefits, however, they have some disadvantages. Their rather hydrophobic nature is of considerable limitation in some aqueous membrane applications that demand hydrophilic character. An enhancement in hydrophilicity has been achieved by different physical and chemical surface treatment procedures on pre-formed polysulfone membranes or by doping the casting solution of the membranes with several additives, such as other hydrophilic polymers, e.g., polyvinylpyrrolidone (PVP), to reduce fouling and to confer additional desirable properties to the membrane. Another different method for changing the surface properties of a synthetic membrane is the chemical modification of the polymer (adding functional groups via substitution) prior to the casting thus allowing the formation of new membranes from the modified derivatives. The chemical modification affords the possibility of introducing ion-exchange groups onto the polymer backbone, potential cross-linking sites and attachment sites for complexation of hazardous or specific contaminants existing in water (U.S. Pat. No. 3,709,841).

For these purposes, a variety of functional groups have been introduced onto the polysulfone polymers. Carboxylation and sulfonation procedures have led to hydrophilic and cation exchange membranes (Noshay and Robeson, 1976).

Halomethylation reactions (chloro- and bromomethylation) have led to useful intermediates for anion exchange and other functionalized derivatives.

Lithiation is also a versatile polysulfone modification tool for functionalization of polysulfones. From the lithiated intermediates, among others, carboxylated polysulfones can be obtained on addition of $CO_2$, which is a useful membrane material in UF, NF and RO processes because of its enhanced hydrophilicity (Tremblay et al., 1991; U.S. Pat. No. 4,894, 159).

Polysulfones with N-containing functional groups have also been prepared via lithiation reactions (Rodemann and Staude, 1994; Rodemann and Staude, 1995).

Lithiation of polysulfones is a heteroatom-facilitated process: the sulfone group directs the lithium to the adjacent ortho positions as shown in the formula below due to strong electron-withdrawing effect induced by the sulfone group (Guiver et al., 1988; Guiver et al., 1989).

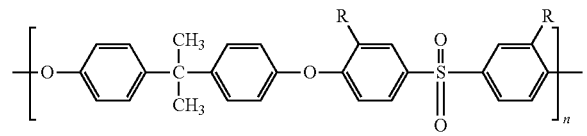

Sulfonated aromatic polysulfones synthesized by attaching sulfonic acid groups in polymer modification reactions (post-sulfonation route) have been investigated since the pioneering work of Noshay and Robeson, who developed a mild sulfonation procedure for the commercially available polysulfone (Noshay and Robeson, 1976). This approach found significant interest in the area of desalination membranes for reverse osmosis and related water purification applications (Johnson et al., 1984). Different sulfonation agents have been employed for this modification such as chlorosulfonic acid and a sulfur trioxide-triethyl phosphate complex. In these post-sulfonation reactions, the sulfonic acid group is restricted to the activated position ortho to the aromatic ether bond (through aromatic electrophilic substitution) as indicated in the formula below:

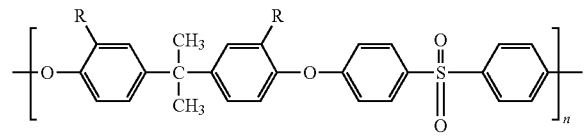

Incorporation of phosphorus groups onto polymer backbone can afford excellent thermal stability and flame retardancy. The phosphorus brings its flame-retardation effect through the formation of high char yield. While under heat, the phosphorus-containing groups first decompose and then form a phosphorus-rich residue. This residue helps to prevent further decomposition of the polymer through heat resistance and raises the decomposition temperature of the polymer to higher level.

There is considerable evidence of the interest in the Lewis acid binding properties of organoboron compounds for organic synthesis and molecular recognition. Trigonal $Sp^2$ hybridized boronic acids $RB(OH)_2$ bind hydrophilic diols, either by the reversible formation of a neutral trigonal boronate ester, or through a mechanism which is considered to be more favorable involving an ion-paired $Sp^3$ hybridized tetrahedral anion. The incorporation of electron-deficient boron centers into polymer structures is particularly intriguing as it, for example, provides an opportunity to further manipulate the polymers via donor acceptor bonding. Boron containing polymers also play a major role as intermediates in the synthesis of functionalized polymers with polar side-groups and are used as polymeric electrolytes for batteries, sophisticated flame retardants, and as preceramic and photoluminescent materials.

The national demand for better environmental solutions and cleaner technologies has brought the membrane technology into the scientific forefront. Therefore there is an imperative quest for better and simple reverse osmosis, nanofiltration and ultrafiltration membranes for a high flux and high retention of solutes without the clogging of the membrane that are able to work under highly drastic mechanical and deteriorating chemical conditions. Moreover a quest for any specific membranes that is able to perform much better than those today will allow an even better use of membrane-price-technology-application result.

SUMMARY OF THE INVENTION

It is an object of the present invention to provide modified polysulfones and membranes suitable for reverse osmosis, microfiltration, nanofiltration and ultrafiltration.

In one aspect, the present invention relates to a modified polysulfone polymer substituted in one or more of the phenyl rings by functional groups selected from: (i) —CO—$R_1$; (ii) —CON($R_2$)$R_3$; (iii) —B(O$R_2$)$_2$; (iv) —P(=O)(O$R_2$)$_2$; and (v) —CO—O—$R_4$—O—CO— linking two chains of the polymer backbone, wherein $R_1$ is OH, halohydrocarbyloxy, a mono- or oligosaccharide residue or a derivative thereof; $R_2$ is H or hydrocarbyl; $R_3$ is a monosaccharide or oligosaccharide residue or a derivative thereof; and $R_4$ is alkylene.

In another aspect, the present invention relates to polysulfone membranes composed of said modified polysulfone polymers.

The invention further provides new methods for the preparation of novel membranes for reverse osmosis, microfiltration, nanofiltration, and ultrafiltration.

Figure 1A:
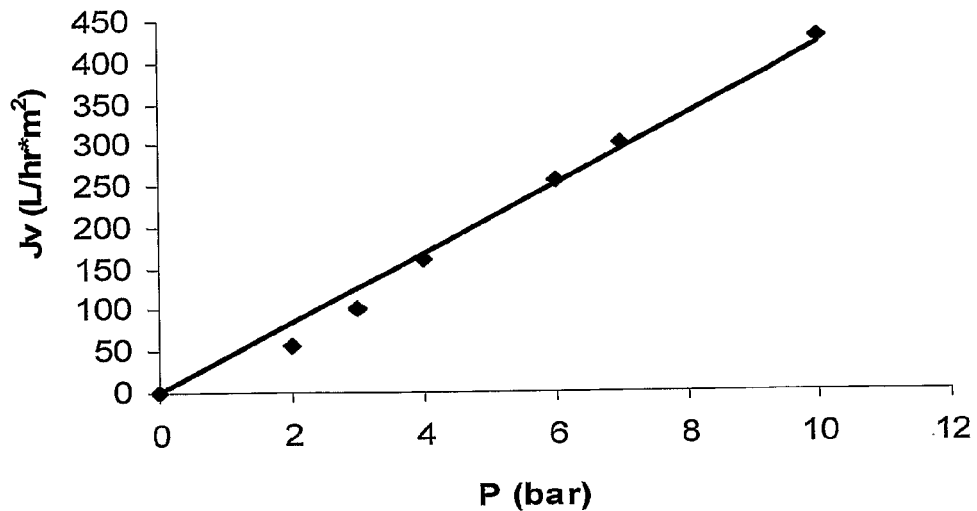
FIGS. 1A-1B show pure water and $CaCl_2$ salt solution permeability dependence upon osmotic pressure determined through the commercial polysulfone membrane 1. (1A) Water flux Jv vs. pressure; $L_p$=45.248 L/hr*m$^2$*P; (1B) Flux of $CaCl_2$ 0.1% vs. pressure, $L_p$=41.06 L/hr*m$^2$*P.

polysulfone with neomycin groups 13; (7) polysulfone with galactose groups 15; (8) polysulfone with chloroethane groups 10; (9) polyfluorosulfone with chloroethane groups 11; (10) polysulfone with chlorooctane groups 8; (11) polysulfone with phosphonate ester groups 18; (12) polysulfone with boronic acid groups 16; (13) polysulfone with phosphonic acid groups 19; and (14) polyquinone based polysulfone 3.

Figure 4A:
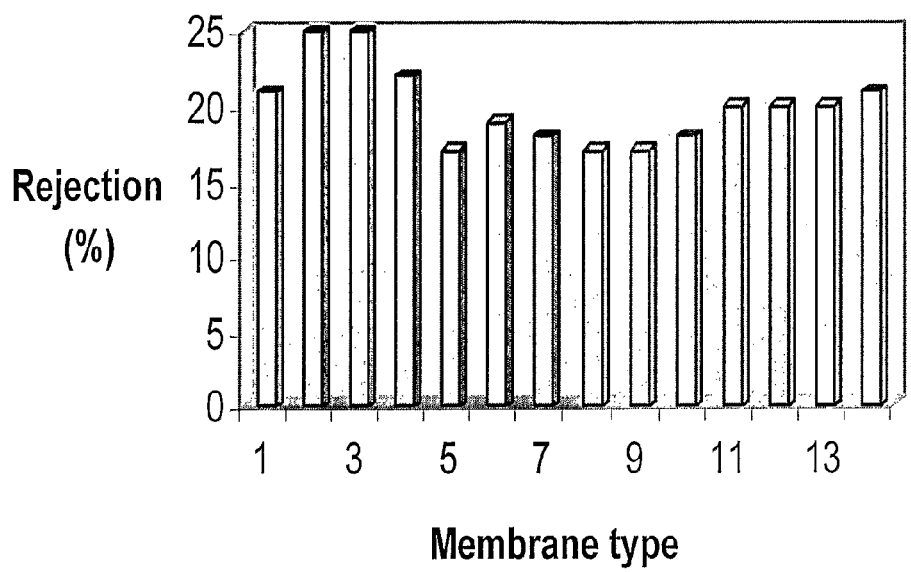
FIGS. 4A-4B show the rejection of $CaCl_2$ 0.1% (4A) and pure water flux (4B) by different membranes. The numbers of the membranes correspond to the numbers of the polymers as follows: (1) commercial polysulfone 1; (2) polyfluorosulfone 2; (3) polysulfone crosslinked 7; (4) polysulfone carboxylated 4; and (5) polysulfone with mannose groups 12; (6)
Figure 4B:
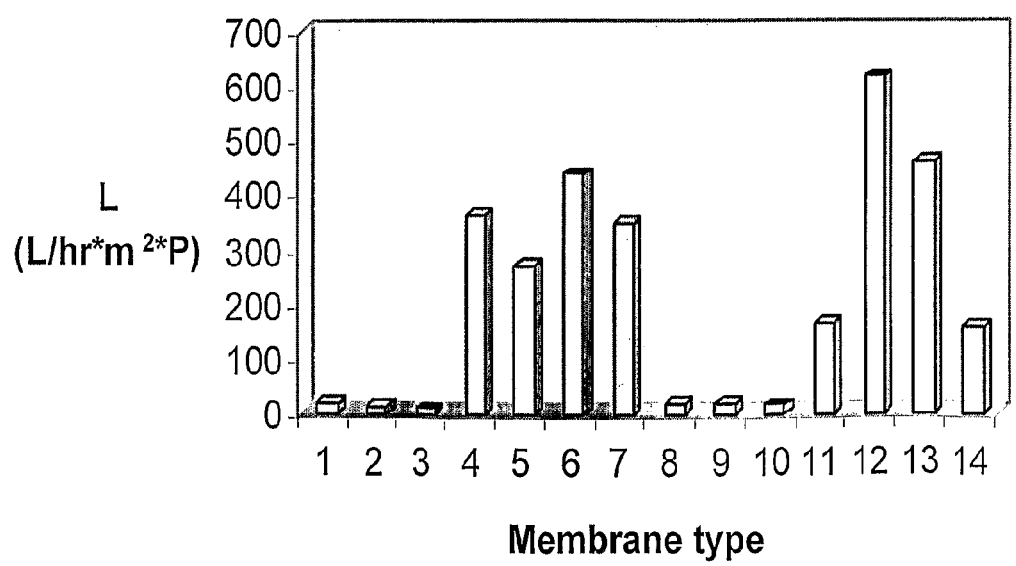
Figure 5:
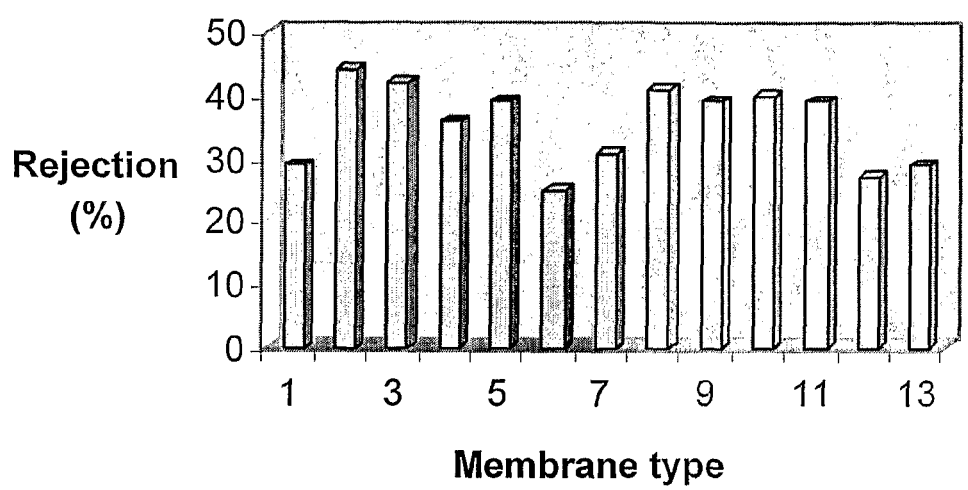

FIG. 5 shows rejection of 2-naphthol-3,6-disulfonic acid disodium salt 0.1% by membranes 1-13 (the membrane numbers are the same as for FIG. 4 above).

FIGS. 6A-6D show pure water permeability and the rejection of $CaCl_2$ 0.1% by different membranes. (6A-6B) Membranes prepared from polymers with different backbone groups: polysulfone 1 (diamonds), polyfluorosulfone 2 (squares) and polyquinone based polysulfone 3 (triangles). (6C-6D) Membranes prepared from polymers with different functional groups inside of polymer skeleton: polysulfone with cloroethane groups 10 (diamonds), and polyfluorosulfone with chloroethane groups 11 (squares).

Figure 7A:
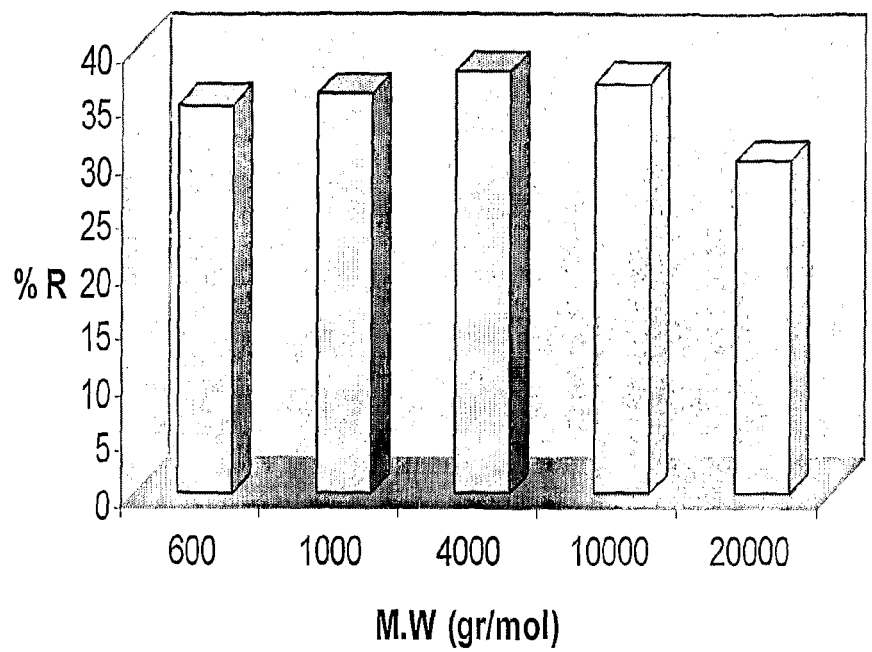
Figure 7B:
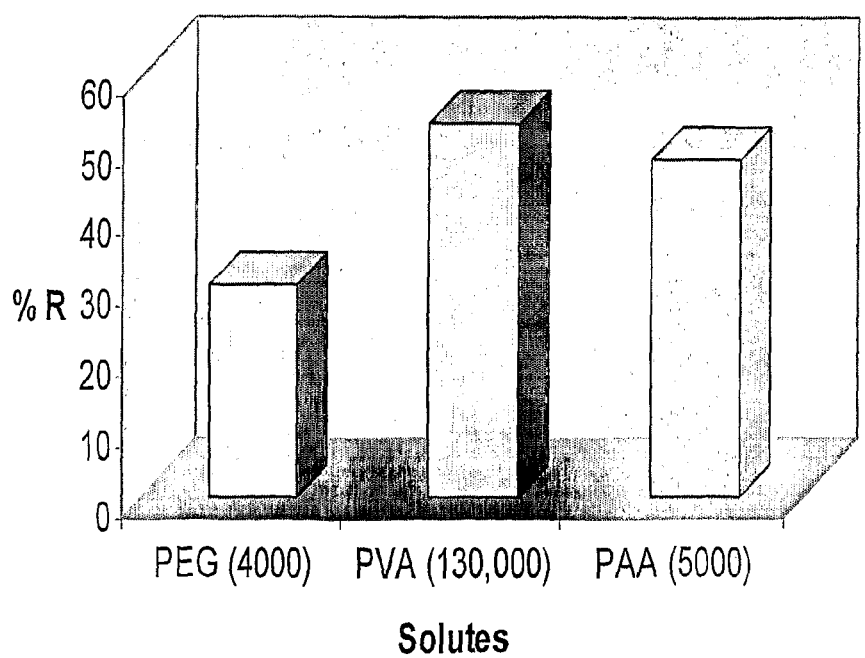

FIGS. 7A-7B show rejection of organic macromolecules with high molecular weights with polysulfone membrane containing carboxylic acid groups prepared from Polymer 4. 7A shows rejection of PEG (polyethylene glycol) of 600, 1000, 4000, 10000 and 20000 Da; 7B shows rejection of PEG 4000 Da, PVA (polyvinyl alcohol) 130000 Da and PAA (polyacrylic acid) 5000 Da.

Figure 8A:
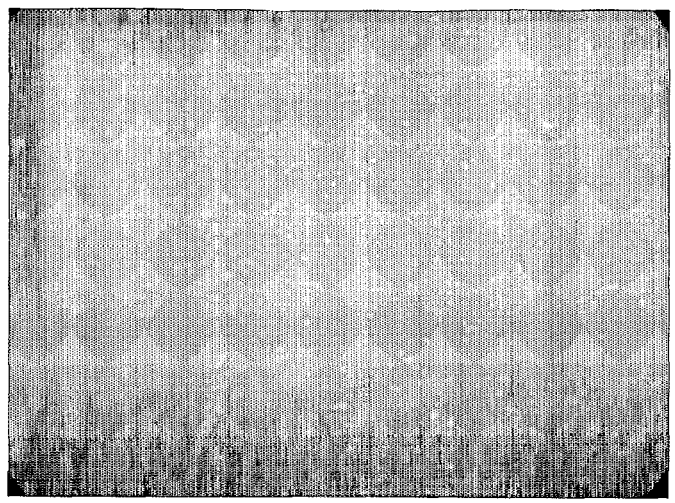
Figure 8B:
Figure 8C:
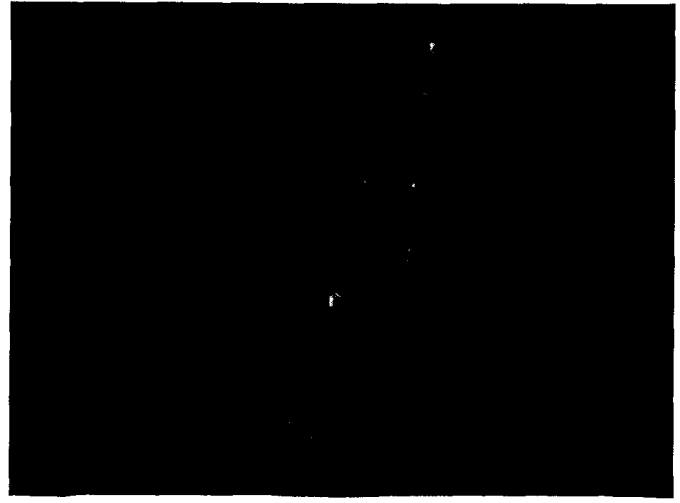
Figure 9A:
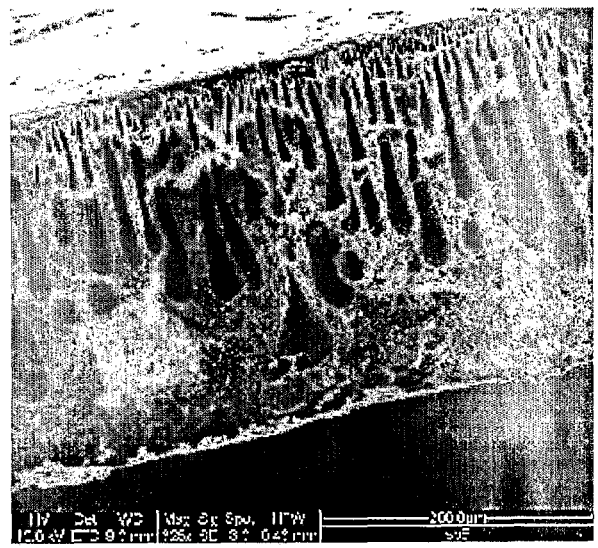
Figure 9B:
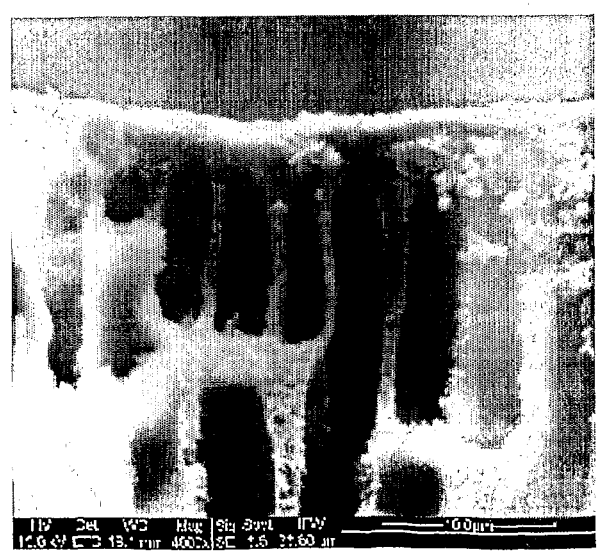
Figure 9C:
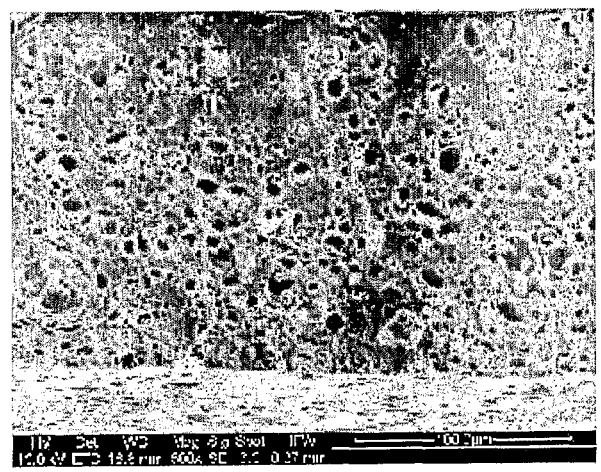
Figure 9D:
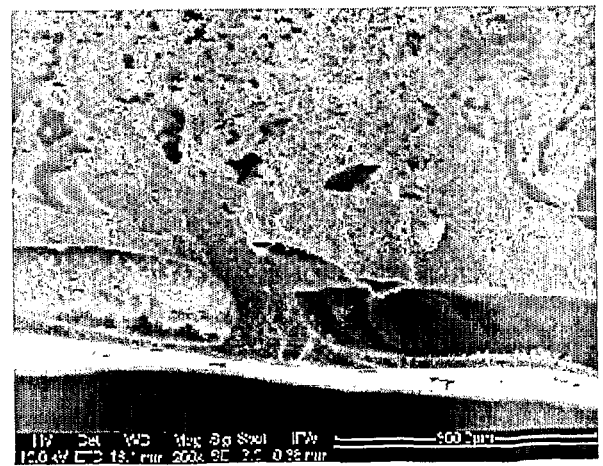
Figure 9E:
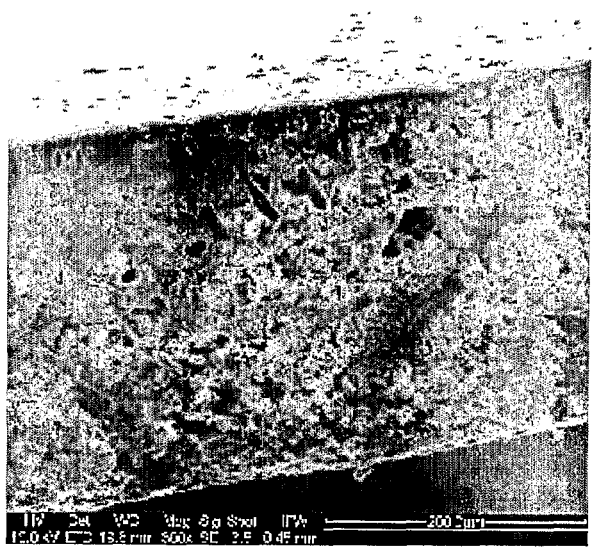
Figure 9F:
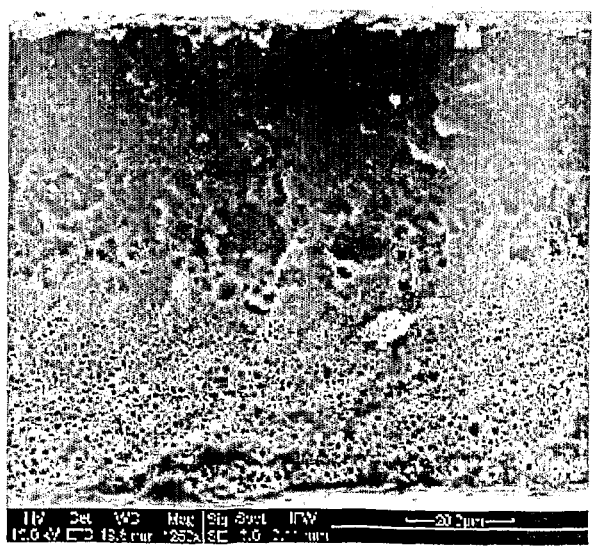
Figure 9G:
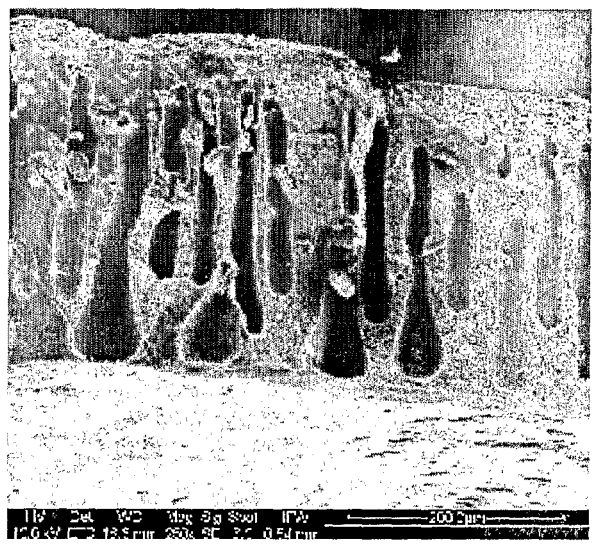
Figure 9H:

FIGS. 8A-8C are fluorescence microscopy pictures of reference membrane without neomycin groups challenged by *E. coli* and painted with DAPI (8A), and membrane with neomycin groups challenged by *E. coli* and painted with DAPI (8B) or PI (8C).

FIGS. 9A-9H are SEM pictures of membranes prepared from Polysulfone 1 (9A). Polysulfone 1 expanded (9B), Polysulfone 12 with mannose groups (9C), Polysulfone 14 with galactose groups (9D), Polysulfone 13 with neomycin groups (9E), Polysulfone 19 with phosphonic acid groups (9F), Polysulfone 18 with phosphonate ester groups (9G), and Polysulfone 10 with chloroethane groups (9H).

Figure 10A:
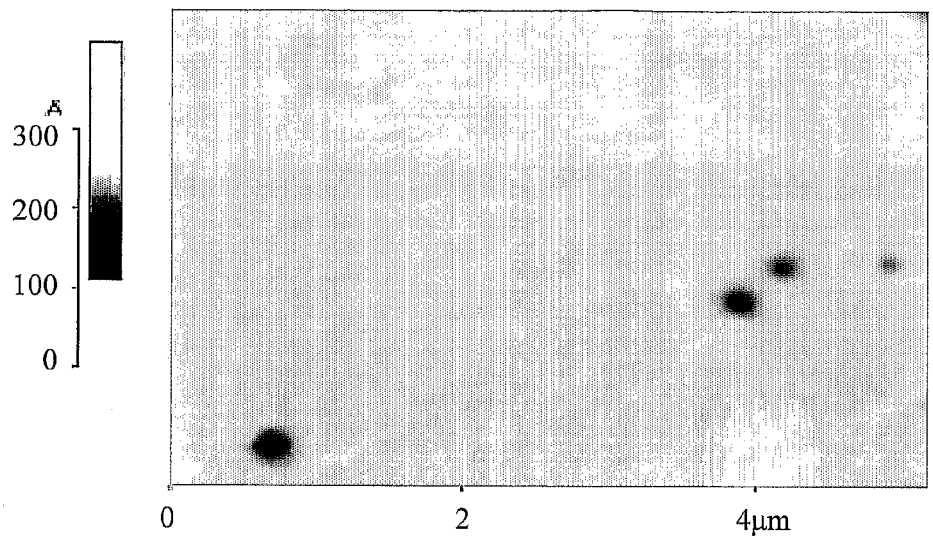
Figure 10B:
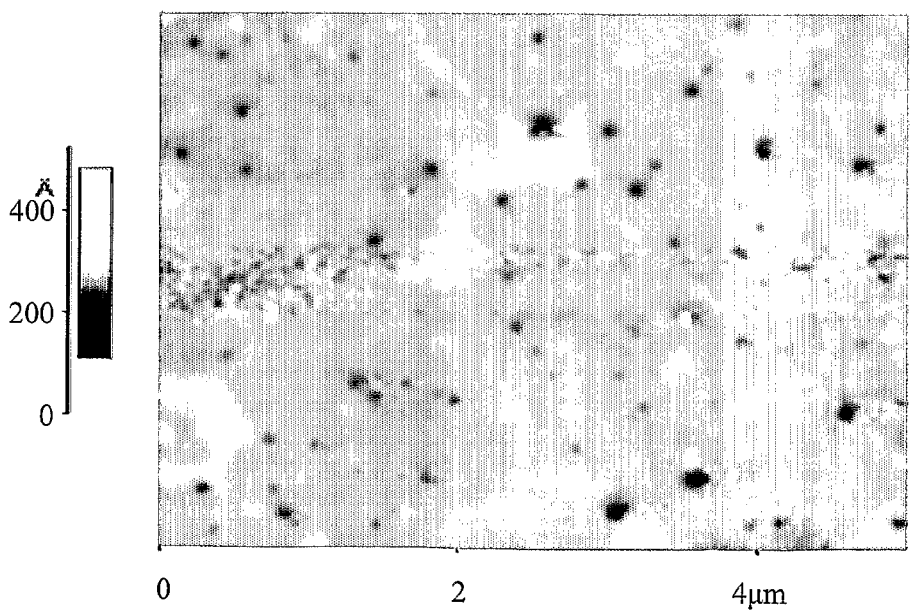
Figure 10C:
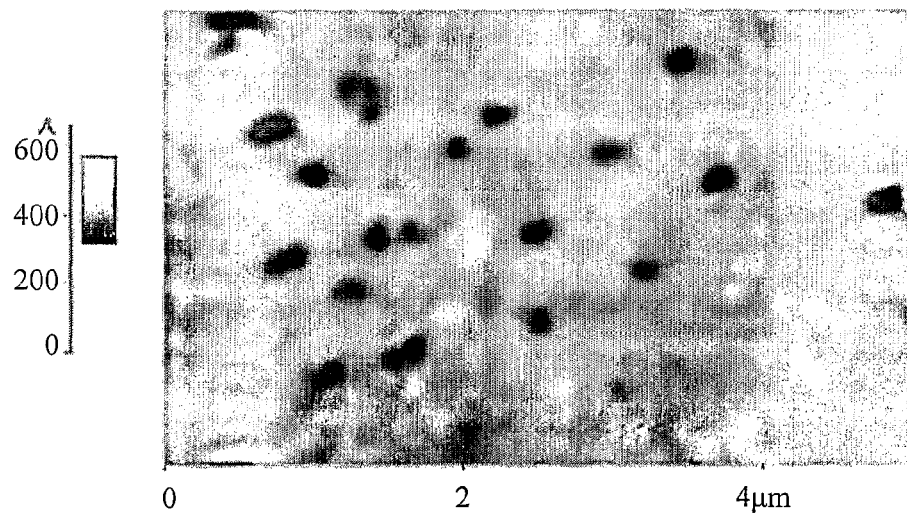

FIGS. 10A-10C depict AFM pictures of acid etching of nanoiron particles from Polysulfone 1 membrane at different periods of time: before etching (FIG. 10A, 20-50 nm), after 1 hr etching (FIG. 10B, 20-100 nm), and after 6 hr etching (FIG. 10C, 80-100 nm). The scale on the left of the figures shows the size of the pores.

Figure 11A:
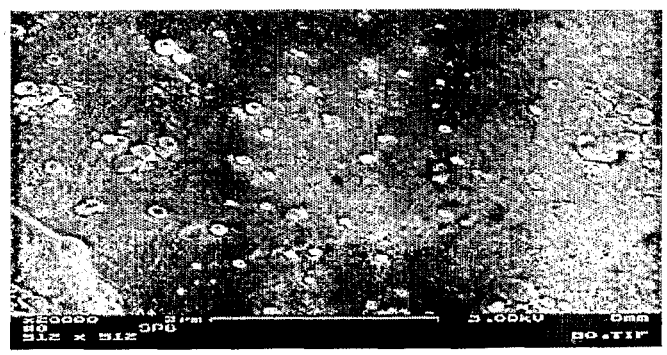
Figure 11B:
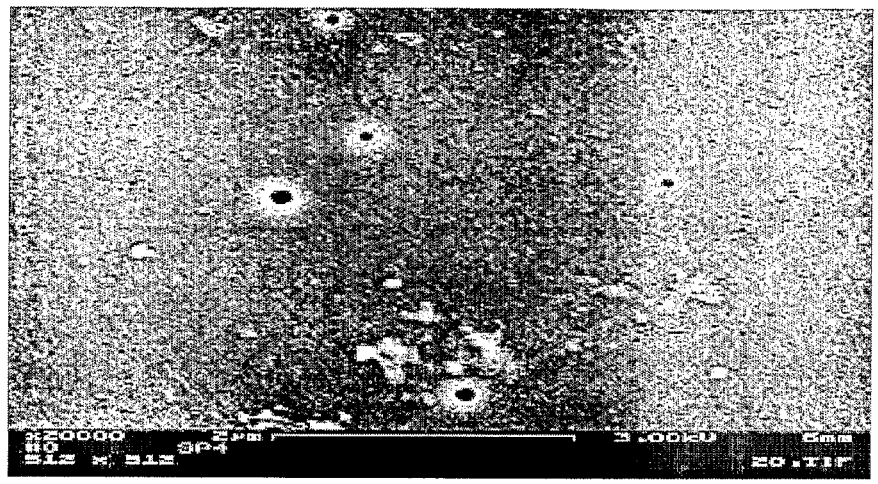
Figure 11C:
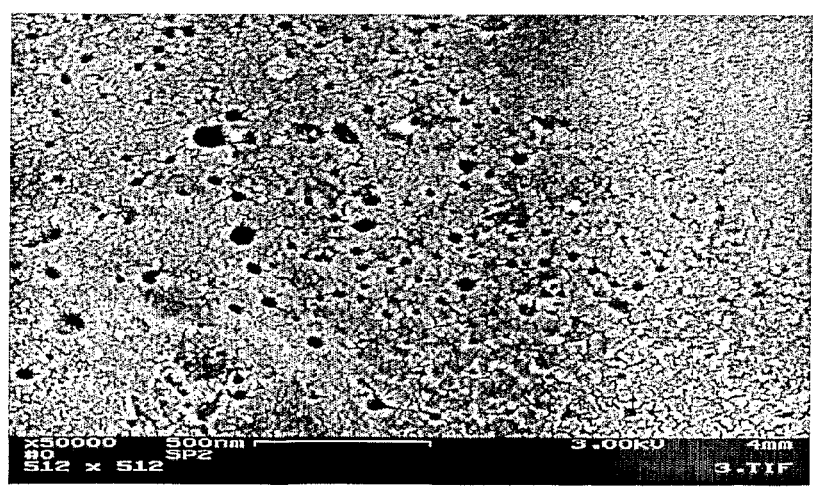

FIGS. 11A-11C depict HRSEM pictures of acid etching of nanoiron particles from Polysulfone 1 membrane at different periods of time: before etching (FIG. 11A, 50-100 nm), after 1 hr etching (FIG. 11B), and after 2 hr etching (FIG. 11C).

Figure 12A:
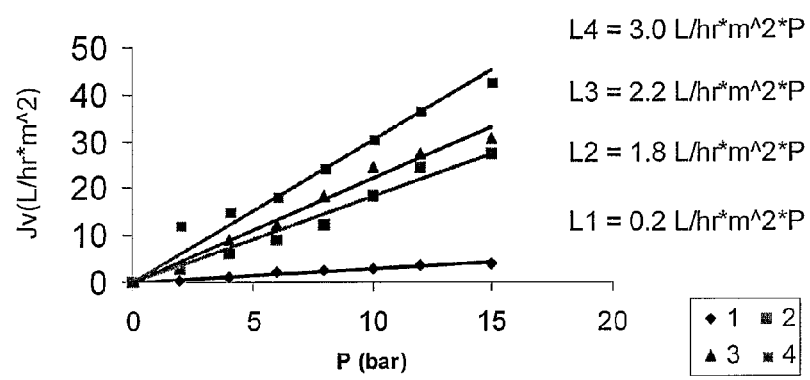
Figure 12B:
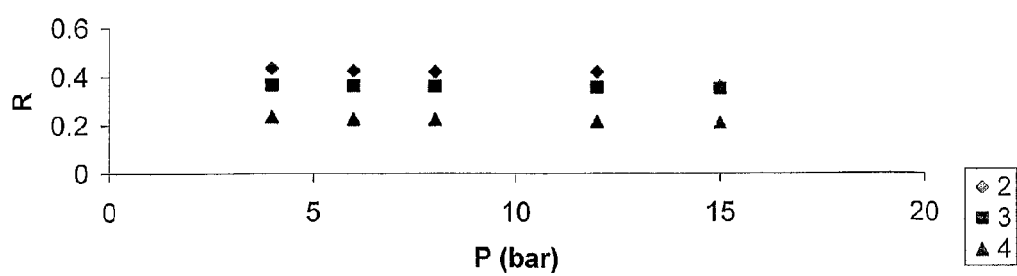

FIGS. 12A-12B show, respectively, the water flux and the rejection of $CaCl_2$ 0.1% measured before (diamonds) and after 1 hr (rectangles), 2 hr (triangles) and 6 hr (squares) hydrolysis.

Figure 13A:
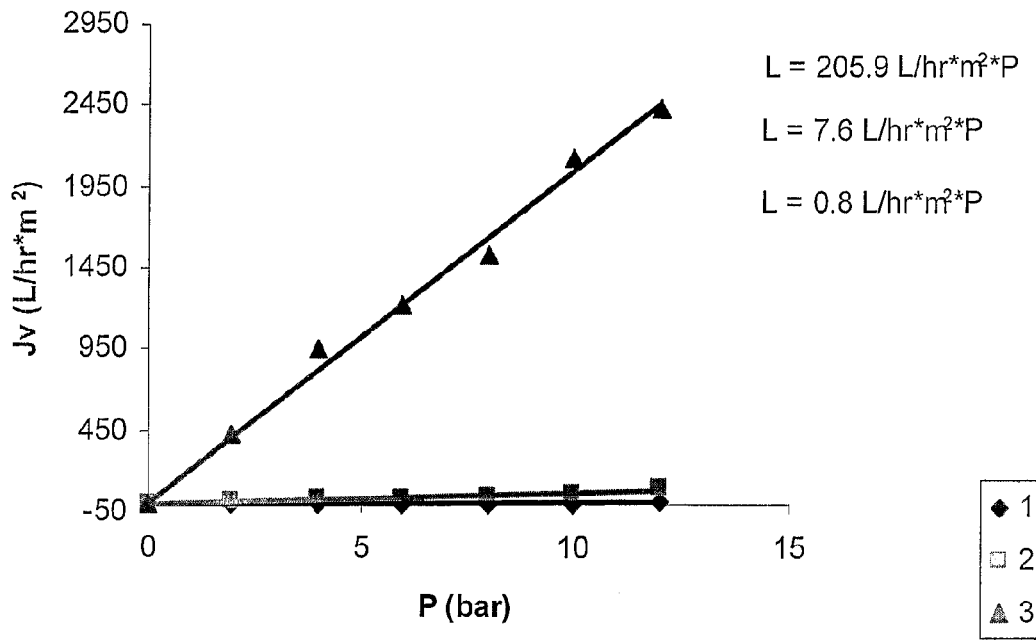
Figure 13B:
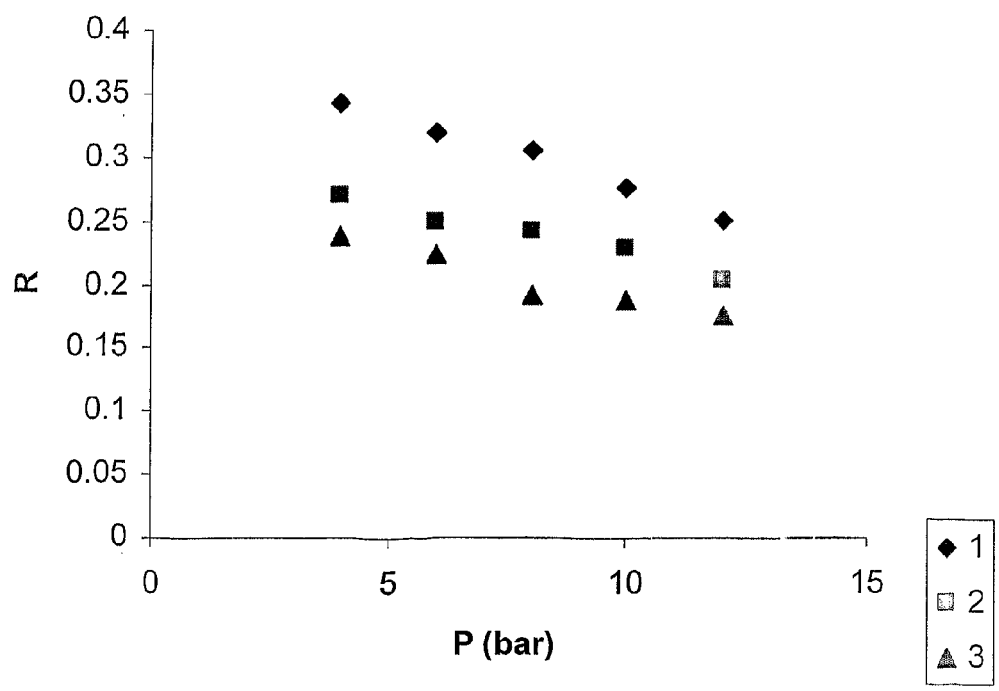

FIGS. 13A-13B, respectively, show water flux and rejection of $CaCl_2$ 0.1% measurements of monodispersed nanoporous membrane prepared from polysulfone crosslinked 7 by the base hydrolysis method before (diamonds) and after 6 hr hydrolysis with NaOH 2M (squares) and NaOH 4M (triangles).

FIGS. 14A-14D show water flux and rejection of $CaCl_2$ 0.1% (diamonds) and NaCl 0.1% (squares) measurements after 2 hr 2M NaCl hydrolysis (FIGS. 14A-14B, respectively), and after 12 hr 2M NaCl hydrolysis (FIGS. 14C-14D, respectively) by a membrane made of a blend of 80% Polysulfone 1 and 20% poly(styrene-co-maleic anhydride).

DETAILED DESCRIPTION OF THE INVENTION

In one aspect, the present invention relates to a modified polysulfone polymer substituted in one or more of the phenyl rings by functional groups selected from:
(i) —CO—$R_1$, wherein $R_1$ is —OH, halohydrocarbyloxy, a mono- or oligosaccharide residue or a derivative thereof;
(ii) —CON($R_2$)$R_3$, wherein $R_2$ is H or hydrocarbyl and $R_3$ is a mono- or oligosaccharide residue or a derivative thereof;
(iii) —B(O$R_2$)$_2$, wherein $R_2$ is H or hydrocarbyl;
(iv) —P(=O)(O$R_2$)$_2$, wherein $R_2$ is H or hydrocarbyl; and
(v) —CO—O—$R_4$—O—CO— linking two chains of the polymer backbone, wherein $R_4$ is alkylene;
provided that the modified polysulfone is not a carboxylated polysulfone comprising repeat units of the formula [-phenyl-C(CH$_3$)$_2$-phenyl-O-phenyl -SO$_2$-phenyl-O—] and two carboxy groups ortho to the sulfone in the two phenyl groups adjacent to the sulfone group.

The carboxylated polysulfone excluded from the scope of the present invention is the Polymer 4 in Example 3 hereinafter. It contains repeat units of the formula [-phenyl-C(CH$_3$)$_2$-phenyl-O-phenyl-SO$_2$-phenyl-O—] and two carboxy groups ortho to the sulfone in the two phenyl groups adjacent to the sulfone group. It was described in Guiver et al., U.S. Pat. No. 4,894,159.

According to the invention, the hydrocarbyl either as group $R_2$ or as part of the hydrocarbyloxy group $R_1$ may be a straight or branched, saturated or unsaturated, acyclic or cyclic, including aromatic, radical of 1-20, preferably 1-10, carbon atoms. The hydrocarbyl may be an alkyl radical, preferably of 2-8 carbon atoms such as, but not limited to, ethyl, propyl, butyl, hexyl, octyl, more preferably ethyl or octyl; or the hydrocarbyl may be alkenyl, e.g., vinyl; alkynyl, e.g., propargyl; cycloalkyl such as cyclopentyl and cyclohexyl; aryl such as phenyl or naphthyl; or an aralkyl group such as benzyl and phenethyl.

In the halohydrocarbyloxy group $R_1$, halo is a halogen atom such as F, Cl, Br and I, preferably Cl, and $R_1$ may be further substituted by one or more further groups or residues such as amino, silyl, hydroxyl, carboxy and esters thereof, thiol, carboxamido, phenoxy, or a residue of an agent selected from a sugar, drug, antibiotic, enzyme, peptide, DNA, RNA, NADH, ATP, or ADP. In some embodiments, $R_1$ is Cl—$C_2$-$C_8$ alkoxy, particularly Cl-octyloxy and Cl-ethoxy.

The monosaccharide according to the invention may be selected from pentoses and hexoses in the furanose or pyranose form and include, but are not limited to, arabinose, fructose, galactose, glucose, mannose, ribose and xylose. In preferred embodiments, the monosaccharide is galactose, glucose or mannose. The derivatives of monosaccharides include the ethers, e.g., $C_1$-$C_6$ alkyl, phenyl and benzyl ethers, the esters, e.g., with $C_1$-$C_6$ alkanoic acids, benzoic acid or phenylacetic acid, and isopropylidene and glycoside derivatives. In one embodiment, the derivative is an alkanoyl ester as exemplified by the tetrapivaloyl ester of galactose (Example 15). In another embodiment, $R_1$ is a mannose residue substituted by two isopropylidene groups (Example 11).

The oligosaccharide according to the invention may contain 2-10 monosaccharide residues as defined above and includes, without limitation, sucrose, or a derivative thereof as defined above for the monosaccharide derivatives.

In one embodiment of the invention, the monosaccharide or oligosaccharide derivative is an aminoglycoside antibiotic. These compounds contain an inositol moiety substituted with two amino or guanidino groups and with one or more sugars or aminosugars. The aminoglycosides that may be used according to the invention include, without limitation, gentamicin, neomycin, streptomycin, tobramycin, amikacin, and kanamycin. In one preferred embodiment, $R_3$ is neomycin.

In some preferred embodiments of the invention, the functional group is $COR_1$ and $R_1$ is OH, Cl—$C_2$-$C_8$ alkoxy, particularly Cl-octyloxy and Cl-ethoxy, or mannose substituted by two isopropylidene groups.

In other preferred embodiments of the invention, the functional group is —$CON(R_2)R_3$, wherein $R_2$ is H and $R_3$ is the residue of a monosaccharide selected from galactose, glucose or mannose or a derivative thereof, or the residue of an aminoglycoside antibiotic, preferably neomycin. Examples of monosaccharide derivatives include the esters with $C_2$-$C_6$ alkanoic acids such as tetrapivaloyl galactose.

In further preferred embodiments of the invention, the functional group is —$B(OR_2)_2$ and $R_2$ is H or $C_1$-$C_6$, preferably $C_4$, alkyl.

In still further preferred embodiments of the invention, the functional group is —$P(=O)(OR_2)_2$ and $R_2$ is H or $C_1$-$C_6$, preferably $C_2$, alkyl.

In yet other preferred embodiments of the invention, the functional group is —COO—$R_4$—OCO— crosslinking two different chains of the polysulfone polymer backbone through carboxy groups, and $R_4$ is $C_2$-$C_4$ alkylene, preferably ethylene.

According to the present invention, the polysulfone polymer may contain repeat units selected from:

-phenyl-$X_1$-phenyl-$SO_2$-phenyl-$X_2$—; and

-phenyl-$X_3$-phenyl-$X_4$-phenyl-$SO_2$-phenyl-$X_5$—;

wherein $X_1$ to $X_5$ are the same or different and each is —O—, —S—, —P(R)—, —P(=O)(R)—, —B(R)—, —N(R)—, or R', where R is aliphatic or aromatic $C_1$-$C_{20}$ hydrocarbyl optionally substituted by halogen or by a group containing a heteroatom selected from O, S, or N, and R' is aliphatic or aromatic $C_1$-$C_{20}$ hydrocarbylene optionally interrupted by one or more heteroatoms selected from O, S, P(R), P(O)(R), B(R), N(R), or substituted by halogen and/or by =O, =S, —P(R)$_2$, —P(=O)(R)$_2$, —B(R)$_2$, —N(R)$_2$ or aliphatic or aromatic $C_1$-$C_{20}$ hydrocarbyl; and one or more of the phenyl rings is substituted by at least one functional group (i) to (v) as defined above, and each phenyl ring is linked to the next phenyl ring at the ortho, meta or para position.

The $C_1$-$C_{20}$ hydrocarbyl or hydrocarbylene as defined above may be a straight or branched aliphatic radical such as alkyl or alkylene, alkenyl or alkenylene, a cyclic radical such as cycloalkyl or cycloalkylene or an aromatic radical such as phenyl or phenylene and naphthyl or naphthylene.

The hydrocarbyl radicals R may be unsubstituted or substituted by one or more atoms selected from halogen such as F, Cl, Br and I, preferably F, and one or more groups containing O, e.g., =O, S, e.g., =S, and N, e.g., $NH_2$.

The hydrocarbylene radical R' may be unsubstituted or substituted by one or more atoms selected from halogen such as F, Cl, Br and I, preferably F, and one or more groups containing O, e.g., =O, S, e.g., =S, P(R)$_2$, P(O)(R)$_2$, B(R)$_2$, N(R)$_2$ or aliphatic or aromatic $C_1$-$C_{20}$ hydrocarbyl as defined above, or intercalated by one or more heteroatoms —O— or —S— or by a group —P(R)—, —P(=O)(R)—, —B(R)— or —N(R)—. It should be noted that as used herein $C_1$-$C_{20}$ hydrocarbylene refers to the number of carbon atoms in each carbon chain between two phenyl groups, independent of their substitution or intercalation by heteroatoms or other groups.

Examples of radicals $X_1$ to $X_5$ include, without being limited to, —O—, —S—, straight or branched alkylene, e.g., —$CH_2$—, —$C(CH_3)_2$—, —$CH_2$—$(CH_2)_n$—$CH_2$—, wherein n is 0-10; straight or branched substituted alkylene such as —$CF_2$—, —$C(CF_3)_2$—, —C(=O), —CH(NRR)—, and —CH(PRR)— as part of an alkylene chain; -phenylene- and substituted phenylene.

In preferred embodiments of the invention, $X_1$, $X_2$, $X_4$ and $X_5$ are —O— and $X_3$ is —$C(CH_3)_2$— or —$C(CF_3)_2$—.

In one embodiment, the polysulfone polymer of the invention contains one functional group in one of the phenyl rings, preferably ortho to the sulfone group. In another embodiment, the polysulfone contains two or three identical or different functional groups in two different phenyl rings, preferably ortho to the sulfone.

In one preferred embodiment, the polysulfone polymer contains repeat units of the formula:

-phenyl-$X_1$-phenyl-$SO_2$-phenyl-$X_2$—; or wherein one or more of the phenyl rings is substituted by at least one functional group (i) to (v), $X_1$ and $X_2$ each is O or S, and each phenyl ring is linked to the next phenyl ring at the ortho, meta or para position.

In a more preferred embodiment, $X_1$ and $X_2$ are O and the two phenyl rings adjacent to the sulfone are substituted ortho to the sulfone by the same or different functional group (i) to (v). In a more preferred embodiment, the polysulfone polymer contains one —COOH group ortho to the sulfone in one of the phenyl groups adjacent to the sulfone and two further —COOH groups at ortho positions to the sulfone in the other phenyl ring adjacent to the sulfone, and is preferably the polysulfone identified herein as Polymer 6 (Example 5).

In another preferred embodiment, the polysulfone polymer contains repeat units of the formula:

-phenyl-$X_3$-phenyl-$X_4$-phenyl-$SO_2$-phenyl-$X_5$— wherein one or more of the phenyl rings is substituted by at least one functional group (i) to (v), $X_3$ is $C_2$-$C_8$, preferably $C_3$, alkyl, optionally substituted by halogen, preferably F, and $X_4$ and $X_5$ each is O or S; and each phenyl ring is linked to the next phenyl ring at the ortho, meta or para position.

In a more preferred embodiment, in the above polysulfone polymer $X_3$ is —$C(CH_3)_2$ and $X_4$ and $X_5$ are O and the two phenyl rings adjacent to the sulfone are substituted ortho to the sulfone by the same or different functional group (i) to (v). Examples of such polysulfones include; (i) the polysulfone wherein the two functional groups ortho to the sulfone in the two phenyl groups are identical and are selected from —COO—$(CH_2)_8$—Cl and —COO—$(CH_2)_2$—Cl, preferably the polysulfones herein identified as Polymer 8 (Example 7) and Polymer 10 (Example 9), respectively; (ii) the polysulfone wherein one of the two functional groups ortho to the sulfone in one of the two phenyl groups is —COOH and the other functional group is 2,3:5,6-di-O-isopropylidenemannofuranose ortho to the sulfone in the other phenyl ring, preferably the polysulfone herein identified as Polymer 12 (Example 11); (iii) the polysulfone wherein one functional group ortho to the sulfone in one of the two phenyl groups is —COOH and another functional group in the other phenyl ring is a neomycin residue, preferably the polysulfone herein identified as Polymer 13 (Example 12); (iv) the polysulfone wherein one functional groups ortho to the sulfone in one of the two phenyl groups is 2,3,4,6-tetra-O-pivaloyl-β-D-galactopyranosylaminocarbonyl and the other functional group is a β-D-galactopyranosylaminocarbonyl residue in the other phenyl ring, preferably the polysulfone herein identified as Polymer 14 (Example 13); (v) the polysulfone wherein the two functional groups ortho to the sulfone in the two phenyl groups are identical and are the β-D-galactopyranosylaminocarbonyl residue, preferably the polysulfone herein identified as Polymer 15 (Example 14); (vi) the polysulfone, containing the boronic acid functional group —B(OH)$_2$ ortho to the sulfone in one of the two phenyl groups adjacent to the sulfone, preferably the polysulfone herein identified as Polymer 16 (Example 15); and (vii) the polysulfone containing two identical phosphonic acid or ester group —P(=O)(OR$_2$)$_2$, wherein R$_2$ is H or C$_1$-C$_6$ alkyl, preferably ethyl, ortho to the sulfone in the two phenyl groups, preferably the polysulfones herein identified as Polymer 19 (Example 18) and Polymer 18 (Example 17), respectively; and (viii) the crosslinked polysulfone wherein the functional group is —COO—CH$_2$—CH$_2$—OCO— linking two different chains of the polysulfone polymer backbone through the positions ortho to the sulfone, preferably the polysulfone herein identified as Polymer 7 (Example 6).

In another more preferred embodiment, X$_3$ is —C(CF$_3$)$_2$— and X$_4$ and X$_5$ are O and the two phenyl rings adjacent to the sulfone are substituted ortho to the sulfone by the same or different functional group (i) to (v). Examples include: (i) the polysulfone polymer wherein the two functional groups ortho to the sulfone in the two phenyl groups are identical and are COOH, preferably the polysulfone herein identified as Polymer 5 (Example 4); (ii) the polysulfone wherein the two functional groups ortho to the sulfone in the two phenyl groups are identical and are selected from —COO—(CH$_2$)$_8$—Cl and —COO—(CH$_2$)$_2$—Cl, preferably the polysulfones herein identified as Polymer 9 (Example 8) and Polymer 11 (Example 10), respectively; (iii) the polysulfone containing identical boronic acid functional groups —B(OH)$_2$ or alkyl ester thereof ortho to the sulfone in the two phenyl groups adjacent to the sulfone, preferably the polysulfone herein identified as Polymer 17 (Example 16).

In another aspect, the present invention relates to membranes composed of a modified polysulfone polymer of the invention. These membranes are useful for reverse osmosis and microfiltration and particularly for nanofiltration or ultrafiltration.

As mentioned in the Background section above, polysulfone polymers of the art have many advantages: they operate in wide pH range, have excellent thermal and mechanical properties, resist compaction and present chlorine resistance. However, they are hydrophobic and have limited organic solvent resistance. Attempts have been made to improve the properties of polysulfones by introduction of carboxyl and sulfonic acid groups onto the backbone leading to hydrophilic and cation exchange membranes.

In the present invention, the polysulfones are modified by addition of charge, hydrophilic groups and groups with different functionalities leading to improvement of membrane performance. Some of the functional groups confer enhanced hydrophilicity. The modification is sought to match polymer structure to optimize the membrane for a desired performance regarding flux and selectivity. As shown herein in the examples, the membranes of the invention show similar rejection to salts in the regular nanofiltration region, while some of them demonstrate significantly higher flux.

The membranes of the present invention are characterized by a thickness in the range from 0.02 to 400 µm, preferably 2 µm.

The membranes of the invention are further characterized by homogeneous pore size in the range from 10 nm to 10 µm. The membranes with homogeneous pore size in the range from 10 to 100 nm, preferably 10 nm, are suitable for use in nanofiltration. The membranes with homogeneous pore size in the range from 100 nm to 1 µm, preferably 200 nm, are suitable for use in ultrafiltration. The membranes with homogeneous pore size in the range from 1 to 10 µm, preferably 2 µm, are suitable for use in microfiltration.

In a further aspect, the present invention also provides novel methods for the preparation of monodisperse nanoporous membranes. These methods are applied during the casting of the polymer membranes and allow formation of selective and monodispersed nanoholes.

The first method consists in preparation of the membrane under the presence of selective nanoparticles that organize themselves into the polymer network. The dissolution of the nanoparticles by a suitable solvent then creates membranes with organized and homogeneous nanopores.

The invention thus provides a method for preparation of a monodisperse nanoporous polymeric membrane with homogeneous pore size, comprising:

(i) preparing a polymeric membrane by immersion precipitation induced phase-inversion method;

(ii) introducing nanoparticles into the polymer network; and (iii) removing the nanoparticles by an agent capable of dissolving said nanoparticles, whereby a membrane with homogeneous pore size is obtained, the pore size of the membrane being determined by the size of the nanoparticles.

This method is suitable for modification of known commercial membranes as well as for the novel membranes of the invention. In preferred embodiments, the method is used for polysulfone membranes.

In one embodiment, the method is used for membranes made of a commercial polysulfone polymer such as, but not limited to, the commercial polysulfone herein identified as Polymer 1 containing the repeat unit of the formula:

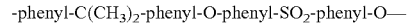

-phenyl-C(CH$_3$)$_2$-phenyl-O-phenyl-SO$_2$-phenyl-O—

In other embodiments, the method is used for preparations of membranes composed of the novel modified polysulfone polymers of the invention, for example the crosslinked polysulfone herein identified as Polymer 7.

In one preferred embodiment, steps (i) and (ii) are carried out concomitantly.

Any suitable nanoparticles can be used in the method. They may be nanoparticles of metal oxide, preferably Fe$_2$O$_3$; of a salt that can be dissolved by an acid or a base, leaving nanoholes in the membrane; or they can be nanoparticles of an organic compound that can be dissolved with water or an organic solvent.

In a more preferred embodiment, the nanoparticles are Fe$_2$O$_3$ nanoparticles. They are preferably prepared in situ by hydrolysis of FeCl$_3$ and the Fe$_2$O$_3$ nanoparticles are arranged by a magnetic field into the polymer network. The nanoparticles are removed by acid etching, for example, with hydrochloric acid.

In one preferred embodiment, the present invention thus provides a method for preparation of a monodispersed nanoporous polysulfone membrane with homogeneous pore size, comprising:

(i) preparing a casting solution comprising a polysulfone, Fe$_2$O$_3$ nanoparticles prepared in situ by hydrolysis of FeCl$_3$, and a solvent;

(ii) casting membrane samples onto a glass surface, evaporating the solvent and immersing the cast film together with the glass plate into ice-cold water;

(iii) washing the thin polymeric film separated out from the glass plate and press compacting the wet membrane; and (iv) removing the $Fe_2O_3$ nanoparticles by etching with HCl;

whereby the monodispersed nanoporous polysulfone membrane with homogeneous pore size is obtained, the pore size of the membrane being determined by the size of the $Fe_2O_3$ nanoparticles.

Any suitable solvent may be used. In one preferred embodiment, the solvent is N-methylpyrrolidone.

The invention also encompasses membranes obtained by the above method for use in reverse osmosis, nanofiltration or ultrafiltration. These membranes have homogeneous pore size in the range from 10 nm to 10 μM, preferably 20-100 nm or 50-100 nm.

The invention further provides a second method for preparation of a monodispersed nanoporous polymeric membrane with homogeneous pore size comprising crosslinking of the carboxylic groups of a carboxylated polysulfone with a crosslinking agent, followed by hydrolysis.

The crosslinking agent may be an aliphatic, aromatic or heterocyclic compound having two or more functional groups selected from OH, SH, $NH_2$, silyl, $B(OH)_2$, and $P(O)(OH)_2$, or a mixture thereof.

In preferred embodiments, the crosslinking agent is a difunctional aliphatic compound such as, but not limited to, an alkylene glycol, alkylenediamine, alkylene dithiol, alkylene disilyl, boronic acid-alkylene-phosphonic acid, or boronic acid-alkylene-amine, wherein the alkylene has 2-8 carbon atom. In a more preferred embodiment, the crosslinking agent is an alkylene glycol, most preferably ethylene glycol.

When an alkylene glycol is used as the crosslinking agent, the hydrolysis is carried out with a strong base, preferably NaOH, after casting and compacting the membrane. Base hydrolysis of ethylene glycol ester bonds by NaOH at different concentrations and different periods of time achieve monodispersed nanopores at size of the crosslinker.

In one embodiment of the second method, the hydrolysis leads to partial cleavage of the crosslinkage motifs and induces formation of numerous monodispersed nanopores, all of them with uniform size, the pore size being determined by the degree of crosslinking cleavage.

In another embodiment of the second method, the hydrolysis is partial and causes partial cleavage of the attachment between the polymer chains on one side of the crosslinking motif, thus causing formation of the membrane with monodispersed nanopores and pendant arms (after the hydrolysis) directed in space with the functional groups at each arm terminus. This will allow dipolar interaction with molecules in the solutions and prevent them from coming close to the holes. The membranes thus obtained induce dielectric exclusion and allow selective nanofiltration. In one embodiment, half of the crosslinked molecule is removed so that a pendant group remains swirling with a functional group at the terminus allowing both the formation of monodisperse holes and a chain with a different length and a functional group at the end of such chain for dipolar interaction.

A third method of the invention relates to the preparation of a polymeric membrane from a blend of two polymers by base hydrolysis of anhydride bonds inside of a membrane composed from the two polymers.

The method comprises preparation of a homogeneous casting solution comprising a polysulfone and a copolymer comprising anhydride groups, e.g. polystyrene-co-maleic anhydride) in an organic solvent, casting the solution followed by solvent evaporation at 300° C., immersing the membrane in cold water, compacting the membrane and subjecting to base hydrolysis thus producing carboxylic sodium salt groups and converting them into carboxylic groups by acidification. The hydrolysis time has an influence on the membrane properties.

In one preferred embodiment, the blend comprises a polysulfone (a commercial polysulfone or a polysulfone of the invention) and poly(styrene-co-maleic anhydride).

The membranes of the invention are suitable for use in reverse osmosis, nanofiltration or ultrafiltration procedures, particularly for purification of water such as for treatment of industrial, agricultural or municipal wastewater.

The different polymers for membrane preparation according to the new techniques of the invention were successfully synthesized and characterized by NMR, IR and $^{13}C$-(CP-MAS) NMR techniques. The SEM and AFM techniques were used to determine the change in pore size and pore size distribution on membrane surfaces before and after acid etching and base hydrolysis times.

The membranes were developed and presented high potential for the water treatment applications. The synthesized membranes presented rejection for monovalent ions in the range of 18-50% and for multivalent ions in the range of 20-60%.

The membranes prepared in accordance with the invention have larger operation pressures and higher water fluxes, while keeping on same rejection as the commercial membranes. The comparison was made with commercial membranes, which have same or very similar polymer structures and prepared by phase-inversion method. It was shown that the properties of prepared membranes were strongly dependent on etching and hydrolysis times, allowing the use of these membranes in accordance with our purposes. We have also seen that homogeneity in pore size distribution can be significantly improved using a base hydrolysis of crosslinked polymer units.

The invention will now be illustrated by the following non-limiting Examples.

EXAMPLES

Materials:

N-methyl-2-pyrrolidone (NMP) was purchased from Aldrich and fractionally distilled from barium oxide under reduced pressure (20 mmHg). THF anhydrous was purchased from Aldrich and distilled under nitrogen from Na/K. Pyridine was purchased from Fluka and distilled from barium oxide under nitrogen. n-Butyl lithium was obtained commercially from Aldrich as a 1.6 M solution in hexane and used as received. Thionyl chloride was purchased from Aldrich and distilled under nitrogen. Ethylene glycol was purchased from Aldrich, dried with $MgSO_4$ and distilled under vacuum. Methanol anhydrous of analytical grade was purchase from Aldrich and used as received. Polysulfone polymer (1) 20,000 of analytical purity was obtained from Aldrich and used as received. All the polymers were synthesized from commercially available 2,2-bis(4-hydroxyphenyl)-1,1,1-3,3,3-hexafluoropropane or hydroquinone and bis(4-fluorophenyl) sulfone obtained from Aldrich. Cesium fluoride of analytical grade was purchased from Aldrich and dried with a heating gun. 8-chloro-1-octanol, 1-chloroethanol, 2,3:5,6-Di-O-isopropylidenemannofuranose, 2,3,4,6-tetra-O-pivaloyl-β-D-galactopyranosylamine, tributyl borate, diethylchlorophosphate, sodium methoxide and DMSO of analytical grade were purchased from Aldrich and used as received. The neomycin in the salt form was purchased from Aldrich and neutralized with sodium methoxide. NaCl, $CaCl_2$, 2-naphthol-3,6-disulfonic acid disodium salt, polyethyleneglycol (PEG) of 600, 1,000, 4,000, 10,000 and 20,000 Da, polyvinyl alcohol (PVA) of 130,000 Da and polyacrylic acid (PAA) of 5,000 Da of analytical grade were purchased from Aldrich and used as received. Polystyrene-co-maleic anhydride copolymer (Mn=1,600) of analytical purity was purchased from Aldrich and used as received. DMSO, hydrochloric acid and sodium hydroxide solutions, NaCl and $CaCl_2$ salts of analytical purity were obtained from Aldrich and used as received.

Example 1

Preparation of Polyfluorosulfone-Polymer 2

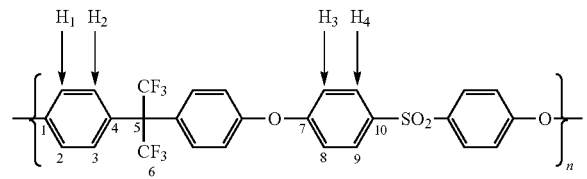

Into a 50 ml Schlenk containing a reflux condenser and a magnetic stirrer 1.824 g (12 mmol) of cesium fluoride were placed, and the salt was dried by heating the flask with a heating gun to 70° C. under a thin stream of nitrogen. To the flask was added 1.008 g (3 mmol) of 2,2-bis(4-hydroxyphenyl)-1,1,1-3,3,3-hexafluoro-propane and 0.762 g (3 mmol) of bis(4-fluorophenyl) sulfone, and 7 ml of NMP under nitrogen, and the reactants were dissolved with stirring at room temperature. The mixture was then heated with stirring in oil bath kept at 160° C. for 3 h under nitrogen. The polymer was isolated by pouring the reaction mixture into water. The precipitated polymer was collected, washed with hot water and hot methanol, and dried at 50° C. under vacuum. The final product obtained, Polymer 2, was a white solid (1.6 g, yield 97%) and had the following characteristics:

$^1$H NMR (500 MHz, $CDCl_3$) δ: 7.89 (d, $^3$J=9 Hz, 4H, $H_4$), 7.38 (d, $^3$J=8 Hz, 4H, $H_2$), 7.07 (d, $^3$J=9 Hz, 4H, $H_3$), 7.00 (d, $^3$J=8 Hz, 4H, $H_1$) ppm.

$^{13}$C NMR (75 MHz, $CDCl_3$) δ: 160.9 (C10), 156.2(C4), 136.6(C7), 132.3(C3), 130.2(C9), 129.5(C1), 125.4(C6), 119.5(2), 119(C8), 64.9(C5) ppm.

Mn=62000, Mw=89800, Mw/Mn=1.44, n=113.

Example 2

Preparation of Hydroquinone Based Polysulfone-Polymer 3

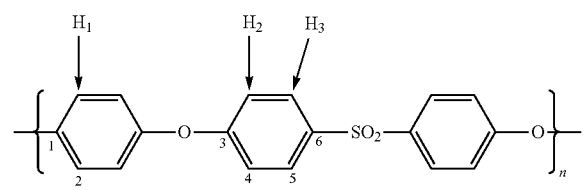

Into a 50 ml Schlenk containing a reflux condenser and a magnetic stirrer 1.824 g (12 mmol) of cesium fluoride were placed, and the salt was dried by heating the flask with a heating gun to 70° C. under a thin stream of nitrogen. To the flask was added 0.33 g (3 mmol) of hydroquinone and 0.762 g (3 mmol) of bis(4-fluoro-phenyl) sulfone, and 7 ml of NMP under nitrogen, and the reactants were dissolved with stirring at room temperature. The mixture was then heated with stirring in oil bath kept at 160° C. for 3 h under nitrogen. The polymer was isolated by pouring the reaction mixture into water. The precipitated polymer was collected, washed with hot water and hot methanol, and dried at 50° C. under vacuum. The final product, Polymer 3, obtained was a white solid (1.9 g, yield 98%) and had the following characteristics:

$^1$H NMR (300 MHz, $C_2Cl_4D_2$) δ: 7.81 (d, $^3$J=7.72 Hz, 4H, $H_3$), 7.03 (s, 4H, $H_1$), 6.99 (d, $^3$J=7.72 Hz, 4H, $H_2$) ppm.

$^{13}$C NMR (125 MHz, $C_2Cl_4D_2$) δ: 163.5 (C6), 153.3(C1), 137.0(C3), 131.5(C5), 123.8(C2), 119.4(C4) ppm.

Mn=71300, Mw=114300, Mw/Mn=1.6, n=220.

Example 3

Preparation of Polysulfone Carboxylated-Polymer 4

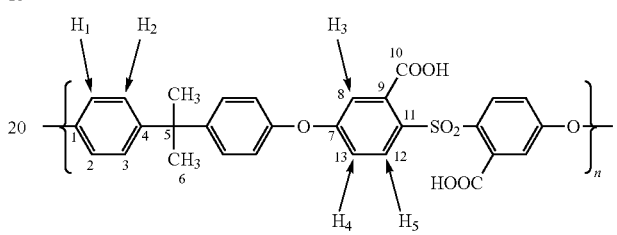

The dried polysulfone of Formula 1 [see the background of the invention] was placed into a 100 ml three necked Schlenk equipped with a dropping funnel, a thermometer, $N_2$ inlet and a magnetic stirrer. 2 g (0.0045 mol) polysulfone 1 was dissolved in THF anhydrous (75 ml) and the temperature of the solution was reduced to −50° C. n-Butyl lithium (2.5 mol equiv., 0.0112 mol, 7.03 ml of 1.6M in hexane) diluted with THF (10 ml) was added dropwise over 12 minutes, during which time mixture turned a red-brown colour. The polymer was quenched after 30 minutes by the slow addition (10 g) of $CO_{2(s)}$ during 30 min, and then warmed slowly to room temperature. The THF was evaporated on Schlenk line to produce the white slurry. The polymer was precipitated into dilute aqueous HCl (10%) solution, washed with distilled water and finally dried at 50° C. in vacuum oven to obtain Polymer 4 as a white solid (2 g, yield 98%), with the following characteristics:

$^1$H NMR (500 MHz, DMSO) δ: 8.03 (d, $^3$J=9 Hz, 2H, $H_5$), 7.31 (d, $^3$J=8 Hz, 4H, $H_2$), 7.16 (dd, $^3$J=3 Hz, $^5$J=9 Hz, 2H, $H_4$), 7.09 (d, $^4$J=3 Hz, 2H, $H_3$), 7.07 (d, $^3$J=8 Hz, 4H, $H_1$), 1.61(s, 6H, $CH_3$), 13.9 (br, 2H, OH) ppm.

$^{13}$C NMR (125 MHz, DMSO) δ: 167.7 (C10), 161.3(C11), 152.4(C4), 147.4(C1), 136.8(C9), 133.5(C12), 132.5(C7), 128.9(C3), 120.1(C2), 118.2(C13), 116.9(C8), 42.3(C5), 30.8(C6) ppm.

IR (KBr): 3536 (O—H str.), 1725 (C=O str, carbonyl group).

Example 4

Preparation of Polyfluorosulfone Carboxylated-Polymer 5

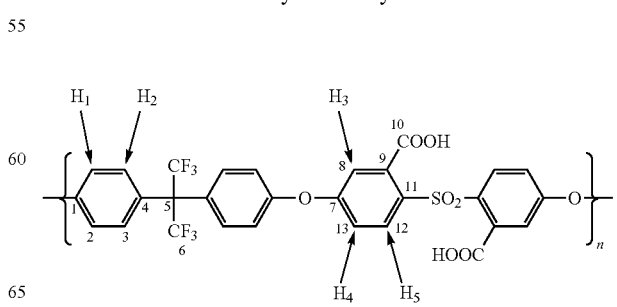

The dried polyfluorosulfone 2 of Example 1 above was placed into a 100 ml three necked Schlenk equipped with a dropping funnel, a thermometer, $N_2$ inlet and a magnetic stirrer. 2 g (0.0036 mol) polyfluorosulfone was dissolved in THF anhydrous (75 ml) and the temperature of the solution was reduced to −50° C. n-Butyl lithium (2.5 mol equiv., 0.0091 mol, 5.68 ml of 1.6M in hexane) diluted with THF (10 ml) was added dropwise over 12 minutes, during which time the mixture turned a red-brown colour. The polymer was quenched after 30 minutes by the slow addition (10 g) of $CO_{2(S)}$ during 30 min, and then warmed slowly to room temperature. The THF was evaporated on a Schlenk line to afford the white slurry. The polymer was precipitated into dilute aqueous HCl (10%) solution, washed with distilled water and finally dried at 50° C. in vacuum oven to obtain a white solid (1.82 g, yield 88%):

$^1$H NMR (500 MHz, DMSO) δ: 8.11 (d, $^3$J=8 Hz, 2H, $H_5$), 7.45 (d, $^3$J=9 Hz, 4$H_2$) 7.32 (dd, $^3$J=2 Hz, $^5$J=8 Hz, 2H, $H_4$), 7.29 (d, $^4$J=2 Hz, 2H, $H_3$), 7.26 (d, $^3$J=9 Hz, 4H, $H_1$), 13.9 (br, 2H, OH) ppm.

$^{13}$C NMR (125 MHz, DMSO) δ: 167.5 (C10), 160.0(C11), 155.7(C4), 137(C9), 133.5(C12, C7), 132.2(C3), 128.6(C1), 125.3(C6), 119.9(C2), 119.3(C13), 118.3(C8), 63.6(C5) ppm.

IR (KBr): 3523 (O—H str.), 1733 (C=O str, carbonyl group).

Example 5

Preparation of Hydroquinone-Based Polysulfone Carboxylated-Polymer 6

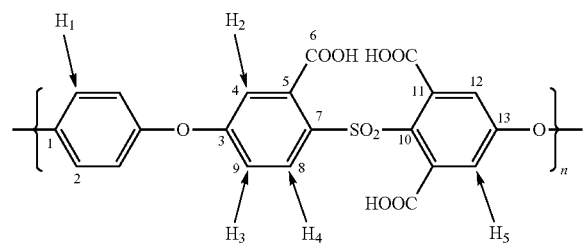

The dried hydroquinone-based polysulfone 3 of Example 2 above was placed into a 100 ml three necked Schlenk equipped with a dropping funnel, a thermometer, $N_2$ inlet and a magnetic stirrer. 1 g (0.0030 mol) hydroquinone-based polysulfone was dissolved in THF anhydrous (50 ml) and the temperature of the solution was reduced to −50° C. n-Butyl lithium (3 mol equiv., 0.0092 mol, 5.78 ml of 1.6M in hexane) diluted with THF (10 ml) was added dropwise over 12 minutes, during which time the mixture turned a deep brown colour. The lithiated polymer solution was stirred for 30 min and then 10 g of carbon dioxide solid was added into the solution during 30 min, and then warmed slowly to room temperature. The THF was evaporated on a Schlenk line to afford the white slurry. The polymer was recovered by precipitating the resulting whitish slurry into dilute aqueous HCl (10%) solution, and then washing it with distilled water and finally drying at 50° C. in vacuum oven to obtain Polymer 6 as a white solid (0.9 g, yield 63%).

$^1$H NMR (300 MHz, DMSO) δ: 8.08 (d, $^3$J=9 Hz, 1H, $H_4$), 7.90 (d, $^3$J=14 Hz, 1H, $H_2$) 7.23 (s, 2H, $H_5$), 7.18 (dd, $^3$J=9 Hz, $^4$J=14 Hz, 1H, $H_3$), 7.16 (s, 4H, $H_1$), 13.9 (br. 3H, OH) ppm.

$^{13}$C NMR (75 MHz, DMSO) δ: 166.4 (C6), 160.4(C3, C7), 151.1(C13), 136.1(C5), 135.3(C10), 132.7(C8), 132.6(C11), 129.3(C4), 121.5(C1), 121.4(C2), 117.5(C12), 116.8(C9) ppm.

IR (KBr): 3459 (O—H str.), 1731 (C=O str, carbonyl group).

Mn=49300, Mw=106400, Mw/Mn=2.15, n=108.

Example 6

Preparation of Crosslinked Polysulfone-Polymer 7

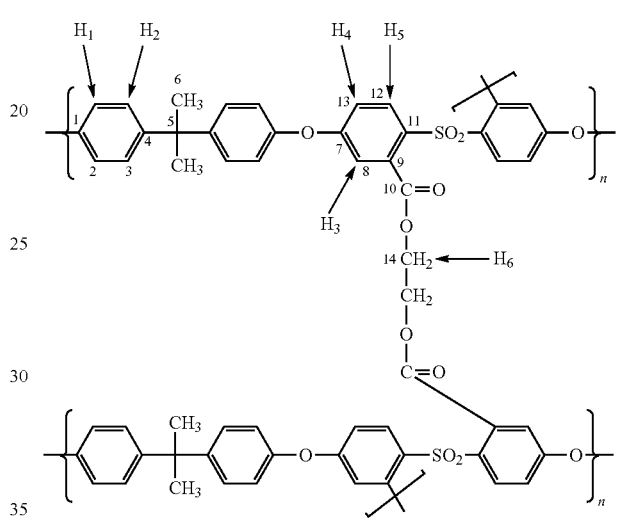

1 g (0.0018 mol, equivalent weight=555 gram per mole repeat unit) polymer 4 of Example 3 above was placed into a 50 ml Schlenk and dissolved in THF anhydrous (30 ml). The Schlenk was connected to a trap with a NaOH solution (2M) for absorption of HCl and $SO_2$. Then anhydrous pyridine 0.5 ml (0.0062 mol), and $SOCl_2$ 0.3 ml (0.0041 mol) were added dropwise at room temperature into the Schlenk. The temperature was slowly increased and maintained at 60° C. for 3 h. Excess of $SOCl_2$ and THF were distilled off under vacuum at 50° C. for 30 minutes, to obtain the resulting crude acid chloride polymer. Then freshly distilled THF (30 ml) was added to dissolve the acylated polymer. After 30 minutes needed for complete dissolution of polymer, a solution of ethylene glycol 0.1 ml (0.0018 mol) in 10 ml THF anhydrous was added dropwise to the polymer solution at room temperature under vigorous stirring, and allowed to stir for 24 h. The polymer was recovered by precipitating into distilled water, washing several times and finally dried at 50° C. in vacuum oven to obtain Polymer 7 as a brown solid (1 g, yield 90%), with the following characteristics:

$^1$H NMR (500 MHz, DMSO) δ: 7.88 (d, $^3$J=9 Hz, 2H, $H_5$), 7.04 (m, 12H, $H_1$, $H_2$, $H_3$, $H_4$), 4.4 (s, 4H, $H_6$), 1.61 (s, 6H, $CH_3$) ppm.

$^{13}$C—(CP-MAS) NMR:120 ppm ($\Delta v_{1/2}$=1500 Hz) aromatic ring, 64 ppm ($\Delta v_{1/2}$=375 Hz) ethylene group.

IR (KBr): 2966-2926 (ethylene group, aliphatic C—H str.), 1737 (C=O str, ester group).

Example 7

Preparation of Polysulfone with Chlorooctane Groups-Polymer 8

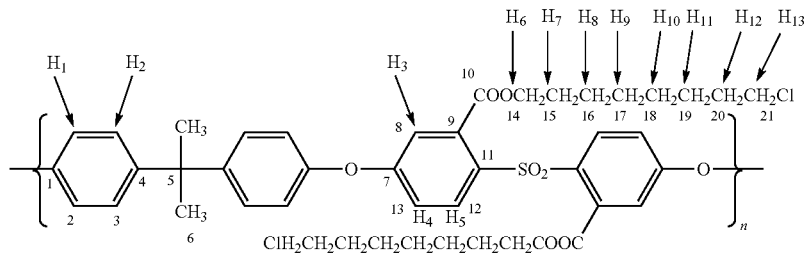

1 g (0.0018 mol, equivalent weight=555 grain per mole repeat unit) polymer 4 was placed into a 50 ml Schlenk and dissolved in THF anhydrous (30 ml). The Schlenk was connected to a trap with a NaOH solution (2M) for absorption of HCl and $SO_2$. Then anhydrous pyridine 0.5 ml (0.0062 mol), and $SOCl_2$ 0.3 ml (0.0041 mol) were added dropwise at room temperature into the Schlenk. The temperature was slowly increased and maintained at 60° C. for 3 h. Excess of $SOCl_2$ and THF were distilled off under vacuum at 50° C. for 30 minutes, to obtain the resulting crude acid chloride polymer. Then freshly distilled THF (30 ml) was added to dissolve the acylated polymer. After 30 minutes needed for complete dissolution of polymer, a solution of excess 8-chloro-1-octanol 1.27 ml (2 mol.eq, 0.0075 mol) was added dropwise to the polymer solution at room temperature under vigorous stirring, and allowed to stir for 24 h. The polymer was recovered by precipitating into distilled water. The product purification was made by dissolution in hot $CH_2Cl_2$, precipitation in ethanol and drying at 50° C. in vacuum oven to obtain Polymer 8 as a brown solid (1.52 g, yield 98%).

$^1$H NMR (500 MHz, DMSO) δ: 7.91 (d, $^3J$=9 Hz, 2H, 1-$H_5$), 7.31 (d, $^3J$=8 Hz, 4H, $H_2$), 7.16 (m, 4H, $H_3$, $H_4$), 7.04 (d, $^3J$=8 Hz, 4H, $H_1$) 4.15 (tr, $^3J$=6 Hz, 4H, $H_6$), 3.52 (br, 4H, $H_{13}$), 1.67 (s, 6H, $CH_3$), 1.18 (m, 24H, $H_7$, $H_8$, $H_9$, $H_{10}$, $H_{11}$, $H_{12}$) ppm.

$^{13}$C NMR (125 MHz, DMSO) δ: 165.2 (C10), 160.7(C11), 152 (C4), 146.8(C1), 134.7(C9), 132.3(C12), 132.1(C7), 128.1(C3), 119.2(C2), 118.2(C13), 117.2(C8), 65.5(C14), 44.7(C21), 41.8(C5), 31.7(C20), 30.2(C6), 27.9, 27.6, 27.3, 25.8, 24.7 (C15, C16, C17, C18, C19) ppm.

Mn=134400, Mw=212200, Mw/Mn=1.58, n=163.

Example 8

Preparation of Polyfluorosulfone with Chlorooctane Groups-Polymer 9

1 g (0.0015 mol, equivalent weight=666 gram per mole repeat unit) polymer 5 was placed into a 50 ml Schlenk and dissolved in THF anhydrous (30 ml). The Schlenk was connected to a trap with a NaOH solution (2M) for absorption of HCl and $SO_2$. Then pyridine anhydrous 0.5 ml (0.0062 mol), and $SOCl_2$ 0.3 ml (0.0041 mol) were added dropwise at room temperature into the Schlenk. The temperature was slowly increased and maintained at 60° C. for 3 h. Excess of $SOCl_2$ and THF were distilled off under vacuum at 50° C. for 30 minutes, the resulting crude acid chloride polymer. Then freshly distilled THF (30 ml) was added to dissolve the acylated polymer. After 30 minutes needed for complete dissolution of polymer, a solution of excess 8-chloro-1-octanol 1.05 ml (2 mol.eq, 0.0062 mol) was added dropwise to the polymer solution at room temperature under vigorous stirring, and allowed to stir for 24 h. The polymer was recovered by precipitating into distilled water. The product purification was made by dissolution in hot $CH_2Cl_2$, precipitation in ethanol and drying at 50° C. in vacuum oven to obtain Polymer 9 as a brown solid (1.39 g, yield 95%) with the following characteristics:

$^1$H NMR (500 MHz, DMSO) δ: 7.97(d, $^3J$=8 Hz, 2H, $H_5$), 7.44 (d, $^3J$=8 Hz, 4H, $H_2$), 7.31(m, 4H, $H_3$, $H_4$), 7.22(d, $^3J$=8 Hz, 4H, $H_1$), 4.17 (tr, $^3J$=6 Hz, 4H, $H_6$), 3.52 (br, 4H, $H_{13}$), 1.25 (m, 24H, $H_7$,$H_8$,$H_9$,$H_{10}$,$H_{11}$,$H_{12}$) ppm.

$^{13}$C NMR (125 MHz, DMSO) δ: 165.3 (C10), 159.7(C11), 155.3(C4), 134.9(C9), 133.2(C7), 132.5(C12), 131.7(C3), 128.4(C1), 124.9(C6), 119.5(C2), 118.4(C8,C13), 65.8(C14), 63.3(C5), 44.9(C21), 31.8(C20), 28.1, 27.8, 27.4, 25.9, 24.9(C15,C16,C17,C18,C19) ppm.

Mn=91500, Mw=183700, Mw/Mn=2.00, n=98.

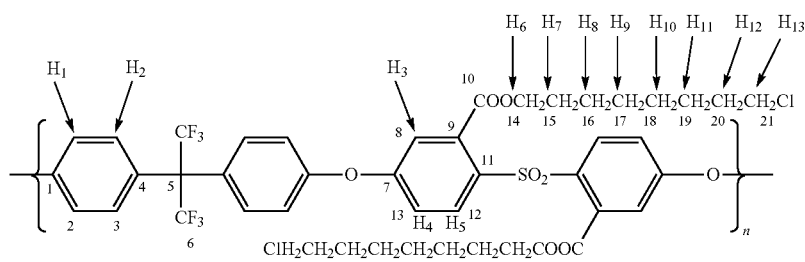

Example 9

Preparation of Polysulfone with Chloroethane Groups—Polymer 10

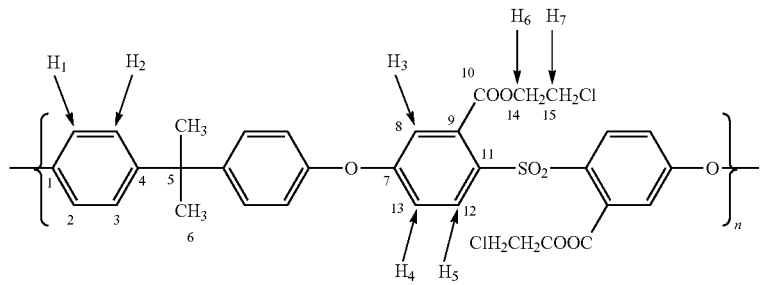

1 g (0.0018 mol, equivalent weight=555 gram per mole repeat unit) polymer 4 of Example 3 above was placed into a 50 ml Schlenk and dissolved in THF anhydrous (30 ml). The Schlenk was connected to a trap with a NaOH solution (2M) for absorption of HCl and $SO_2$. Then anhydrous pyridine 0.5 ml (0.0062 mol), and $SOCl_2$ 0.3 ml (0.0041 mol) were added dropwise at room temperature into the Schlenk. The temperature was slowly increased and maintained at 60° C. for 3 h. Excess of $SOCl_2$ and THF were distilled off under vacuum at 50° C. for 30 minutes, to obtain the resulting crude acid chloride polymer. Then freshly distilled THF (30 ml) was added to dissolve the acylated polymer. After 30 minutes needed for complete dissolution of polymer, a solution of excess 1-chloroethanol 0.5 ml (2 mol.eq, 0.0075 mol) was added dropwise to the polymer solution at room temperature under vigorous stirring, and allowed to stir for 24 h. The polymer was recovered by precipitating into distilled water, washing with ethanol and finally dried at 50° C. in vacuum oven to obtain Polymer 10 as a brown solid (1.1 g, yield 91.66%).

$^1$H NMR (500 MHz, DMSO) δ: 7.94 (d, $^3J$=9 Hz, 2H, $H_5$), 7.35 (d, $^3J$=8 Hz, 4H, $H_2$), 7.23(m, 4H, $H_3$,$H_4$), 7.09(d, $^3J$=8 Hz, 4H, $H_1$), 4.49 (br, 4H, $H_6$), 3.8 (br, 4H, $H_7$), 1.65 (s, 6H, $CH_3$) ppm.

$^{13}$C NMR (125 MHz, DMSO) δ: 165.6 (C10), 161.4(C11), 152(C4), 147.4(C1), 134.4(C9), 133(C12), 131.9(C7), 128.7 (C3), 120.1($C_2$), 118.7(C13), 117.2(C8), 65.8(C14), 42.2(C15, C5), 30.6(C6) ppm.

Mn=18000, Mw=29600, Mw/Mn=1.64, n=28.

Example 10

Preparation of Polyfluorosulfone with Chloroethane Groups—Polymer 11

1 g (0.0015 mol, equivalent weight=666 gram per mole repeat unit) polymer 5 was placed into a 50 ml Schlenk and dissolved in THF anhydrous (30 ml). The Schlenk was connected to a trap with a NaOH solution (2M) for absorption of HCl and $SO_2$. Then anhydrous pyridine 0.5 ml (0.0062 mol), and $SOCl_2$ 0.3 ml (0.0041 mol) were added dropwise at room temperature into the Schlenk. The temperature was slowly increased and maintained at 60° C. for 3 h. Excess of $SOCl_2$ and THF were distilled off under vacuum at 50° C. for 30 minutes, to obtain the resulting crude acid chloride polymer. Then freshly distilled THF (30 ml) was added to dissolve the acylated polymer. After 30 minutes needed for complete dissolution of polymer, a solution of excess 1-chloroethanol 0.4 ml (2 mol.eq, 0.0062 mol) was added dropwise to the polymer solution at room temperature under vigorous stirring, and allowed to stir for 24 h. The polymer was recovered by precipitating into distilled water, washing with ethanol and finally dried at 50° C. in vacuum oven to obtain Polymer 11 as a brown solid (1.1 g, yield 97%).

$^1$H NMR (500 MHz, DMSO) δ: 8.05 (d, $^3J$=9 Hz, 2H, $H_5$), 7.47 (d, $^3J$=7 Hz, 4H, $H_2$), 7.41 (m, 4H, $H_3$, $H_4$), 7.3 (d, $^3J$=7 Hz, 4H, $H_1$), 4.48 (br, 4H, $H_6$), 3.84 (br, 4H, $H_7$) ppm.

$^{13}$C NMR (125 MHz, DMSO) δ: 165.4 (C10), 160.3(C11), 155.2(C4), 134.5(C9), 133.1(C7), 132.7(C12), 132(C3), 128.8(C1), 125.1(C6), 120.2(C2), 119.8(C8), 118.4(C13), 65.8(C14), 63.4(C5), 42.1(C15) ppm.

Mn=47100, Mw=80700, Mw/Mn=1.71, n=62.

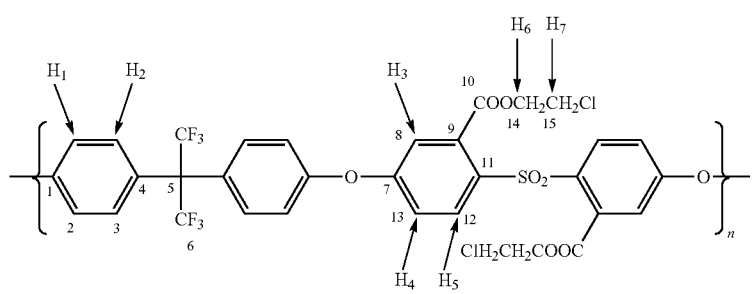

Example 11

Preparation of Polysulfone with 2,3:5,6-Di-O-Isopropylidene-Mannofuranose Groups—Polymer 12

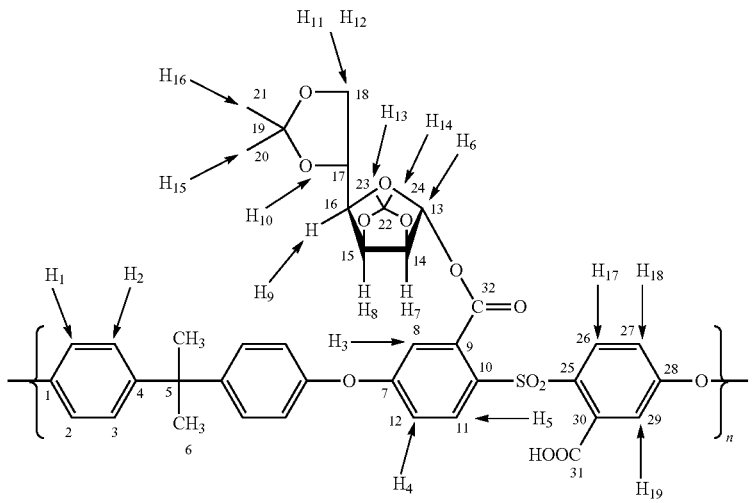

1 g (0.0018 mol, equivalent weight=555 gram per mole repeat unit) polymer 4 of Example 3 above was placed into a 50 ml Schlenk and dissolved in THF anhydrous (30 ml). The Schlenk was connected to a trap with a NaOH solution (2M) for absorption of HCl and $SO_2$. Then anhydrous pyridine 0.5 ml (0.0062 mol), and $SOCl_2$ 0.3 ml (0.0041 mol) were added dropwise at room temperature into the Schlenk. The temperature was slowly increased and maintained at 60° C. for 3 h. Excess of $SOCl_2$ and THF were distilled off under vacuum at 50° C. for 30 minutes, to obtain the resulting crude acid chloride polymer. Then freshly distilled THF (30 ml) was added to dissolve the acylated polymer. After 30 minutes needed for complete dissolution of polymer, a solution of excess 2, 3:5, 6-Di-O-isopropylidenemannofuranose 0.962 g (1.5 mol.eq, 0.0056 mol) dissolved in THF anhydrous (10 ml) was added dropwise to the polymer solution at room temperature under vigorous stirring, and allowed to stir for 24 h. The polymer was recovered by precipitating into distilled water, washing several times and finally dried at 50° C. in vacuum oven to obtain Polymer 12 as a brown solid (1.05 g, yield 55%).

$^1$H NMR (500 MHz, DMSO) δ: 8.14 (d, $^3$J=8 Hz, 2H, $H_{17}$), 8.04 (s, 1H, $H_5$), 7.33(d, $^3$J=6 Hz, 4H, $H_2$), 7.18(d, $^3$J=8 Hz, 2H, $H_4$,$H_{18}$), 7.11 (s, 2H, $H_{19}$,$H_3$), 7.08 (d, $^3$J=6 Hz, 4H, $H_1$), 6.09 (d, $^3$J=20 Hz, 1H, $H_6$), 4.88(m, 1H, $H_7$), 4.78(m, 1H, $H_9$), 4.26(m, 1H, $H_{10}$), 4.06(m, 1H, $H_8$), 3.99(m, 1H, $H_{11}$), 3.85 (m, 1H, $H_{12}$) 1.67 (s, 6H, $CH_3$), 1.38, 1.27, 1.25, 1.23 (s, 12H, $H_{13}$,$H_{14}$, $H_{15}$, $H_{16}$) ppm.

$^{13}$C NMR (125 MHz, DMSO) δ: 167.6 (C31), 164.9(C32), 161.6(C10,C25), 152.2(C4), 147.2(C1), 136.7(C9,C30), 132.4(C11,C26), 131.5(C7,C28), 128.7(C3), 119.9(C2), 118 (C12,C27), 116.7(C8,C29), 112.3 (C19), 108.3(C22), 103.1 (C13), 84.1(C14), 82.5(C15), 79.1(C16), 72.3(C17), 65.9(C18), 42.2(C5), 30.7(C6), 26.5, 25.8, 25.3, 24.4 (C20, C21,C23,C24) ppm.

IR (KBr): 2969 (mannose ring, aliphatic C—H str.), 1738 (C=O str, ester group).

Mn=138600, Mw=221300, Mw/Mn=1.59, n=180.

Example 12

Preparation of Polysulfone with Neomycin Groups—Polymer 13

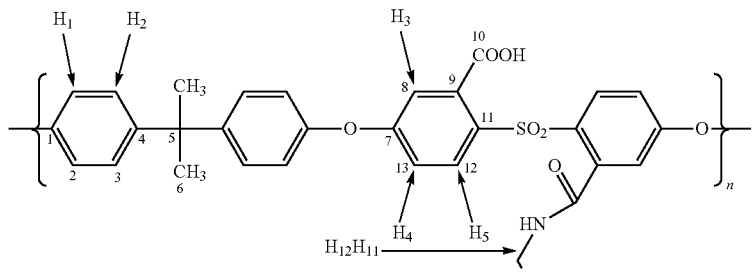

-continued

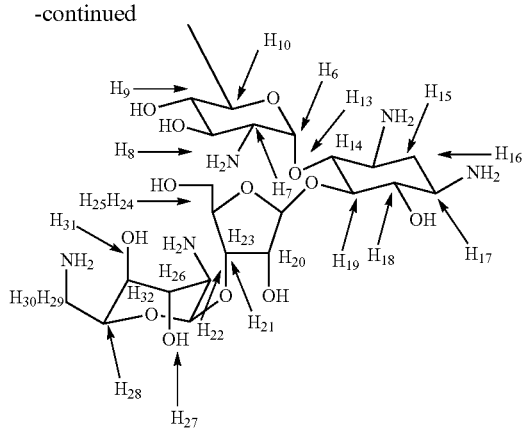

1 g (0.0018 mol, equivalent weight=555 gram per mole repeat unit) polymer 4 of Example 3 above was placed into a 100 ml Schlenk and dissolved in THF anhydrous (50 ml). The Schlenk was connected to a trap with a NaOH solution (2M) for absorption of HCl and $SO_2$. Then anhydrous pyridine 0.5 ml (0.0062 mol), and $SOCl_2$ 0.3 ml (0.0041 mol) were added dropwise at room temperature into the Schlenk. The temperature was slowly increased and maintained at 60° C. for 3 h. Excess of $SOCl_2$ and THF were distilled off under vacuum at 50° C. for 30 minutes, to obtain the resulting crude acid chloride polymer. Neomycin in the salt form (purchased from Aldrich) was treated with $NaOCH_3$ solution to neutralize the charge of amino groups. 2 g (0.0021 mol) of neomycin salt (containing $3H_2SO_4$ mol per 1 mol of neomycin) was dissolved in 50 ml $CH_3OH$ anhydrous. Then $NaOCH_3$ solution (6 mol.eq, 0.63 ml) was added dropwise at room temperature and stirred for 30 minutes. The $CH_3OH$ solvent was removed by vacuum distillation. The freshly distilled THF (30 ml) was added to dissolve the acylated polymer. After 30 minutes needed for complete dissolution of polymer, a solution of neomycin 1.4 g (0.5 mol.eq, 0.0024 mol) dissolved in THF anhydrous (50 ml) was added dropwise to the polymer solution at room temperature under vigorous stirring, and allowed to stir for 24 h. The polymer was recovered by precipitating into distilled water, washing several times and finally dried at room temperature in vacuum oven to obtain Polymer 13 as a yellow solid (1.53 gr, yield 70%).

$^1$H NMR (500 MHz, DMSO) δ: 7.9 (br, 2H, $H_5$), 7.23 (br, 4H, $H_2$), 6.95(br, 4H, $H_1$), 6.78(br, 2H, $H_3$), 6.62(br, 2H, $H_4$), 4.3-2.35(m, 27H, $H_6$-$H_{32}$), 1.67 (s, 6H, $CH_3$) ppm.

$^{13}$C NMR (125 MHz, DMSO) δ: 172.4, 162.4, 154.8, 148.7, 148.3, 134.6, 132.8, 130.5, 121.8, 117, 58.8, 52.5, 48.5, 45.2, 44, 42.2, 42, 41.8, 40.2, 39.3, 36, 34.4, 32.6, 31.9, 25.6 ppm.

IR (KBr): 3430 (N—H str.), 2928 (neomycin ring, aliphatic C—H str.), 1743 (C=O str, ester group).

Example 13

Preparation of polysulfone with 2,3,4,6-tetra-O-pivaloyl-β-D-galactopyranosylamine groups—Polymer 14

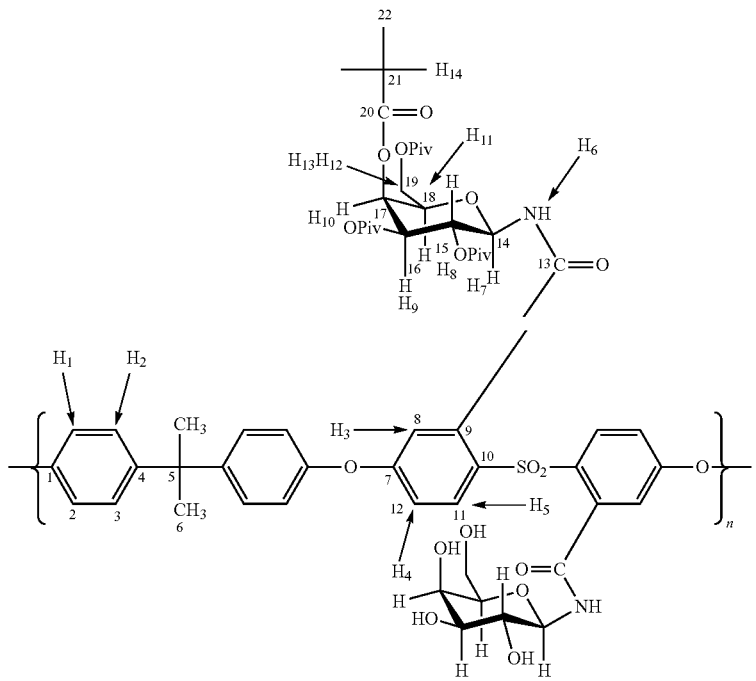

1 g (0.0018 mol, equivalent weight=555 gram per mole repeat unit) polymer 4 of Example 3 above was placed into a 50 ml Schlenk and dissolved in THF anhydrous (30 ml). The Schlenk was connected to a trap with a NaOH solution (2M) for absorption of HCl and $SO_2$. Then anhydrous pyridine 0.5 ml (0.0062 mol), and $SOCl_2$ 0.3 ml (0.0041 mol) were added dropwise at room temperature into the Schlenk. The temperature was slowly increased and maintained at 60° C. for 3 h. Excess of $SOCl_2$ and THF were distilled off under vacuum at 50° C. for 30 minutes, to obtain the resulting crude acid chloride polymer. Then freshly distilled THF (30 ml) was added to dissolve the acylated polymer. After 30 minutes needed for complete dissolution of polymer, a solution of 2,3,4,6-tetra-O-pivaloyl-β-D-galactopyranosylamine 1.945 g (1.5 mol.eq, 0.0037 mol) dissolved in THF anhydrous (10 ml) was added dropwise to the polymer solution at room temperature under vigorous stirring, and allowed to stir for 24 h. A polymer was recovered by precipitating into distilled water, washing several times and finally dried at 50° C. in vacuum oven to obtain Polymer 14 as a brown solid (2.01 g, yield 71%).

$^1$H NMR (500 MHz, DMSO) δ: 9.13 (br, 2H, $H_6$), 8.13 (d, $^3J$=9 Hz, 2H, $H_5$), 7.3 (d, $^3J$=9 Hz, 4H, $H_3$), 7.05(d, $^3J$=11 Hz, 2H, $H_4$), 7.0(d, $^3J$=9 Hz, 4H, $H_2$), 6.85 (s, 2H, $H_8$), 5.49 (tr, 2H, $H_7$), 5.29 (m, 4H, $H_9$, $H_{10}$), 5.24 (m, 2H, $H_8$), 4.37(m, 2H, $H_{11}$), 3.95(m, 4H, $H_{12}$, $H_{13}$), 1.67 (s, 6H, $CH_3$), 1.03 (m, 36H, $H_{22}$) ppm.

$^{13}$C NMR (125 MHz, DMSO) δ: 175.6(C20), 166.2(C13), 159.9(C10), 152.1(C4), 146.1(C1), 138.6(C9), 133.4(C11), 127.8(C3), 118.6(C2), 116.8(C12,C8), 77.6(C14), 71.3 (C17, C18), 68.3(C15), 66.9(C16), 60.6(C19), 41.5(C5), 37.6(C21), 30.6(C6), 26.6(C22) ppm.

IR (KBr): 3430 (N—H str.), 2975 (galactose protective group, aliphatic C—H str.), 1743 (C=O str, ester galactose protective group).

Example 14

Preparation of Polysulfone with β-D-galaetopyranosylamine groups—Polymer 15

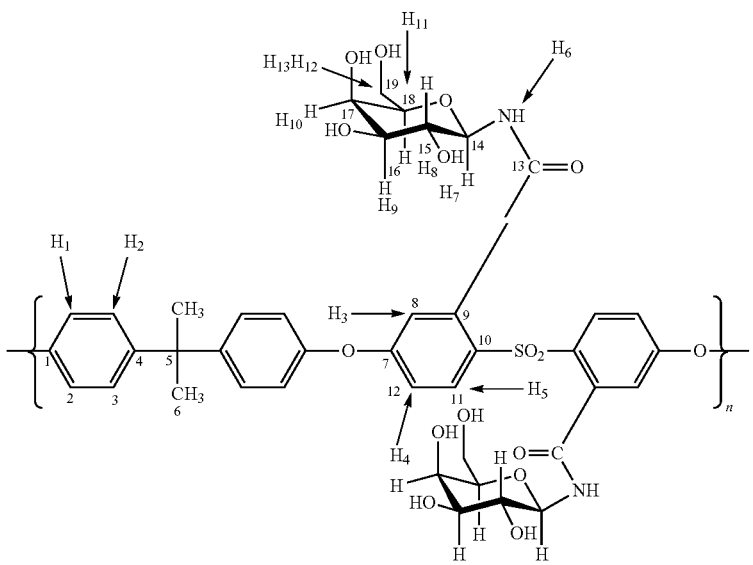

0.5 g (0.0003 mol) polysulfone 18 was dissolved in methanol anhydrous (10 ml) and treated with catalytic amount of sodium methoxide (0.5 M sol. in MeOH) at 0° C. The solution was stirred at room temperature for 19 h. Methanol was evaporated under reduced pressure and product was washed with $CH_2Cl_2$ and ethanol, and finally dried at room temperature in vacuum oven to obtain Polymer 15 as a yellow solid (0:36 g, yield 95%).

$^1$H NMR (500 MHz, DMSO) δ: 9.09 (br, 2H, $H_6$), 8.25 (d, $^3J$=14 Hz, 2H, $H_5$), 7.32 (d, $^3J$=7 Hz, 4H, $H_2$), 7.20(d, $^3J$=14 Hz, 2H, $H_4$), 7.14(d, $^3J$=7 Hz, 4H, $H_1$), 7.06 (s, 2H, $H_3$), 4.87 (d, $^3J$=14 Hz, 2H, $H_7$), 4.74 (br, 16H, OH), 3.81 (m, 2H, $H_9$), 3.53 (m, 10H, $H_8$,$H_{10}$,$H_{11}$,$H_{12}$,$H_{13}$), 1.66 (s, 6H, $CH_3$) ppm.

$^{13}$C NMR (125 MHz, DMSO) δ: 167.0 (C13), 164.9(C32), 160.7(C10), 152.3(C4), 146.9(C1), 139.5(C9), 134.2(C11), 132.1(C7), 128.5(C3), 119.5(C2), 117(C12,C8), 80.6(C14), 76.9(C17), 73.9(C18), 69.8(C15), 68.1(C16), 60.3(C19), 42.0(C5), 30.6(C6) ppm.

IR (KBr): 3343 (O—H str.), 2928 (galactose ring, aliphatic C—H str.), 1565 (amide bending).

Mn-60490, Mw-60510, Mw/Mn=1, n=70.

Example 15

Preparation of Polysulfone with Boronic Acid Groups—Polymer 16

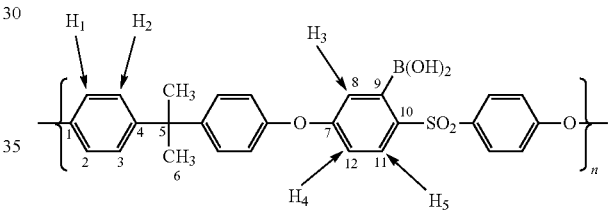

The dried polysulfone 1 was placed into a 100 ml three necked Schlenk equipped with a dropping funnel, a thermometer, $N_2$ inlet and a magnetic stirrer. 1 g (0.0022 mol) polysulfone 1 was dissolved in THF anhydrous (50 ml) and the mixture was cooled to −50° C. n-BuLi (0.0033 mol, 1.5 mol.eq, 2.11 ml of 1.6 M in hexane) diluted with THF (10 ml) was added dropwise over 10 minutes. The resulting red-brown solution was stirred for 30 minutes at −50° C. and then was cooled to −78° C. The solution of tributyl borate 1.21 ml (2 mol.eq, 0.0045 mol) in THF (10 ml) was added dropwise. The resulting clear solution was stirred for another 2 h at the same temperature and then was allowed to warm to room temperature overnight. Most of the solvent was evaporated in vacuum for 30 minutes, allowing boronic ether containing groups. The product was hydrolyzed by the addition of dilute HCl (100 ml, 3M) and vigorous stirring for 1 h. The resulting white precipitate was washed with distilled water, filtered and dried at 50° C. under reduced pressure to furnish the desired Polymer 16 with boronic acid groups as a white solid (1.05 g, yield 88%).

$^1$H NMR (500 MHz, DMSO) δ: 7.82 (d, $^3$J=8 Hz, 3H, H$_5$), 7.54 (m, 1H, H$_4$), 7.27(m, 4H, H$_2$), 7.14 (m, 1H, H$_3$), 7.07 (m, 4H, H$_1$), 1.65 (s, 6H, CH$_3$) ppm.

$^{13}$C NMR (125 MHz, DMSO) δ: 158.9 (C10), 153.7(C4), 146.8(C9), 145.7(C1), 138.1(C7), 128.3(C3), 124.7(C11), 120.7(C12), 119.7(C2), 118.7(C8), 41.8(C5), 30.6(C6) ppm.

B-NMR: B—OH absorbance at 0 ppm.

Example 16

Preparation of Polyfluorosulfone with Boronic Acid Groups—Polymer 17

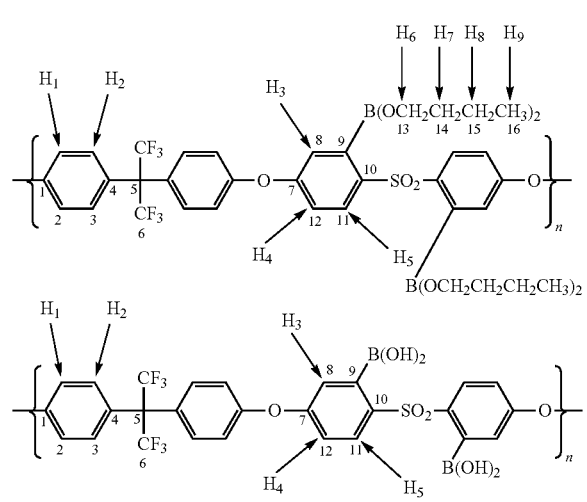

The dried polyfluorosulfone 2 was placed into a 100 ml three necked Schlenk equipped with a dropping funnel, a thermometer, N$_2$ inlet and a magnetic stirrer. 1 g (0.0018 mol) polyfluorosulfone 2 was dissolved in THF anhydrous (50 ml) and the mixture was cooled to −50° C. n-BuLi (0.0045 mol, 2.5 mol.eq, 2.84 ml of 1.6 M in hexane) diluted with THF (10 ml) was added dropwise over 10 minutes. The resulting red-brown solution was stirred for 30 minutes at −50° C. and then was cooled to −78° C. The solution of tributyl borate 1.46 ml (3 mol.eq, 0.0054 mol) in THF (10 ml) was added dropwise. The resulting clear solution was stirred for another 2 h at the same temperature and then was allowed to warm to room temperature overnight. Most of the solvent was evaporated in vacuum for 30 minutes, allowing boronic ether containing groups as a yellow solid.

$^1$H NMR (500 MHz, DMSO) δ: 7.98 (m, 2H, H$_5$), 7.36 (m, 4H, H$_2$), 7.2(m, 2H, H$_3$), 7.10(m, 4H, H$_1$), 6.89(m, 2H, H$_4$), 3.42(s, 4H, H$_6$), 1.26(m, 8H, H$_7$, H$_8$), 0.72(s, 6H, H$_9$) ppm.

$^{13}$C NMR (125 MHz, DMSO) δ: 159.5 (C10), 138.2(C9), 133.7(C3), 132.3(C11), 130.6(C1), 128.9(C4), 121.9(C7), 120.4(C5), 121.3(C8), 117.8(C2), 115.5(C12), 65.5(C6), 62.5(C13), 36.9(C14), 20.9(C15), 16.1(C16) ppm.

B-NMR: B—OBu absorbance at 25 ppm.

The product was hydrolyzed by the addition of dilute HCl (100 ml, 3M) and vigorous stirring for 1 h. The resulting white precipitate was washed with distilled water, filtered and dried at 50° C. under reduced pressure to furnish the desired Polymer 17 with boronic acid groups as a white solid (1.1 g, yield 94.8%).

$^1$H NMR (500 MHz, DMSO) δ: 7.83 (d, $^3$J=8 Hz, 2H, H$_5$), 7.38 (d, $^3$J=7 Hz, 4H, H$_2$), 7.25(s, 2H, H$_3$), 7.10(d, $^3$J=7 Hz, 4H, H$_1$), 6.94 (d, $^3$J=8 Hz, 2H, H$_4$) ppm.

$^{13}$C NMR (125 MHz, DMSO) δ: 157.0 (C10), 139.2(C9), 131(C3), 126.5(C1), 125.6(C4), 123.6(C11), 121.8(C7), 120.9(C8), 118.6(C5), 117.8(C2), 114.1(C12), 63.2(C6) ppm.

B-NMR: B—OH absorbance at 0 ppm.
Mn=60700, Mw=115700, Mw/Mn=1.9, n=95.

Example 17

Preparation of Polysulfone with Phosphonate Ester Groups—Polymer 18

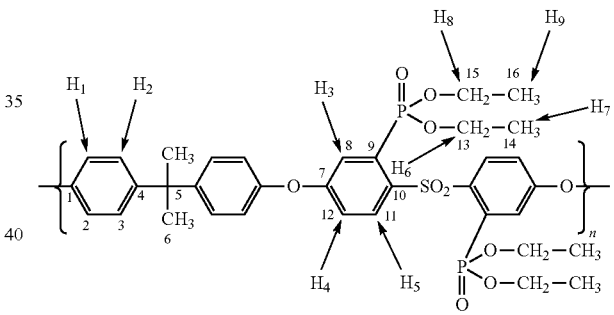

The dried polysulfone 1 was placed into a 100 ml three necked Schlenk equipped with a dropping funnel, a thermometer, N$_2$ inlet and a magnetic stirrer. 1 g (0.0022 mol) polysulfone 1 was dissolved in THF anhydrous (50 ml) and the mixture was cooled to −50° C. n-BuLi (0.0056 mol, 2.5 mol.eq, 3.53 ml of 1.6 M in hexane) diluted with THF (10 ml) was added dropwise over 10 minutes. The resulting red-brown solution was stirred for 30 minutes at −50° C. and then was cooled to −60° C. A solution of diethylchlorophosphate 0.98 ml (3 mol.eq, 0.0067 mol) in THF anhydrous (10 ml) was added dropwise over period of 10 min. The reaction mixture was kept for 4 h at this temperature and then allowed to stir overnight at room temperature. The water was added and the product was washed several times with water and ethanol. The polymer was dried at 50° C. in vacuum oven to obtain Polymer 18 as a yellow solid (1.14 g, yield 71%).

$^1$H NMR (500 MHz, DMSO) δ: 7.89 (br, 2H, H$_5$), 7.35 (m, 12H, H$_1$, H$_2$, H$_3$, H$_4$), 4.02 (m, 4H, H$_6$), 3.71 (m, 4H, H$_8$), 1.66 (br, 6H, CH$_3$), 1.25 (m, 6H, H$_7$), 1.16 (m, 6H, H$_9$) ppm.

IR (KBr): 2970 (ethyl group, aliphatic C—H str.), 1241 (P=O str.), 1169, 1015 (P—O—C str.).

P-NMR: −3.44 ppm phosphate ester group.
Mn=107100, Mw=140200, Mw/Mn=1.3, n=150.

Example 18

Preparation of Polysulfone with Phosphonic Acid Groups—Polymer 19

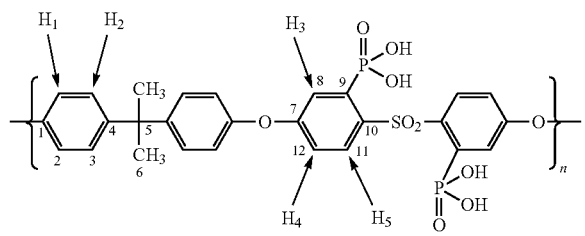

Polymer 18 of the previous example containing phosphate diester groups 0.5 g (0.0007 mol) was suspended in 20 ml NaOH (2M) solution for 5 h. The solution was then acidified with concentrated hydrochloric acid to pH=7. The yellow precipitate was washed with methanol and finally dried at 50° C. in vacuum oven to obtain Polymer 19 as yellow solid (0.31 g, yield 75%).

$^1$H NMR (500 MHz, DMSO) δ: 7.87 (br, 2H, $H_5$), 6.74 (m, 12H, $H_1$, $H_2$, $H_3$, $H_4$), 1.58 (s, 6H, $CH_3$) ppm.

IR (KBr): 3412 (O—H str.), 1238 (P=O str.).

P-NMR: −12 ppm hydroxyl groups.

Mn=51000, Mw=86700, Mw/Mn=1.69, n=85.

II. Preparation and Performance of the Novel Membranes

Methods and Apparatus

All tests were performed with flat pressure cell with an active area of 19.63 cm$^2$, while the pressure applied was in range of 2-15 atm.

Conductometer (model DDS-11A) was used for the measurement of conductivity of permeation and feed.

NMR method was used to analyze the structures and concentrations of organics in permeate and feed solutions. NMR and $^{13}$C—(CP-MAS) NMR methods were used to analyze the structures of synthesized polymers. The spectra were recorded on Bruker AV300 and AV500 spectrometers.

Infrared (IR) spectrum (Bruker, Vector 22) was used for functional groups determination.

AFM (Model Autoprobe CP), SEM (Model Quanta 200), HRSEM (Model Leo 982) were used for the analysis of structure, morphology and topography of the surface layer and membrane cross-section.

GPC (gel permeation chromatography) (Model Waters 2000) was used to determine the number average (Mn), weight average (Mw) and polydispersity (Mw/Mn) of some polymers. Unfortunately, not all of the synthesized polymers were suitable for GPC measurements, because of low solubility in THF solvent or because the same refractive index as compared to the solvent.

Fluorescent microscope (Model Carl Zeiss 426126) was used to analyze the development of bacteria on membrane surface.

Synthesis of Membrane Polymers

Aromatic polysulfone polymers with the same skeleton backbone and with different functional groups attached to it were synthesized as shown in the Examples above. In addition, polymers with different skeleton backbone were also synthesized for comparison. These polymers were converted into membranes to determine the influence of the different functional groups on the membrane performance.

Membrane Preparation

The RO membranes were prepared by redissolving the polymer in DMSO to afford 20% transparent solution and then casting the solution onto clean glass substrates.

The NF and UF membranes were prepared by redissolving the polymer in DMSO to afford 20% transparent solution, casting the solution onto clean glass substrates, and carefully drying the films in an oven for 2 minutes at 300° C. under a nitrogen atmosphere. The dried films were then immersed into deionized water bath at 0° C. overnight.

Measurements

After membranes being compressed by air for 30 minutes, feed and permeate were collected. The conductivity of these two solutions was measured by conductometer.

The water flux was calculated by measuring the volume of permeates that penetrates the membrane per unit time.

A series of different membranes have been tested with various salt and organic solutions. These experiments were conducted with identical feed solutions initially containing 0.1% of NaCl, $CaCl_2$, 2-naphthol-3,6-disulfonic acid disodium salt, polyethylene glycol (PEG) (M.W. 600, 1,000, 20,000), polyvinyl alcohol (PVA)(M.W. 130,000) and poly (acrylic acid) (PAA)(M.W. 5,000).

According to the conductivity-concentration dependence, the concentrations were obtained. Then the rejection of salt was calculated by using the following equation: Rejection (%)=100*(Cf−Cp)/Cf, and Cf and Cp are the concentrations of the feed solution and permeate, respectively. The higher the rejection the better is the membrane since it leaves more of the compound on the other side of the membrane. For example, R=30% means nanofiltration.

In our experiments, the concentrations of feed and permeate of organics were determined by NMR method. The concentration of solute in the feed (Cf) was determined by calculating the area of the peak correlated to solute in NMR spectra. The concentration of solute in permeate was determined by the same way. Finally, the rejection could be calculated using the equation above.

The membrane permeability to solution flow Lp was calculated by using the following equation:

$$Lp=Jv/(P-\sigma^*\Delta\pi)$$

Lp has the units of flux per unit pressure, such as Li/m$^2$*hr*bar.

where Jv (Li/m$^2$*hr) is the flux through the membrane, P (bar) is the applied mechanical pressure, Δπ (bar) is the osmotic pressure, and σ is the reflection coefficient.

The osmotic pressure can be calculated by using the following equation:

$$\Delta\pi=R^*T^*Cs^*\nu$$

where R (Li*atm/mol*° k) is the ideal gas constant, T (° k) is the solution temperature, ν is the number of ions formed in the dissociation of one mole of salt, Cs(M) is the total molar concentration of ions in solution.

After each run the whole cell was rinsed thoroughly with demineralized water and membrane was washed to remove any deposition. The conductivity of water transferred through the membrane was measured to confirm the absence of adsorbed ions inside of membrane.

Non-Aqueous Conductometric Titrations

Non-aqueous conductometric titrations were used to quantitatively determine phosphonic acid group and carboxylic acid group content in polysulfone polymers by back-titration method. The polymer containing these groups was first dissolved in DMSO solvent and then reacted with an excess of sodium hydroxide. An excess of sodium hydroxide was subsequently titrated with hydrochloric acid. A sharp end titration point was observed, confirming the strong acid-base reaction. The reaction equations for the back-titration are given in the following equations:

$$R\text{—}PO(OH)_2 + NaOH \rightarrow R\text{—}PO(ONa)_2 + H_2O + NaOH$$

$$NaOH + HCl \rightarrow NaCl + H_2O$$

or $$R\text{—}COOH + NaOH \rightarrow R\text{—}COONa + H_2O + NaOH$$

$$NaOH + HCl \rightarrow NaCl + H_2O$$

The number of functional group determined by titrations, were 2.00 functional groups per one repeating unit of polymer.

Example 19

Gel Permeation Chromatography (GPC) Results

The number average (Mn), weight average (Mw) and polydispersity (Mw/Mn) of the polysulfone 1 of 20,000 Da of Aldrich and of the Polymers 2, 3, 6, 8-12, 15 and 17-19 were measured by GPC. Unfortunately, not all of the synthesized polymers were suitable for GPC measurements, because of low solubility in THF solvent or because the same refractive index as compared to the solvent. The results are shown in Table 1.

TABLE 1

Gel permeation chromatography results for different polymers

| Polymer type | Mn | Mw | Mw/Mn |
|---|---|---|---|
| Polysulfone (commercial) (A) | 28600 | 56000 | 1.96 |
| Polyfluorosulfone (2) | 62000 | 89800 | 1.44 |
| Polyquinone-based polysulfone (3) | 71300 | 114300 | 1.6 |
| Polyquinone-based polysulfone carboxylated (6) | 49300 | 106400 | 2.15 |
| Polysulfone with chlorooctane groups (8) | 134400 | 212200 | 1.57 |
| Polyfluorosulfone with chlorooctane groups (9) | 91500 | 183700 | 2.0 |
| Polysulfone with chloroethane groups (10) | 18000 | 29600 | 1.64 |
| Polyfluorosulfone with chloroethane groups (11) | 47100 | 80700 | 1.71 |
| Polysulfone with D-mannose (12) | 138600 | 221300 | 1.59 |
| Polysulfone with galactose (15) | 60490 | 60510 | 1.00 |
| Polyfluorosulfone with boronic acid groups (17) | 60700 | 115700 | 1.90 |
| Polysulfone with phosphate ester groups (18) | 107100 | 140200 | 1.30 |
| Polysulfone with phosphonic acid groups (19) | 51000 | 86700 | 1.69 |

From GPC results it can be seen the decrease in Mn and Mw of polymer from the conversion of polymer 3 to carboxylated Polymer 6 indicating on the cut-off of polymer chains. The possible explanation is cleavage of the ether bond of the polymer backbone because of acidic conditions. The same explanation can be suggested for the conversions of polymer 1 to 10, 2 to 11, 2 to 17 and 18 to 19. It can be also seen the increase in Mn and Mw from conversions of polymer 1 to 8, 2 to 9, 1 to 15 and 1 to 18. The first possible explanation is the continuity in polycondensation polymerization after adding n-BuLi reagent for polymer carboxylation. The second possible explanation is the crosslinking between the polymer chains during acylation reactions with formation of anhydride bonds.

Example 20

The Permeability and Salt Rejection Dependence Upon Osmotic Pressure in Polysulfone 1 and Polysulfone with Carboxylic Acid Group 4 Membranes The pure water permeability was determined through the polysulfone membrane 1. Later, the permeability dependence upon an osmotic pressure and salt rejection were measured. The initial feed concentration of $CaCl_2$ salt was 0.1%.

Figure 1B:
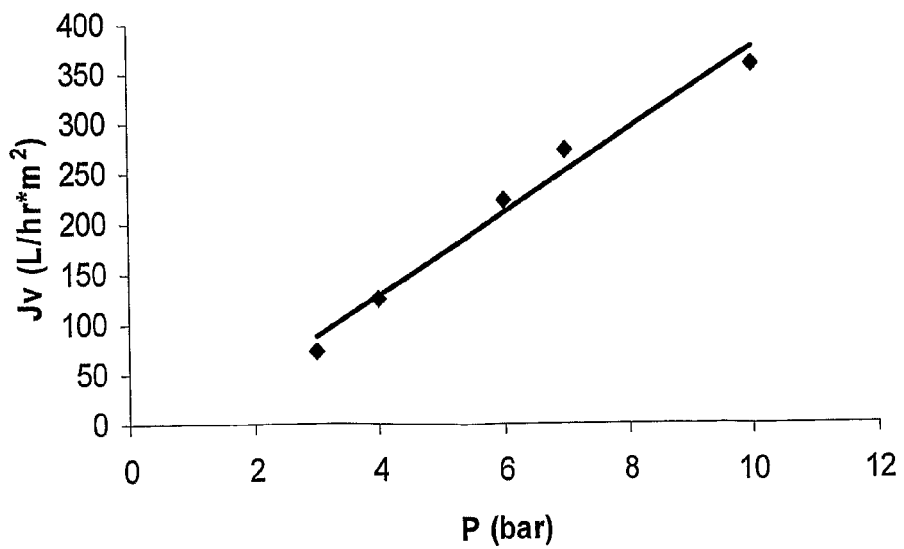

The results are shown in FIG. 1. The flux of membranes increased as the operation pressure increased. The permeability of the membrane for distilled water was higher than for salt solution because of the osmotic pressure development on the membrane surface.

Figure 2A:
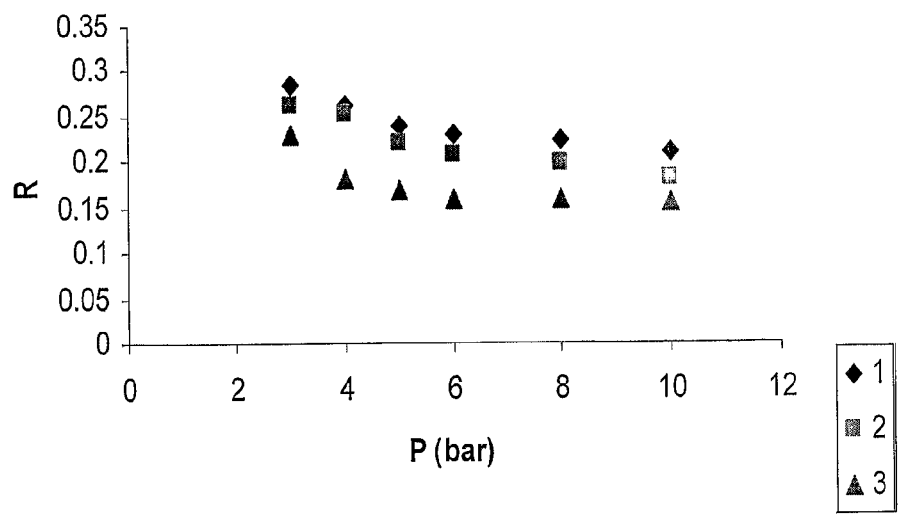
FIGS. 2A-2B show the rejection (R) of $CaCl_2$ by polysulfone membrane with carboxylic acid groups (Polymer 4) and NaCl salt by polysulfone membrane (Polymer 1) under different pressures and at different salt concentrations. For $CaCl_2$: diamonds=0.1%, squares=1%, and triangles=3%. For NaCl: diamonds=0.5% and squares=1%.
Figure 2B:
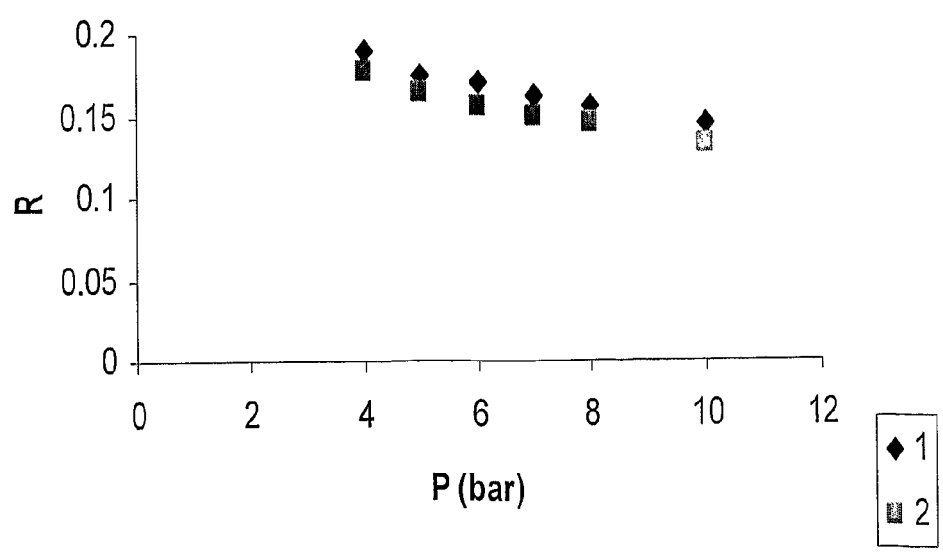

The effect of salt concentration on the rejection for two different membranes is shown in FIGS. 2A-2B. The membrane prepared from Polymer 4 (polysulfone with carboxylic acid groups) was tested with $CaCl_2$ salt and the membrane prepared from commercial polysulfone 1 was tested with NaCl salt at different concentrations.

We can observe a slight decrease in rejection with the increasing pressure because of the pore enlargement. The pore size enlargement for the big pores is more than for the small pores, therefore the salt passage increased. Rejection decreased with increasing salt concentration—a phenomenon caused by shielding of the membrane surface by the high ionic strength of the feed water—the concentration polarization effect. The formation of dissolved salt layer on membrane surface is expected to lower the salt rejection and to enhance salt passage through the membrane. The increase in salt concentration by 30% leads to a very little decrease in salt rejection, indicating that the present pore size does not permit the passage of many ions through the biggest pores at the same time.

Example 21

Comparison Between Nacl and Cacl$_2$ Salt Rejection by Different Membranes

The factors responsible for separation of different salts by different membranes are discussed in this example.

Figure 3A:
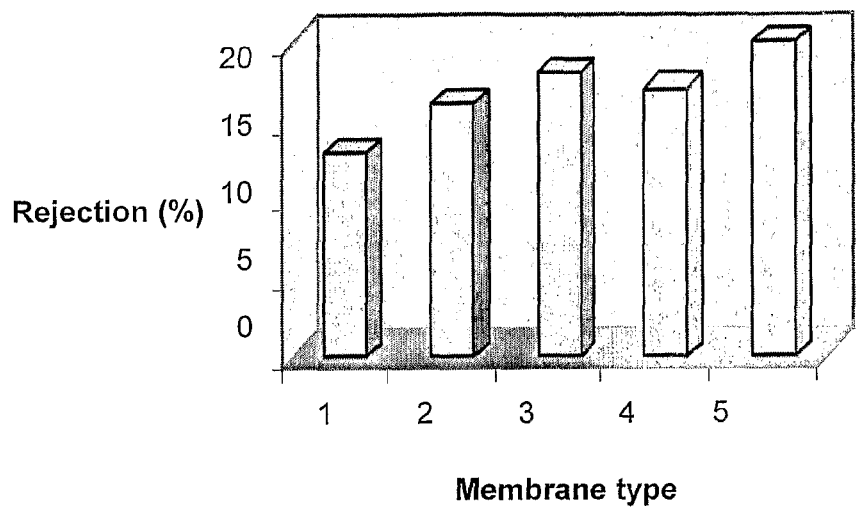
FIGS. 3A-3B show the rejection of NaCl 0.1% (3A) and $CaCl_2$ 0.1% (3B) for membranes made of different polymers. The numbers of the membranes correspond to the numbers of the polymers as follows: (1) commercial polysulfone 1 (prepared at the inventor's lab); (2) polyfluorosulfone 2; (3) polysulfone crosslinked 7; (4) polysulfone carboxylated 4; and (5) polysulphone with phosphonic acid groups 19.
Figure 3B:
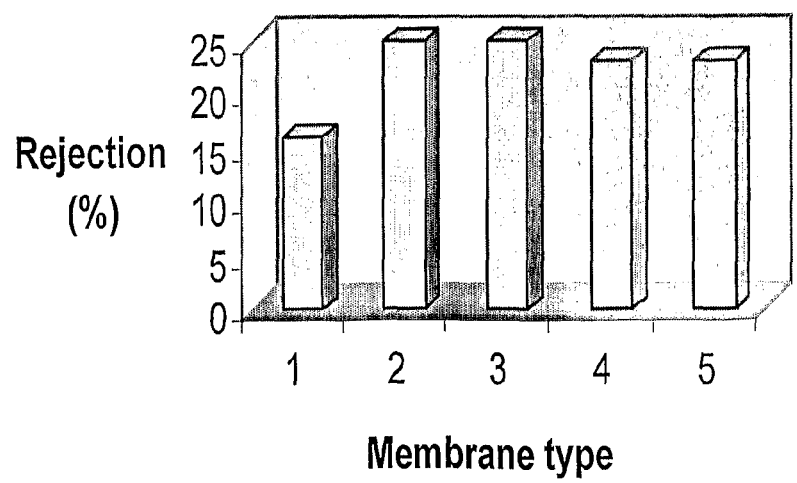

The rejection of NaCl and $CaCl_2$ salts by six different membranes prepared from polymers 1, 2, 4, 7 and 19 were studied and the results are shown in FIGS. 3A and 3B, respectively. The numbers of the membranes correspond to the numbers of the polymers as follows: (1) commercial polysulfone 1; (2) polyfluorosulfone 2; (3) polysulfone crosslinked 7; (4) polysulfone carboxylated 4; and (5) polysulfone with phosphonic acid groups 19.

The membrane salt selectivity appears to be a function of both Donnan exclusion (the rejection of ionic components as a result of charge interactions between the membrane surface and the ions) and size effects (Vezzani and Bandini, 2002). This suggests that the membrane discriminates between monovalent and divalent salts, on the basis of both ionic size and charge repulsion/attraction. All of the ions in aqueous solution became hydrated by water molecules. The co-ordination number of water molecules attached to $Ca^{+2}$ cation is 10 (Skipper et al., 1989a) and those attached to $Na^+$ cation is 5 (Skipper et al., 1989b). Therefore, $Ca^{+2}$ ion has greater hydrated ionic radii (9.6 A°) than $Na^+$ ion (5.6-7.9 A°) and thus is more easily excluded by small pores.

The retention of charged species, e.g. ions, have been explained to depend on the valency, on the concentration and chemical nature of the compounds in solution, on the surface charge, charge density and the chemical nature of the groups on the membrane surface.

The membranes containing carboxylic and phosphonic acid groups have fixed negative charges developed by dissociation of these groups. These groups reject anions as Cl⁻ by electrostatic repulsive force, but adsorb cations such as $Na^+$ and $Ca^{+2}$. The ion $Ca^{+2}$ has higher selectivity constant (Ks $(Ca^{+2})$=3.9) towards carboxylic acid groups than $Na^+$ ion (Ks($Na^+$)=2.7) because of its higher valency and hence $Ca^{+2}$-ion binds more strongly to negative groups on membrane surface.

Almost every salt ion transported across the membrane had to be transported with the corresponding number of opposite charge ions to satisfy electroneutrality. In this case the diffusion coefficients also appear to affect the retention, with salts having the highest diffusion coefficients exhibiting the lowest retention (e.g., diffusion coefficient ranked as $6.01*10^{-12}$ m²/s for NaCl and as $0.301*10^{-12}$ m²/s for $CaCl_2$) (Normor et al., 1998).

The ability of an ion to partition into an uncharged membrane is affected by its free energy of hydration. The free energy of hydration $(-\Delta G°_H)$ typically increases as the ion valence charge increases and as the atomic radius decreases. Sodium has a smaller free energy of hydration (–407 kj/mol) than calcium ion (–1584 kj/mol), and it has a smaller valence charge. Thus, it is not surprising that sodium has the greater flux through the membrane. All of these factors described above can explain the greater rejection of $CaCl_2$ over NaCl salt from the membrane surface.

NF membranes can retain ions mostly due to their surface charge. Moreover, a weak charge may not be enough to cause ions to be retained. The membranes prepared in accordance with the present invention are defined as NF membranes in accordance to salt rejection definition. In NF membranes the rejection towards monovalent ions is in the range of 0-50% and towards multivalent ions is in the range of 20-90%.

Example 22

Comparison Between Salt Rejection and Permeability by Different Membranes

The retention and permeability of the membranes were explained by the charge and hydrophilic characteristics. The membrane permeability and average solute rejection data are summarized in FIGS. 4A-4B. These two parameters are the most important for membrane characterization.

FIGS. 4A-4B show the rejection of $CaCl_2$ 0.1% (4A) and pure water permeability (4B) by different membranes. The numbers of the membranes correspond to the numbers of the polymers as follows: (1) commercial polysulfone 1; (2) polyfluorosulfone 2; (3) polysulfone crosslinked 7; (4) polysulfone carboxylated 4; and (5) polysulfone with mannose groups 12; (6) polysulfone with neomycin groups 13; (7) polysulfone with galactose groups 15; (8) polysulfone with chloroethane groups 10; (9) polyfluorosulfone with chloroethane groups 11; (10) polysulfone with chlorooctane groups 8; (11) polysulfone with phosphonate ester groups 18; (12) polysulfone with boronic acid groups 16; (13) polysulfone with phosphonic acid groups 19; and (14) polyquinone based polysulfone 3.

It was previously reported that hydrophilic groups on polymer chain can improve membrane permeability through hydrogen bonding with water molecules (Noshay and Robeson, 1976). It is also known that charged groups can improve salt retention from membrane surface through electrostatic interactions (Manttari et al., 2002).

The different types of membranes and their permeability to distilled water were compared as shown in FIG. 4 to establish the influence of different functional groups on membrane performance. Membranes made from polysulfone and polyfluorosulfone alone (membranes 1 and 2, respectively), however, yielded very low water fluxes due to the absence of functional groups on polymer chain.

Also the membranes with chloroethane (membrane 8) and chlorooctane (membrane 10) groups have no specific reactive sites to induce water sorption or ion complexation so the very small flux and salt rejection values obtained for these membranes were not unexpected. The permeability of membranes was enhanced considerably by an addition of hydrophilic acid and carbohydrate groups (e.g., membranes 5, 6, 7), which can induce water sorption by hydrogen bonding. However, the salt rejection maintained almost constant for all of membrane types despite of increase in water permeability. The possible explanation is that membranes containing hydrophilic groups on polymer backbone have more open structure with large number of pores, which enable high flux but do not restrict salt passage. Therefore, there is increase in water flux, but no change in salt rejection. In addition, the membrane charge induced by dissociation of acid groups can improve salt rejection as discussed previously.

Here we can see that difference between the materials structure affects the membrane performance.

Example 23

Rejection of 2-Naphthol-3,6-Disulfonic Acid Disodium Salt 0.1% by Different Membranes The 2-naphthol-3,6-disulfonic acid disodium salt has twice the charge of chloride and is also much larger (Schirg and Widmer, 1992). The influence of size and charge on salt rejection by the membranes 1-13 (the membrane numbers are as in the previous example) were determined with a 0.1% solution of the salt and the results are shown in FIG. 5.

Charge repulsion for 2-naphthol-3,6-disulfonic acid anion from membranes containing fixed negative charge on it surface is stronger than for monovalent Cl⁻ anion and hence, it is more easily excluded from membrane pores. The membranes with not charged surface exclude ions with accordance to their hydrated ion size.

The conclusion is that the greater retention of the 2-naphthol-3,6-disulfonic acid disodium salt is due to steric hindrance and larger charge, whereas the retention of NaCl is mainly affected by the charge.

Example 24

Comparison with Commercial Nanofiltration Membranes

Three main parameters—operative pressure, flux and rejection are commonly used for characterization of membrane performance. These parameters were measured for some of the membranes prepared in our lab which contain hydrophilic functional groups. The comparison with commercial membranes which also contain hydrophilic groups was done. The data about commercial membranes were reported and taken from the literature (Rautenbach and Groschl, 1990; Xiaofeng et al., 2002).

The properties of the membranes made from Polymer 4 (polysulfone carboxylated) (1$^{st}$ column), Polymer 19

(polysulfone with phosphonic acid group) ($2^{nd}$ column) and a blend of polysulfone with polystyrene-co-maleic anhydride copolymer ($3^{rd}$ column) were compared with the commercial NF membranes made from polypiperazine amide (FilmTec Corporation) ($4^{th}$ column), cellulose acetate (FilmTec Corporation FT30) ($5^{th}$ column) and sulfonated polysulfone (NTR-7450, Nitto Denko) ($6^{th}$ column) are summarized in Table 2.

TABLE 2

Comparison to commercial nanofiltration membranes

| | Membranes | | | | | |
|---|---|---|---|---|---|---|
| | | | Polysul. + | Commercial membranes | | |
| Membrane type | Polysulf. carboxyl. | Polysulfone + Phosph. acid | Polyst-co-maleic | Polypiperazine Amide | Cellulose Acetate | Sulfonated Polysulfone |
| Pressure (bar) | 10 | 10 | 10 | 6 | 10 | 10 |
| Flux (L/m² * hr) | 2750 | 4279 | 45 | 61 | 83 | 1.24 |
| Rejection NaCl 0.1% | 22 | 24 | 47 | 22 | 11 | 51 |

It can be seen that the membranes prepared in our laboratory had higher fluxes and higher or almost the same salt rejection, thus affording operation at lower pressures than the commercial membranes.

Example 25

Figure 6A:
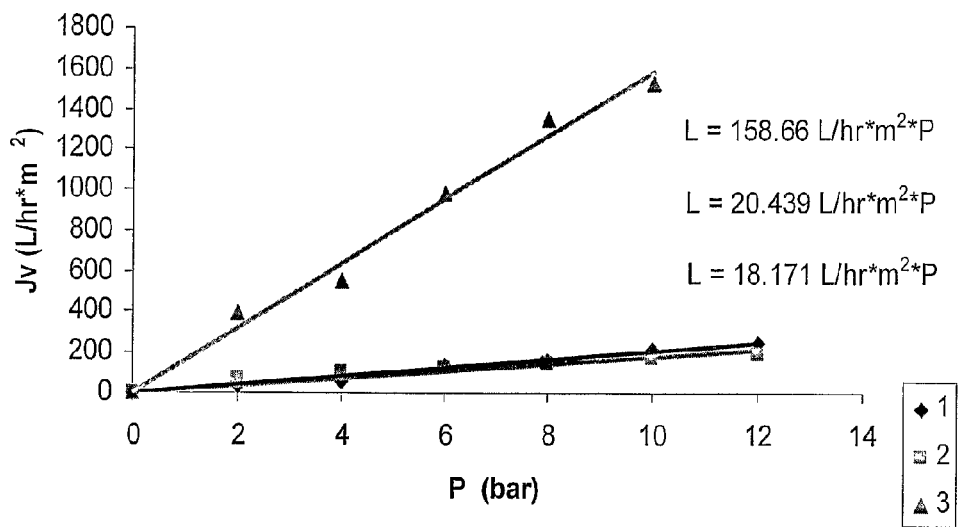
Figure 6B:
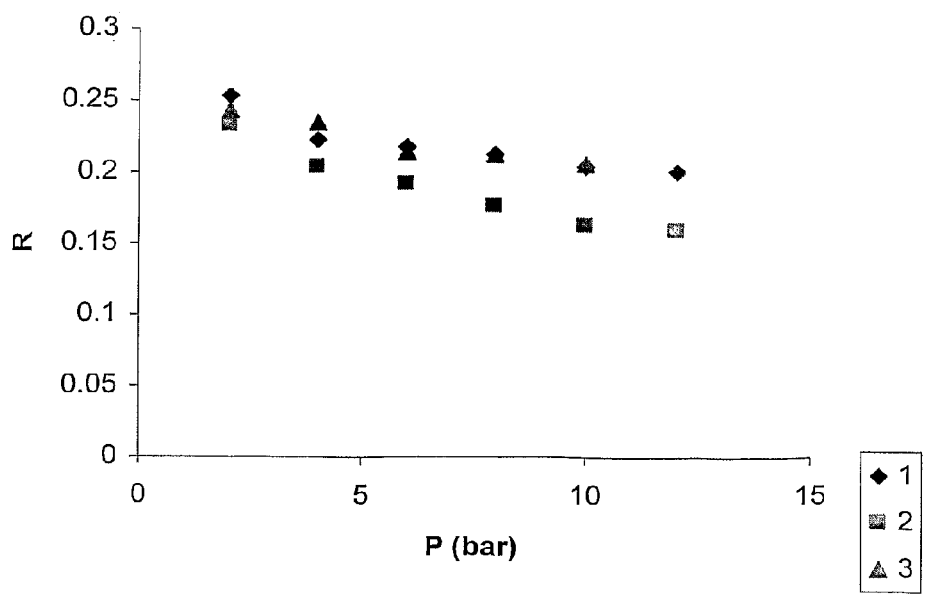

Membrane Performance for Polymers with Different Backbone Groups or Different Functional Groups The membranes prepared from polymers with different functional groups inside of polymer skeleton, i.e., polysulfone 1, polyfluorosulfone 2 and polyquinone based polysulfone 3, were tested for water permeability and $CaCl_2$ 0.1% rejection. The results are shown in FIGS. 6A-6B.

The comparison between water permeability and salt rejection were made for the three membranes. The polymer 2 with hexafluoroisopropylidene groups is more soluble in organic solvents used for membrane preparation than polymer 1 with hexaisopropylidene groups; however, this fact does not affect the polymer structure and properties like permeability and salt rejection. Permeability and salt rejection is very similar to membranes that have been casted from polysulfone polymer possibly because of similarity in molecular structure of these polymers. However, polyquinone based polysulfone 3 membrane had a higher water permeability, due to increase in hydrophilicity because of high content of hydrophilic sulfone groups.

Figure 6C:
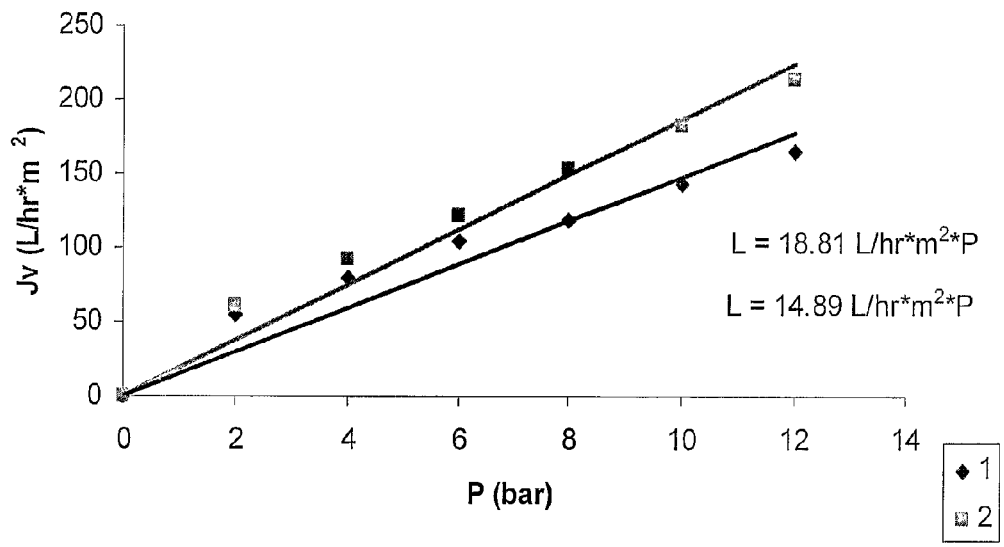
Figure 6D:
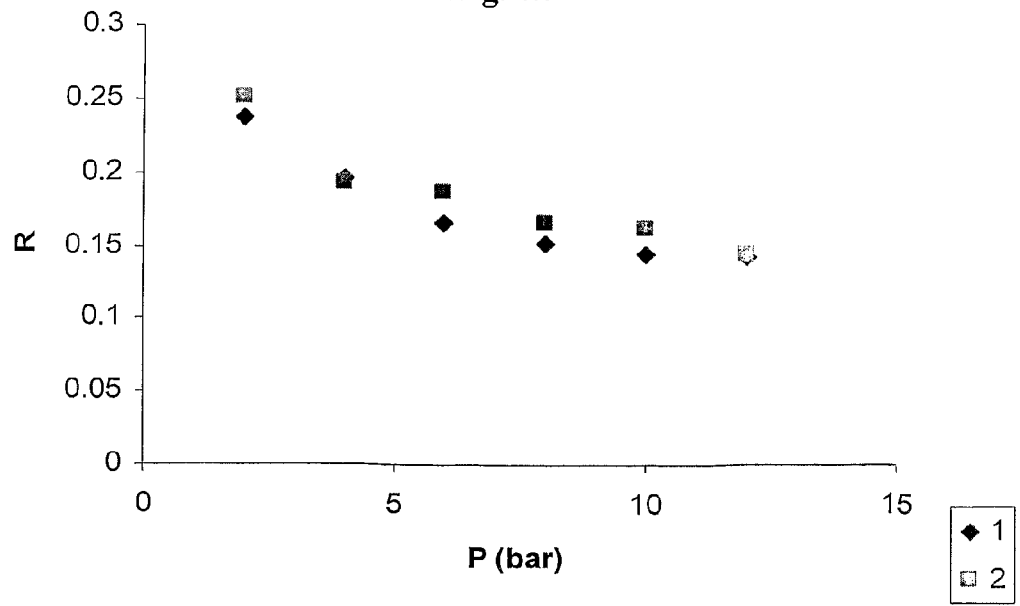

The salt rejection of these three membranes maintained constant possibly because of the same pore size distribution. The same results are shown in FIGS. 6C-6D for polysulfone and polyfluorosulfone membranes with chloroethane side groups (polymers 10 and 11, respectively). Therefore, to tailor membranes with considerable change in their performance it is required to attach to the polymer groups that are completely different from each other.

Example 26

Rejection of High Molecular Weight Organic Macromolecules

The retention of uncharged species like small organic molecules depends on size, shape, the chemical nature and the hydrophilicity/hydrophobicity of the compounds (Manttari et al., 2002).

A quantitative criterion for the retention characteristics of a membrane is the molecular weight cut off (MWCO), which is defined as the molecular weight at which 90% of the solutes are retained by the membrane. PEG (polyethylene glycol), PVA (polyvinyl alcohol) and PAA (polyacrylic acid) are different polar molecules and can be used as challenging high molecular weight models for organic materials to be retained in actual applications for determination of the MWCO of the membrane.

The rejection of PEG of different molecular weights, PVA and PAA—three solutes with different polarity and charge, were tested with polysulfone membrane containing carboxylic acid groups prepared from Polymer 4. The results in FIGS. 7A-7B show rejection of PEG of 600, 1000, 4000, 10000 and 20000 Da (7A) and of PEG 4000 Da, PVA 130000 Da and PAA 5000 Da (7B).

Molecular size of solutes is thus supposed to solely determine rejection via size exclusion through the membrane pores. PEG retention was lower than expected for a size exclusion mechanism. The first possible explanation is the presence of large pores that allow organic passage. The diameter of PEG solute with molecular weight of 20,000 is 7 nm.

The second explanation is the partitioning and subsequent diffusion of PEG in the membrane polymer matrix. Possibly, PEG is strongly adsorbed by the membrane polymer. It is conjectured that there is hydrophobic interactions between hydrophobic regions of the polymer and the PEG solutes. The adsorption of PVA and PAA noted in this case most probably results from hydrogen bonding between the alcohol's hydroxyl groups or carboxylic acid groups and hydrophilic functional groups on the polymer. The PVA has better rejection than PEG because of its high molecular weight. The diameter of PVA and PAA solutes is 18 nm and 17 nm respectively.

Because of PEG being an uncharged molecule, the membranes were tested how the affinity for membranes would change upon the presence of a charge on the solute, as exemplified in comparison between PEG (uncharged) and PAA (partially charged).

For all membranes, the uncharged solute is much less retained than the charged one. As a result the charge-dipole or dipole-dipole interactions between the membrane and PAA play an imported role, however they are not strong enough to improve membrane rejection.

Example 27

Antibacterial Membranes Containing Neomycin Groups

One of the main aspects of the present invention was to synthesize membrane containing neomycin groups and to check its resistance towards bacterial attack. The bacteria *E. coli* are known to be sensitive to neomycin action. Aminoglycosides are potent bacterial antibiotics that act by creating fissures in the outer membrane of the bacterial cell. The membrane of the invention containing neomycin groups on its surface is supposed to affect the bacteria through immediate electrostatic binding to anionic sites distributed on the cell surface.

The experiment included the following steps:

(i) incubation of *E. coli* on membrane surface with neomycin groups (prepared from Polymer 13) and on the same membrane without neomycin groups as a reference;

(ii) painting of membrane surface by two fluorescent dyes: PI (propidium iodide), a membrane-impermeant nucleic acid intercalator used to selectively stain dead cells, and DAPI (4',6-diamidino-2-phenylindole dihydrochloride salt), that penetrates through cellular membranes and stains the cellular nuclei of living or fixed cells; and (iii) fluorescence microscopy was used to observe bacteria development on the membrane surface.

The results are shown in FIGS. 8A-8C as fluorescence microscopy pictures of reference membrane without neomycin groups challenged by *E. coli* and painted with DAPI (8A), and of membrane with neomycin groups challenged by *E. coli* and painted with DAPI (8B) or PI (8C).

It can be observed that membranes without neomycin groups stained with DAPI included an enormous amount of bacteria on the membrane surface (8A) while the membranes with neomycin groups had almost no bacteria on the membrane surface (8B). The orange spots in FIG. 8C indicate the dead bacteria on the membrane surface.

These results indicate that the experiment was successful because the membrane containing neomycin group did not permit the development of bacteria on its surface and also lead to bacteria death.

Example 28

SEM Pictures of Cross-Section of Different Membranes

Surface and cross-sectional images of the membranes were taken using a scanning electron microscope (SEM). To obtain the surface and cross-sectional images, samples were fractured after soaking in liquid nitrogen. All samples for SEM were coated with carbon coating to reduce sample charging under the electron beam.

The SEM pictures for different membranes were made to characterize the membrane structure (sponge-like or finger-like structure) (Smolders et al., 1992), the membrane overall thickness, the top layer thickness and defects on the membranes.

FIGS. 9A-9H are SEM pictures of membranes prepared from Polysulfone 1 (9A), Polysulfone 1 expanded (9B), Polysulfone 12 with mannose groups (9C), Polysulfone 14 with galactose groups (9D), Polysulfone 13 with neomycin groups (9E), Polysulfone 19 with phosphonic acid groups (9F), Polysulfone 18 with phosphonate ester groups (9G), and Polysulfone 10 with chloroethane groups (9H).

A cross-section SEM of these membranes shows an ultrathin top surface layer on the open porous sub-layer with finger-like or sponge-like morphology. The average thickness of the top layers was 2 μm and the overall membranes thickness was 200 μm.

Theoretically, the membranes with high salt rejection and high flux dictates very thin and tight selective barrier layer. In our case, the membranes with considerably high fluxes have a sponge-like sub-layer, while the membranes with low fluxes have a finger-like porous sub-layer. The presence of macrovoids (large characteristically tear or finger-shaped voids found in polymer hollow fiber membranes) is not generally favorable because they may lead to weak spots in the membrane.

In the sponge-like structure many nuclei are initiated at the same time. Hence, the growth of every nucleus will be limited by other nearby nuclei because every nucleus consumes solvent. In this way the growth of macrovoids is impossible, and only smaller pores are formed, i.e., a sponge-like structure is formed.

It is necessary for the finger-like structure that limited number of nuclei formation takes place. We assume that nucleated droplets of the polymer lean phase in the immersed polymer solution are responsible for the initiation of macrovoids. When some of them expand to very large dimensions, macrovoids are formed, whereas a sponge-structured sub-layer is formed when new nuclei are being generated in front of the existing ones. The same general structure of top and porous sub layer is observed for many commercial NF membranes.

Conclusions Based on Examples 1-28

The different polymers for membrane preparation were successfully synthesized and characterized by NMR, IR and $^{13}C$—(CP-MAS) NMR techniques. In addition GPC analysis was performed to determine Mw, Mn and Mw/Mn of synthesized polymers. From GPC results, it was shown that most of the measured polymers have high molecular weights. However, not all of prepared polymers have good solubility in organic solvents, thus restricting their characterization.

The SEM of membrane cross-sections showed asymmetric membrane structures consisting of a thin top layer supported by a porous sub-layer with two different morphologies, one is with sponge-like pores and the other with finger-like pores.

The membranes were developed and presented high potential for the water treatment applications as NF-UF membranes. The synthesized membranes presented rejection for monovalent ions in the range of 18-50% and for multivalent ions in the range of 20-60%. These results are in agreement with theoretical definition of NF membranes that have rejection for monovalent ions in the range of 0-50% and for multivalent ions in the range of 20-90%. The membranes for ultrafiltration have no rejection for multivalent ions, but reject high molecular weight organics. Therefore, prepared membranes are in the range of both NF and UF properties with accordance to salt and organics rejections.

The membranes of the invention have characteristics of high flux, moderate salt rejections and low operative pressures. In comparison to commercial membranes the fluxes were relatively high without loss of the selectivity, which enable operation at lower pressures. The comparison was made with commercial membranes which have same or very similar polymer structures and prepared by phase-inversion method. The addition of functional groups applied them the new and improved properties useful for water treatment.

Whereas salt rejection is rather moderate with most of the modification tested, the rejection for high molecular weight organic molecules is surprisingly low. No decent explanation can be given to this phenomenon at this stage. Partitioning and subsequent diffusion of PEG in the membrane polymer matrix may result in lower retention. Possibly, PEG is strongly adsorbed by the membrane polymer. As a consequence, the rejection graphs were found to be depending on the charge of the solute.

Example 29

Preparation of Membranes for Reverse Osmosis

Membranes were prepared by casting Polymers 4, 5, 7 and 9 from a solution of DMSO and from a melt solution. The membranes of 8 microns on height were used as reverse osmosis membranes allowing a rejection of 92% NaCl and 95% $CaCl_2$.

Example 30

Preparation of Membranes with Homogeneous Nanopores for Nano- and Ultra-Filtration In this example, we describe the manufacturing of NF-UF membranes with homogeneous pore size for water treatment applications by three different techniques for homogeneous pore creation on previously prepared membranes, by phase-inversion method induced by immersion precipitation process.

Materials and Methods

Aromatic polysulfone Polymer 1 was purchased from Aldrich and used as received for membrane with incorporated nanoiron particles. The aromatic crosslinked Polysulfone 7 was obtained by lithiation and acylation reactions through insertion of ethylene glycol functional groups as described in Example 6 above. The degree of substitution (DS) was 2.0 functional groups per one polymer repeating unit. The modified polymer was characterized by $^{13}C$—(CP-MAS) NMR, NMR in solution and IR methods. The uniform pore formation from crosslinked polymer was obtained by base hydrolysis of ethylene glycol units. Polystyrene-co-maleic anhydride copolymer of analytical purity was purchased from Aldrich and used as received for membrane formation from the mixture of polymers. All the membranes were tested with different inorganic salt solutions, characterized by HRSEM and AFM techniques and compared with commercially known membranes.

All the apparatus and measurements were as in the previous section.

Example 30.1

Nanoiron Acid Etching Method for Monodispersed Nanoporous Polysulfone Membrane

The method includes synthesis of a polysulfone membrane in the presence of selective $Fe_2O_3$ nanoparticles (50 nm size, prepared by hydrolysis of $FeCl_3 \times 6H_2O$, analytical grade, Merck KGaA), which were introduced by a magnetic field into the polymer network. A casting solution was prepared containing, by weight, 20% of polysulfone 1, 2% of $Fe_2O_3$ nanoparticles, and 78% of N-methyl pyrrolidone (NMP) as the solvent. These nanoparticles were formed from in dilute $FeCl_3$ solution by the following equation:

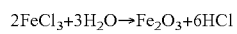

The $Fe_2O_3$ nanoparticles with desired size were obtained from a dilute solution through control of the growth conditions (Sugimoto and Muramatsu, 1996). Membrane samples were cast onto the glass surface using a casting knife to a thickness of 200 μm. The solvent was evaporated at 300° C. under nitrogen for two minutes before the cast film together with the glass plate was immersed in ice-cold water for 24 hours. The phase inversion started immediately and after few minutes a thin polymeric film separated out from the glass. It was repeatedly washed with demineralized water and wet stored. The actual thickness of the membranes was measured using a micrometer. The membranes were press compacted by compressed air for 30 minutes to achieve final structure. Dissolution of the iron nanoparticles with the etching agent HCl led to the new pore creation, which was confirmed by AFM and HRSEM measurements.

FIGS. 10A-10C depict AFM pictures of acid etching of nanoiron particles from Polysulfone 1 membrane at different periods of time: before etching (FIG. 10A, 20-50 nm), after 1 hr etching (FIG. 10B, 20-100 nm), and after 6 hr etching (FIG. 10C, 80-100 nm). The scale on the left side of the figures shows the size of the pores.

FIGS. 11A-11C depict HRSEM pictures of acid etching of nanoiron particles from Polysulfone 1 membrane at different periods of time: before etching (FIG. 11A, 50-100 nm), after 1 hr etching (FIG. 11B), and after 2 hr etching (FIG. 11C). FIGS. 12A-12B show, respectively, the water flux and the rejection of $CaCl_2$ 0.1% measured before (diamonds) and after 1 hr (rectangles), 2 hr (triangles) and 6 hr (squares) hydrolysis.

Membranes with no functional groups on polymer chain can reject salts and other dissolved substances only due to sieving mechanism, with accordance to pore size distribution. The nanoiron particle distribution inside of polymer matrix was not homogeneous despite of magnetic field influence induced by the magnet, as it can be seen from FIG. 10.

The nanoiron particles have also formed aggregates or clusters, thus increasing their pore size after acid etching. FIGS. 10 and 11 confirmed the enlargement of pore size with increase in etching time due to nanoiron aggregation into the big clusters.

FIG. 12 shows the decrease in salt rejection after etching, caused by creation of numerous pores. Increase in the number of pores in the membrane and/or an increase in their pore size allow more solute molecules to go through, thus lowering rejection. However, the salt rejection of this membrane was too high although the pores are as large as 100 nm. The pores were observed to be closed and salt rejection measurements were carried out to confirm the closeness of the pore structure. It means that the pores are not interconnected with each other across the membrane; i.e. the closed pore structure in the membrane. The water flux increased with the increase of etching time, which is coincident with the increasing pore size and decreasing in skin layer resistance. The interconnectivity of pores could be enhanced by the increasing of etching time.

The comparison between a commercial polysulfone membrane (Kalle Co.) and the polysulfone prepared in our laboratory is shown in Table 3.

TABLE 3

Comparison between laboratory prepared and commercial polysulfone membranes

| Membrane Type | Commercial polysulfone membrane) | Laboratory polysulfone membrane |
|---|---|---|
| Pressure (bar) | 34 | 10 |
| Flux (L/hr * m²) | 6 | 30 |
| Rejection of $CaCl_2$ (%) | 25 | 22 |

This commercial membrane was made from polysulfone polymer by phase-inversion method. The membrane prepared in our lab was also made from polysulfone polymer by phase-inversion method, in addition to acid etching of nanoiron particles to afford pore creation. This acid etching method helped to increase the permeability of solution through the membrane. Comparison between those two membranes shows considerably higher fluxes and lower operating pressures for our laboratory prepared membrane, while keeping on same rejection.

Example 30.2

Base Hydrolysis Method of Crosslinked Polymer for Mono-Dispersed Nanoporous Polysulfone Membrane The crosslinked Polysulfone 7 membrane manufacture was performed by the wet-phase inversion method and included preparation of casting solution consisting of 20% polysulfone crosslinked via ethylene glycol and 80% of DMSO as the solvent. This solution was slightly swollen therefore 20% of second solution was added consisting of 20% polysulfone crosslinked and 80% NMP to afford the homogeneous mixture useful for casting. The homogeneous solution was casted onto the glass surface with a casting knife, followed by solvent evaporation at 300° C. during 2 minutes. The casted film was immersed into the distilled water bath at 0° C. for overnight period of time. The membrane was press compacted by compressed air for 30 minutes to achieve the final structure. Base hydrolysis of ethylene glycol ester bonds by NaOH at different concentrations and different periods of time was made to achieve monodispersed nanopores at size of the crosslinker (ethylene glycol) according to the equation below.

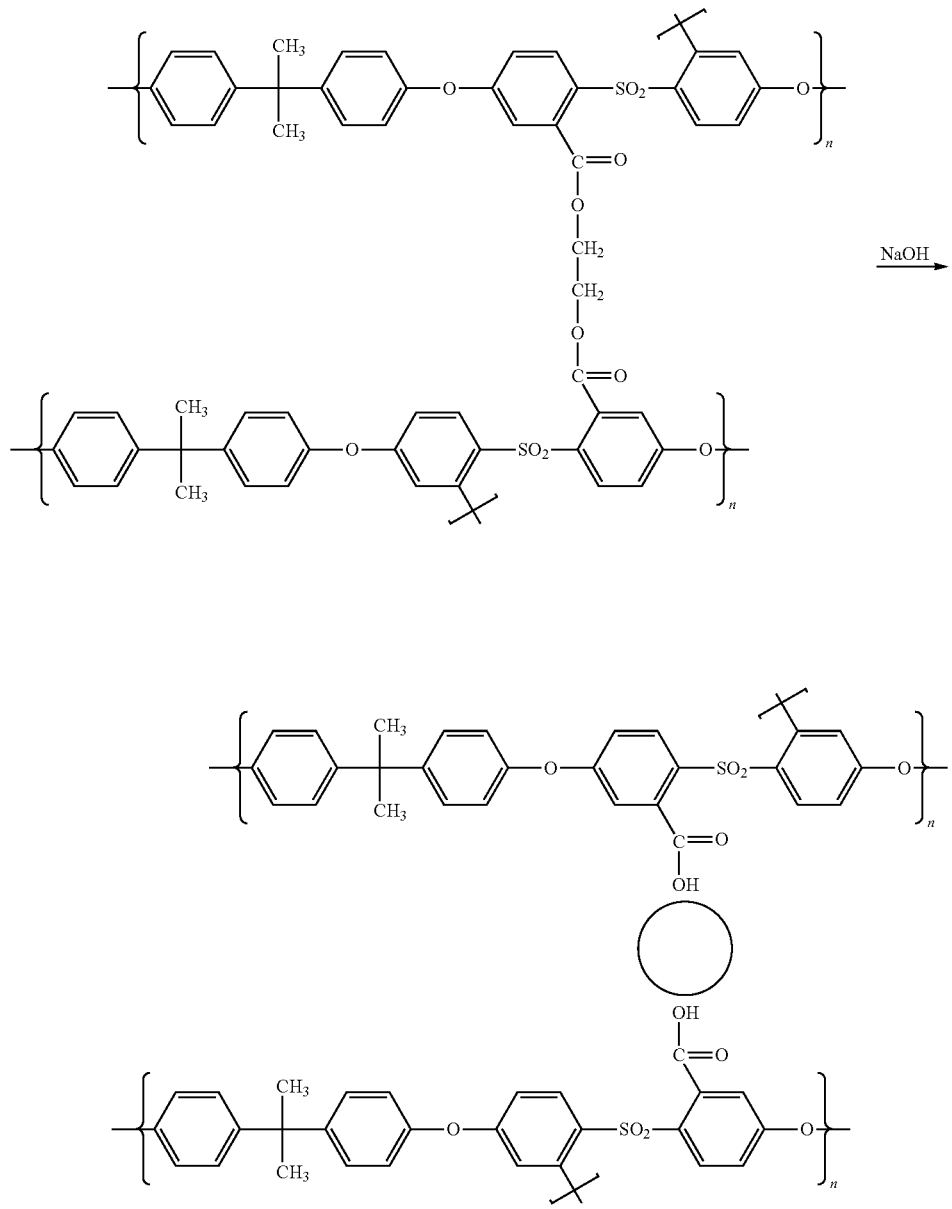

Later, the carboxylated polymer membranes were converted into their acid form by acidification procedure, entailing the immersion of membranes for 30 min in hydrochloric acid followed by soaking for 12 hr in deionized water.

Flux and rejection of $CaCl_2$ 0.1% measurements before (diamonds) and after 6 hr hydrolysis with NaOH 2M (squares) and NaOH 4M (triangles) are shown in FIGS. 13A-13B, respectively.

In most state of art of NF membranes, the negative groups are primarily from carboxylic acid groups which readily complex with calcium and sodium cations.

The results show that increase in flux caused by increase in porosity continues after the base hydrolysis showing that a large number of nanodispersed pores were formed after the base hydrolysis allowing a better filtration with exactly the same rejection. Although the permeability of the membrane increased considerably after hydrolysis by NaOH 4M, the rejection values maintained almost constant (±20%). This fact indicates the creation of homogeneous pore size from hydrolysis of ethylene glycol ester bonds.

The appearance of carboxylic acid groups after base hydrolysis helped to keep the rejection high. This result is in agreement with our previous result showing that the membrane consists of polysulfone with carboxylic acid groups.

The comparison between commercial polysulfone sulfonated membrane (Nitto Denko) and laboratory prepared membranes (polysulfone carboxylated membrane according to Guiver et al., U.S. Pat. No. 4,894,159 and polysulfone carboxylated membrane according to the invention) was done to determine the usefulness of this method. The results are shown in Table 4 below.

TABLE 4

Comparison between laboratory prepared and commercial membranes

| Membrane Type | Commercial Polysulfone sulfonated membrane | Patent Polysulfone carboxylated membrane | Laboratory Polysulfone carboxylated membrane |
|---|---|---|---|
| Pressure (bar) | 10 | 11 | 10 |
| Flux (L/hr * m$^2$) | 500 | 2100 | 2200 |
| Rejection (%) | 15 | 20 | 20 |

In comparison to commercial membranes that contain hydrophilic sulfonic and carboxylic acid groups, our membrane was found to have higher water flux and higher salt rejection. However, the membrane prepared from polysulfone with carboxylic acid groups according to U.S. Pat. No. 4,894,159 has the same rejection and flux values (there is no information supplied about pore homogeneity in this membrane). Therefore, our preparation method affords a membrane with improved flux and selectivity by homogeneous pore creation.

Example 30.3

Polysulfone and Poly (Styrene-Co-Maleic Anhydride) Membrane-Pore Creation by Base Hydrolysis Method The purpose of this method was to prepare membrane from blend of two different polymers—polysulfone and polystyrene-co-maleic anhydride at 80:20 percent ratio and to check the influence of base hydrolysis of anhydride bonds on membrane performance.

The appearance of hydroxyl groups and the change in polymer structure after base hydrolysis would be expected to influence polymer properties like increase in hydrophilicity induced through the hydrogen bonding. The salt rejection can be also improved due to rejection by the negative charges of dissociated carboxylic groups.

Figure 14A:
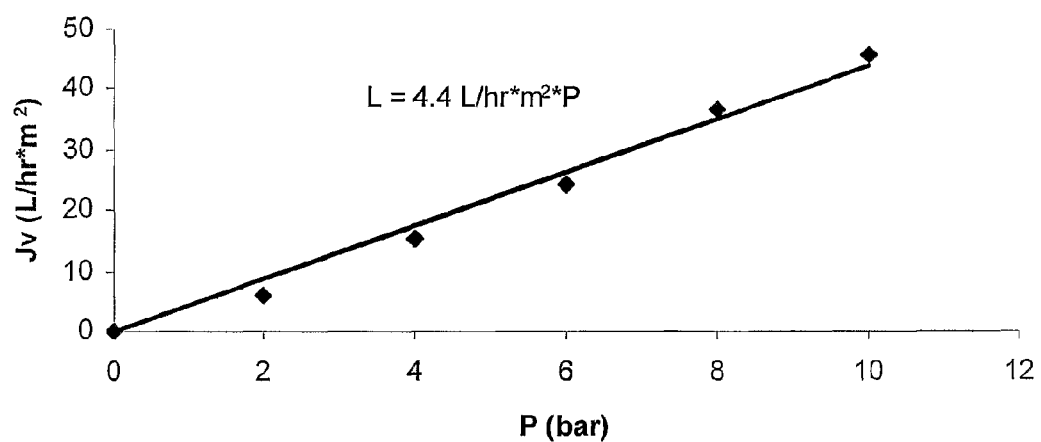
Figure 14B:
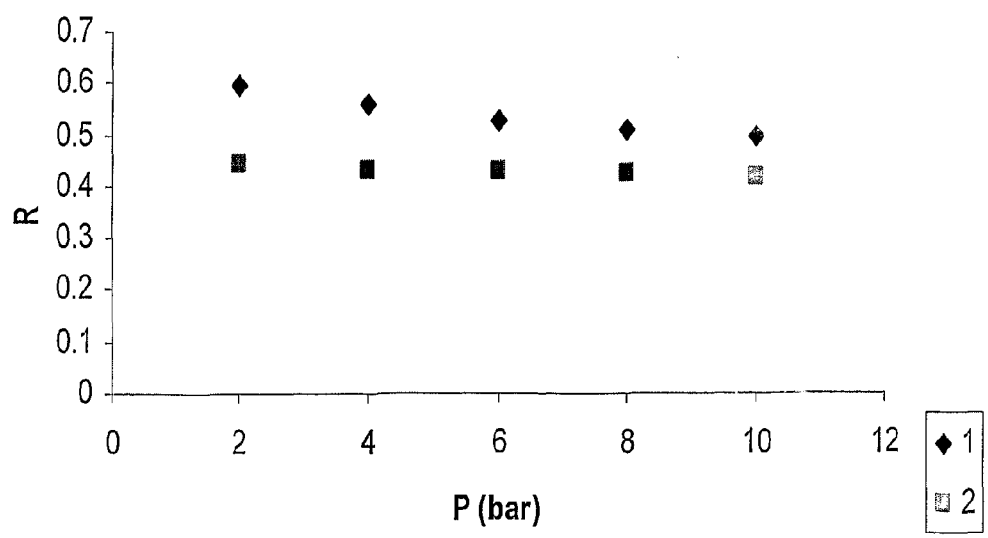
Figure 14C:
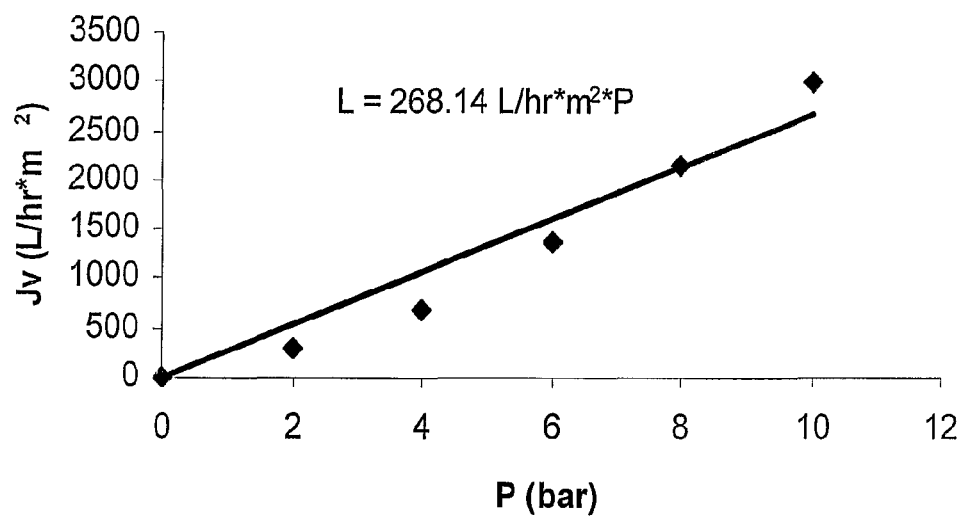
Figure 14D:
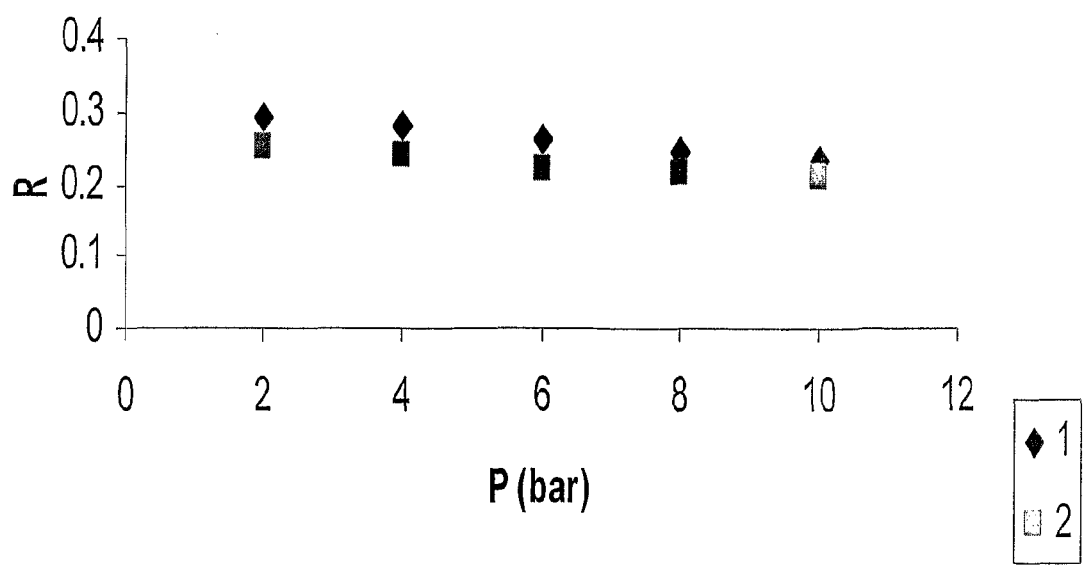

The membrane was manufactured-through wet-phase inversion method by preparation of casting dope consisting of 20% polymer blend (20% of poly (styrene-co-maleic anhydride) and 80% of polysulfone) in 80% of NMP as the solvent. The homogeneous solution was casted using a casting knife, followed by solvent evaporation at 300° C. during 2 minutes. The membrane was immersed into the distilled water bath at 0° C. for overnight. The press compaction by compressed air was applied to achieve the final structure. The base hydrolysis of anhydride bonds by NaOH 2M at different periods of time was performed to afford carboxylic acid sodium salt. The carboxylated polymer membranes were converted into their acid form by acidification procedure, entailing the immersion of membranes for 30 min in hydrochloric acid followed by soaking for 12 hr in deionized water. The water flux and rejection of $CaCl_2$ 0.1% (diamonds) and NaCl 0.1% (squares) measurements after 2 hr 2M NaCl hydrolysis are shown in FIGS. 14A-14B, respectively, and after 12 hr 2M NaCl hydrolysis in FIGS. 14C-14D, respectively.

After two hour hydrolysis, we got a high performance membrane with high selectivity in compensation for low permeability. The increase in hydrolysis time increases the water flux through the membrane thus contributing to creation of the new pores. The membrane rejection decreased by half of its original value with increasing hydrolysis time. The appearance of carboxylic groups after base hydrolysis helped to keep moderate rejection values.

The mechanism of pore formation by this method is still under investigation and it was assumed that pores created by structural changing of polymer matrix in space, thus enabling the different polymer chains rearrangement after base hydrolysis. Possibly, the pores were formed by the new distances between the polymer chains. There also was a very sharp increase in flux and decrease in salt rejection with increase in hydrolysis time. It can be assumed that the membrane structure was destroyed after a long hydrolysis period of time.

REFERENCES

Guiver, M. D., J. W. ApSimon, O. Kutowy, The modification of polysulfone by metalation, J. Polym. Sci. Polym. Lett. Ed. 26, 123-127 (1988).

Guiver, M. D., Method of manufacturing a reverse osmosis membrane and the membrane so produced, U.S. Pat. No. 4,894,159 (1990).

Guiver, M. D., O. Kutowy, J. W., A. Simon, Functional-group polysulfones by bromination metalation, Polymer 30, 1137-1142 (1989).

Johnson, B. C., I. Yilgor, C. Tran, M. Iqbal, J. P. Wightman, D. R. Lloyd, J. E. McGrath, Synthesis and characterization of sulfonated poly(arylene ether sulfones), J. Polym. Sci. 22, 721-737 (1984).

Manttari, M., A. Pihlajamaki, M. Nystrom. Comparison of nanofiltration and tight ultrafiltration membranes in the filtration of paper mill process water, Desalination 149, 131-136 (2002).

Normor, W., B. Eisenberg, Ion permeation and glutamate residues linked by Poisson-Nernst-Plank theory in L-type calcium channels, Biophys. J. 75(3), 1287-1305 (1998).

Noshay, A., L. M. Robeson, Sulfonated polysulfone, J. Appl. Polym. Sci. 20, 1885-1903 (1976).

Petersen, R. J. Composite Reverse Osmosis and Nanofiltration Membranes. *J. Memb. Sci.* 83, 81-150 (1993).

Rautenbach, R., A. Groschl, Separation potential of nanofiltration membranes, Desalination 77, 73-84 (1990).

Rodemann, K., E. Staude, Preparation and characterization of porous polysulfone membranes with spacer-bonded N-containing groups, J. Appl. Polym. Sci. 57, 903-910 (1995).

Rodemann, K., E. Staude, Synthesis and characterization of affinity membranes made from polysulfone, J. Membr. Sci. 88, 271-278 (1994).

Schirg, P., F. Widmer, Characterization of nanofiltration membranes for the separation of aqueous dye-salt solutions, Desalination 89, 89-107 (1992).

Skipper, N., G. W. Neilson, S. Cummings, An x-ray-diffraction study of Ni -2+(AQ) and MG-2+(AQ) by difference methods, J. Phys: Condens Matter 1, 3489-3506 (1989).

Skipper, N., G. W. Neilson, X-ray and neutron-diffraction studies on concentrated aqueous-solution of sodium-nitrate and silver-nitrate, J. Phys: Condens Matter 1, 4141-4154 (1989).

Smolders, C. A., A. J. Reuvers, R. M. Boom, I. M. Wienk, Microstructures in phase-inversion membranes. 1. formation of macrovoids, J. of Mem. Sci. 73, 259-275 (1992).

Tremblay, A. Y., C. M. Tarn, M. D. Guiver, M. M. Dal-Cin, Studies on hydrophilic polysulfone ultrafiltration membranes, Can. J. Chem. Eng. 69, 1348-1351 (1991).

Vezzani, D., S. Bandini, Donnan equilibrium and dielectric exclusion for characterization of nanofiltration membranes, Desalination 149, 477-483 (2002).

Xiaofeng, L., X. Bian, L. Shi, Preparation and characterization of NF composite membrane, J. of Mem. Sci. 210, 3-11 (2002).

The invention claimed is:

1. A modified polysulfone polymer containing repeat units selected from the group consisting of:

-phenyl-$X_1$-phenyl-$SO_2$-phenyl-$X_2$—; and

-phenyl-$X_3$-phenyl-$X_4$-phenyl-$SO_2$-phenyl-$X_5$—;

wherein
each phenyl ring is linked to the next phenyl ring at the ortho, meta or para position; $X_1$ to $X_5$ are the same or different and each is O, S, P(R), P(O)(R), B(R), N(R), or R', where R is an unsubstituted aliphatic or aromatic $C_1$-$C_{20}$ hydrocarbyl, or R is substituted by halogen or by a group containing a heteroatom selected from the group consisting of O, S, and N, and R' is an aliphatic or aromatic $C_1$-$C_{20}$ hydrocarbylene or such hydrocarbylene interrupted by one or more heteroatoms selected from the group consisting of O, S, P(R), P(O)(R), B(R), and N(R), or substituted by one or more halogen, O, S, P(R)$_2$, P(O)(R)$_2$, B(R)$_2$, N(R)$_2$ or $C_1$-$C_{20}$ hydrocarbyl; and (a) two different phenyl rings are substituted ortho to the sulfone group by two or three identical or different functional groups selected from the group consisting of:
(i) —CO—$R_1$, wherein $R_1$ is —OH, halohydrocarbyloxy, a mono- or oligosaccharide residue or a derivative thereof;
(ii) —CON($R_2$)$R_3$, wherein $R_2$ is H or hydrocarbyl and $R_3$ is a mono- or oligosaccharide residue or a derivative thereof;
(iii) —B(OR$_2$)$_2$, wherein $R_2$ is H or hydrocarbyl; and
(iv) —P(=O)(OR$_2$)$_2$, wherein $R_2$ is H or hydrocarbyl; or
(b) one phenyl ring is substituted by a —B(OR$_2$)$_2$ group ortho to the sulfone group, wherein $R_2$ is H or hydrocarbyl; or
(c) a group —CO—O—$R_4$—O—CO—, wherein $R_4$ is alkylene, links two chains of the polymer backbone;
provided that the modified polysulfone is not a carboxylated polysulfone comprising repeat units of the formula [-phenyl-C(CH$_3$)$_2$phenyl-O-phenyl-SO$_2$-phenyl-O—] and two carboxy groups ortho to the sulfone group in the two phenyl rings adjacent to the sulfone group.

2. The polysulfone polymer according to claim 1, wherein:
the hydrocarbyl radical $R_2$ alone or as part of the hydrocarbyloxy radical $R_1$ is a straight or branched, saturated or unsaturated, acyclic or cyclic, or aromatic, radical of 1-20, carbon atoms;
in the halohydrocarbyloxy group $R_1$, halo is a halogen atom selected from the group consisting of F, Cl, Br and I, and $R_1$ is unsubstituted or substituted by a functional group selected from the group consisting of amino, silyl, hydroxyl, carboxy and esters thereof, thiol, carboxamido, and phenoxy, or by a residue of an agent selected from the group consisting of a sugar, drug, antibiotic, enzyme, peptide, DNA, RNA, NADH, ATP, and ADP;
$R_1$ and $R_3$ each is a monosaccharide residue in the furanose or pyranose form selected from the group consisting of arabinose, fructose, galactose, glucose, mannose, ribose and xylose and ethers, esters, isopropylidene and glycoside derivatives thereof, or $R_1$ and $R_3$ each is an oligosaccharide residue containing 2-10 monosaccharide residues and ethers, esters, isopropylidene and glycoside derivatives thereof, the glycoside derivative being an aminoglycoside antibiotic selected from the group consisting of gentamicin, neomycin, streptomycin, tobramycin, amikacin, and kanamycin.

3. The polysulfone polymer according to claim 1, wherein the functional group is —CO$R_1$ and $R_1$ is OH, Cl—($C_2$-$C_8$) alkoxy, or a mannose residue optionally substituted by two isopropylidene groups.

4. The polysulfone polymer according to claim 1, wherein the functional group is —CON($R_2$)$R_3$, $R_2$ is H, and $R_3$ is a residue of galactose, glucose or mannose or a derivative thereof, or $R_3$ is the residue of an aminoglycoside antibiotic selected from the group consisting of gentamicin, neomycin, streptomycin, tobramycin, amikacin, and kanamycin.

5. The polysulfone polymer according to claim 1, wherein the functional group is —B(OR$_2$)$_2$ and $R_2$ is H or $C_1$-$C_6$, alkyl.

6. The polysulfone polymer according to claim 1, wherein the functional group is —P(=O)(OR$_2$)$_2$ and $R_2$ is H or $C_1$-$C_6$, alkyl.

7. The crosslinked polysulfone polymer according to claim 1, wherein the functional group is —COO—$R_4$—OCO— and said group links two different chains of the polysulfone polymer backbone through the positions ortho to the sulfone group, and $R_4$ is $C_2$-$C_4$ alkylene.

8. The polysulfone polymer according to claim 1, wherein the polysulfone contains repeat units of the formula:

-phenyl-$X_1$-phenyl-$SO_2$-phenyl-$X_2$—;

wherein $X_1$ and $X_2$ each O or S; and
(a) two different phenyl rings are substituted ortho to the sulfone group by two or three identical or different functional groups selected from the group consisting of:
(i) —CO—$R_1$, wherein $R_1$ is —OH, halohydrocarbyloxy, a mono- or oligosaccharide residue or a derivative thereof;

(ii) —CON($R_2$)$R_3$, wherein $R_2$ is H or hydrocarbyl and $R_3$ is a mono- or oligosaccharide residue or a derivative thereof;
(iii) —B(O$R_2$)$_2$, wherein $R_2$ is H or hydrocarbyl; and
(iv) —P(=O)(O$R_2$)$_2$, wherein $R_2$ is H or hydrocarbyl; or
(b) one phenyl ring is substituted by a —B(O$R_2$)$_2$ group ortho to the sulfone group; or
(c) a group —CO—O—$R_4$—O—CO—, wherein $R_4$ is alkylene, links two chains of the polymer backbone; and each phenyl ring is linked to the next phenyl ring at the ortho, meta or para position.

9. The polysulfone polymer according to claim 8, wherein $X_1$ and $X_2$ are O and the two phenyl rings adjacent to the sulfone group are substituted ortho to the sulfone group by the same or different functional groups selected from the group consisting of:
(i) —CO—$R_1$, wherein $R_1$ is —OH, halohydrocarbyloxy, a mono- or oligosaccharide residue or a derivative thereof;
(ii) —CON($R_2$)$R_3$, wherein $R_2$ is H or hydrocarbyl and $R_3$ is a mono- or oligosaccharide residue or a derivative thereof;
(iii) —B(O$R_2$)$_2$, wherein $R_2$ is H or hydrocarbyl; and
(iv) —P(=O)(O$R_2$)$_2$, wherein $R_2$ is H or hydrocarbyl.

10. The polysulfone polymer according to claim 9 containing one —COOH group ortho to the sulfone group in one of the phenyl rings adjacent to the sulfone group and two further —COOH groups at ortho positions to the sulfone group in the other phenyl ring adjacent to the sulfone group.

11. The polysulfone polymer according to claim 1, wherein the polysulfone contains repeat units of the formula:

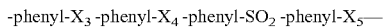

wherein $X_3$ is $C_2$-$C_8$ alkyl, and may be further substituted by halogen, $X_4$ and $X_5$ each is O or S; and
(a) two different phenyl rings are substituted ortho to the sulfone group by two or three identical or different functional groups selected from the group consisting of:
(i) —CO—$R_1$, wherein $R_1$ is —OH, halohydrocarbyloxy, a mono- or oligosaccharide residue or a derivative thereof;
(ii) —CON($R_2$)$R_3$, wherein $R_2$ is H or hydrocarbyl and $R_3$ is a mono- or oligosaccharide residue or a derivative thereof;
(iii) —B(O$R_2$)$_2$, wherein $R_2$ is H or hydrocarbyl; and
(iv) —P(=O)(O$R_2$)$_2$, wherein $R_2$ is H or hydrocarbyl; or
(b) one phenyl ring is substituted by a —B(O$R_2$)$_2$ group ortho to the sulfone group; or
(c) a group —CO—O—$R_4$—O—CO—, wherein $R_4$ is alkylene, links two chains of the polymer backbone; and each phenyl ring is linked to the next phenyl ring at the ortho, meta or para position.

12. The polysulfone polymer according to claim 11, wherein $X_3$ is —C(CH$_3$)$_2$— or —C(CF$_3$)$_2$—.

13. The polysulfone polymer according to claim 12, wherein $X_3$ is —C(CH$_3$)$_2$— and $X_4$ and $X_5$ are O and the two phenyl rings adjacent to the sulfone group are substituted ortho to the sulfone group by the same or different functional groups selected from the group consisting of:
(i) —CO—$R_1$, wherein $R_1$ is —OH, halohydrocarbyloxy, a mono- or oligosaccharide residue or a derivative thereof;
(ii) —CON($R_2$)$R_3$, wherein $R_2$ is H or hydrocarbyl and $R_3$ is a mono- or oligosaccharide residue or a derivative thereof;
(iii) —B(O$R_2$)$_2$, wherein $R_2$ is H or hydrocarbyl; and
(iv) —P(=O)(O$R_2$)$_2$, wherein $R_2$ is H or hydrocarbyl.

14. The polysulfone polymer according to claim 13, wherein the two functional groups ortho to the sulfone group in the two phenyl rings are identical and are selected from the group consisting of —COO—(CH$_2$)$_8$—Cl and —COO—(CH$_2$)$_2$—Cl.

15. The polysulfone polymer according to claim 13, wherein
(i) one of the two functional groups ortho to the sulfone group in one of the two phenyl rings is —COOH and the other functional group is 2,3:5,6-di-O-isopropylidenemannofuranose ortho to the sulfone group in the other phenyl ring;
(ii) one functional group ortho to the sulfone group in one of the two phenyl rings is —COOH and another functional group in the other phenyl ring is a neomycin residue;
(iii) one functional group ortho to the sulfone group in one of the two phenyl rings is 2,3,4,6-tetra-O-pivaloyl-β-D-galactopyranosylaminocarbonyl and the other functional group is a β-D-galactopyranosylaminocarbonyl residue in the other phenyl ring; or
(iv) the two functional groups ortho to the sulfone group in the two phenyl rings are identical and are the β-D-galactopyranosylaminocarbonyl residue.

16. The polysulfone polymer according to claim 13 containing two identical phosphonic acid or ester group —P(=O)(O$R_2$)$_2$, wherein $R_2$ is H or $C_1$-$C_6$ alkyl, ortho to the sulfone group in the two phenyl rings.

17. The polysulfone polymer according to claim 12, wherein $X_3$ is —C(CF$_3$)$_2$— and $X_4$ and $X_5$ are O and the two phenyl rings adjacent to the sulfone group are substituted ortho to the sulfone group by the same or different functional groups selected from the group consisting of:
(i) —CO—$R_1$, wherein $R_1$ is —OH, halohydrocarbyloxy, a mono- or oligosaccharide residue or a derivative thereof;
(ii) —CON($R_2$)$R_3$, wherein $R_2$ is H or hydrocarbyl and $R_3$ is a mono- or oligosaccharide residue or a derivative thereof;
(iii) —B(O$R_2$)$_2$, wherein $R_2$ is H or hydrocarbyl; and
(iv) —P(=O)(O$R_2$)$_2$, wherein $R_2$ is H or hydrocarbyl.

18. The polysulfone polymer according to claim 17, wherein
(i) the two functional groups ortho to the sulfone group in the two phenyl rings are identical and are COOH; or (ii) the two functional groups ortho to the sulfone group in the two phenyl rings are identical and are selected from the group consisting of —COO—(CH$_2$)$_8$—Cl and —COO—(CH$_2$)$_2$—Cl.

19. The polysulfone polymer according to claim 17, containing identical boronic acid functional groups —B(OH)$_2$ or alkyl ester thereof ortho to the sulfone group in the two phenyl rings adjacent to the sulfone group.

20. The polysulfone polymer according to claim 11, containing the boronic acid functional group —B(OH)$_2$ ortho to the sulfone group in one of the two phenyl rings adjacent to the sulfone group.

21. The polysulfone polymer according to claim 11, wherein the functional group is —COO—CH$_2$—CH$_2$—OCO— linking two different chains of the polysulfone polymer backbone through the positions ortho to the sulfone group.

22. A membrane composed of a modified polysulfone polymer according to claim 1.

23. The membrane according to claim 2, selected from the group consisting of reverse osmosis, nanofiltration, ultrafiltration and microfiltration membrane.

24. The membrane according to claim 23, having a thickness in the range from 0.02 to 400 μm, preferably 2 μm.

25. The membrane according to claim 23 with homogeneous pore size in the range from 10 nm to 10 μm, selected from the group consisting of:
(i) a nanofiltration membrane with homogeneous pore size in the range of 10 to 100nm, preferably 10 nm;
(ii) an ultrafiltration membrane with homogeneous pore size in the range of 100 nm to 1μm, preferably 200 nm; and
(iii) a microfiltration membrane with homogeneous pore size in the range of 1 to 10μm, preferably 2μm.

26. The polysulfone polymer according to claim 1 selected from the group consisting of polymers herein identified as Polymers 5-19.

27. A method for preparation of a monodispersed nanoporous polymeric membrane with homogeneous pore size, comprising:
(i) preparing a polymeric membrane by immersion precipitation induced phase-inversion method;
(ii) introducing nanoparticles into the polymer network; and
(iii) removing the nanoparticles by an agent capable of dissolving said nanoparticles,
whereby a membrane with homogeneous pore size is obtained, the pore size of the membrane being determined by the size of the nanoparticles.

28. The method according to claim 27, wherein said membrane is made of a polysulfone polymer.

29. The method according to claim 28, wherein said polysulfone polymer is a commercial polysulfone polymer.

30. The method according to claim 29, wherein said commercial polysulfone contains the repeat unit of the formula:

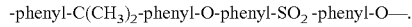

-phenyl-C(CH$_3$)$_2$-phenyl-O-phenyl-SO$_2$-phenyl-O—.

31. The method according to claim 28, wherein said polysulfone polymer is a modified polysulfone polymer as claimed in claim 1.

32. The method according to claim 31, wherein said modified polysulfone polymer is the polysulfone according to claim 13.

33. The method according to claim 27, wherein said nanoparticles are Fe$_2$O$_3$ nanoparticles.

34. The method according to claim 33, wherein the Fe$_2$O$_3$ nanoparticles are prepared in situ by hydrolysis of FeCl$_3$ and the Fe$_2$O$_3$ nanoparticles are arranged by a magnetic field into the polymer network.

35. The method according to claim 34, wherein the Fe$_2$O$_3$ nanoparticles are removed by acid etching.

36. The method according to claim 35, wherein said acid is HCl.

37. The method according to claim 33, for preparation of a monodispersed nanoporous polysulfone membrane with homogeneous pore size, comprising:
(i) preparing a casting solution comprising a polysulfone, Fe$_2$O$_3$ nanoparticles prepared in situ by hydrolysis of FeCl$_3$, and a solvent;
(ii) casting membrane samples onto a glass surface, evaporating the solvent and immersing the cast film together with the glass plate into ice-cold water;
(iii) washing the thin polymeric film separated out from the glass plate and press compacting the wet membrane; and
(iv) removing the Fe$_2$O$_3$ nanoparticles by etching with HCl;
whereby the monodispersed nanoporous polysulfone membrane with homogeneous pore size is obtained, the pore size of the membrane being determined by the size of the Fe$_2$O$_3$ nanoparticles.

38. The method according to claim 27, wherein said nanoparticles are nanoparticles of a salt that can be dissolved by an acid or a base or nanoparticles of an organic compound that can be dissolved with water or an organic solvent, resulting in nanoholes in the membrane.

39. The method according to claim 27, wherein steps (i) and (ii) are carried out concomitantly.

40. The method according to claim 27, wherein said membrane is selected from the group consisting of reverse osmosis, nanofiltration or ultrafiltration membrane having homogeneous pore size in the range from 10 nm to 10 μm, preferably 20-100 nm or 50-100 mn.

41. A method for preparation of a monodispersed nanoporous polymeric membrane with homogeneous pore size comprising crosslinking of the carboxylic groups of a carboxylated polysulfone with a crosslinking agent, followed by hydrolysis.

42. The method according to claim 41, wherein said crosslinking agent is an aliphatic, aromatic or heterocyclic compound having two or more functional groups selected from the group consisting of OH, SH, NH$_2$, silyl, B(OH)$_2$, and P(O)(OH)$_2$.

43. The method according to claim 42, wherein said crosslinking agent is at least one alkylene glycol, alkylenediamine, alkylene dithiol, alkylene disilyl, boronic acid-alkylene-phosphonic acid, or boronic acid-alkylene-amine, wherein the alkylene has 2-8 carbon atoms.

44. The method according to claim 43, wherein said crosslinking agent is an alkylene glycol, preferably ethylene glycol.

45. The method according to claim 44, wherein partial cleavage of the cross-linking motifs is carried out with a strong base, preferably NaOH, thus yielding numerous nanoholes of a uniform size distribution, the pore size of the membrane being determined by the degree of crosslinking cleavage.

46. The method according to claim 45, wherein partial removal of the crosslinking motifs by hydrolysis leaves pendant arms directed in space with specific functional groups at each arm terminus.

47. A method for the preparation of a polymeric membrane from a blend of two polymers by base hydrolysis of anhydride bonds inside of a membrane composed from the two polymers comprising the steps:
(i) preparing a homogeneous casting solution comprising a polysulfone and a copolymer comprising anhydride groups in an organic solvent;
(ii) casting the solution and evaporating the solvent;
(iii) immersing the membrane in cold water, compacting the membrane;
(iv) subjecting the compacted membrane to base hydrolysis thus producing carboxylic sodium salt groups; and
(v) converting the carboxylic sodium salt groups into carboxylic groups by acidification, thereby obtaining a membrane with high selectivity.

48. The method according to claim 47, wherein the polysulfone is a commercial polysulfone or a modified polysulfone as claimed in claim 1.

* * * * *